US012731424B2

(12) United States Patent
Panda et al.

(10) Patent No.: US 12,731,424 B2
(45) Date of Patent: Sep. 8, 2026

(54) OUT OF DISTRIBUTION ELEMENT DETECTION FOR INFORMATION EXTRACTION

(71) Applicant: Oracle International Corporation, Redwood Shores, CA (US)

(72) Inventors: Srikant Panda, Bangalore (IN); Amit Agarwal, Bangalore (IN); Gouttham Nambirajan, Bangalore (IN); Kulbhushan Pachauri, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 638 days.

(21) Appl. No.: 18/347,983

(22) Filed: Jul. 6, 2023

(65) Prior Publication Data

US 2025/0014374 A1 Jan. 9, 2025

(51) Int. Cl.

*G06V 30/19* (2022.01)
*G06F 40/169* (2020.01)
(Continued)

(52) U.S. Cl.

CPC ...... *G06V 30/19147* (2022.01); *G06F 40/169* (2020.01); *G06F 40/247* (2020.01); *G06V 30/413* (2022.01)

(58) Field of Classification Search

CPC ............ G06V 30/19147; G06V 30/413; G06F 40/247; G06F 40/169
See application file for complete search history.

(56) References Cited

U.S. PATENT DOCUMENTS

| | | |
|---|---|---|
| 5,912,989 A | 6/1999 | Watanabe |
| 6,061,652 A | 5/2000 | Tsuboka et al. |

(Continued)

FOREIGN PATENT DOCUMENTS

| | | |
|---|---|---|
| CN | 107977345 A | 5/2018 |
| CN | 113936340 A | 1/2022 |

(Continued)

OTHER PUBLICATIONS

W. Cho, J. Park and J. Choo, "Training Auxiliary Prototypical Classifiers for Explainable Anomaly Detection in Medical Image Segmentation," 2023 IEEE/CVF Winter Conference on Applications of Computer Vision (WACV), Waikoloa, HI, USA, 2023, pp. 2623-2632, doi: 10.1109/WACV56688.2023.00265.*

(Continued)

*Primary Examiner* — Sarah M Monfeldt
(74) *Attorney, Agent, or Firm* — Kilpatrick Townsend & Stockton LLP

(57) ABSTRACT

Techniques for extracting information from unstructured documents that enable an ML model to be trained such that the model can accurately distinguish in-distribution ("in-D") elements and out-of-distribution ("OO-D") elements within an unstructured document. Novel training techniques are used that train an ML model using a combination of a regular training dataset and an enhanced augmented training dataset. The regular training dataset is used to train an ML model to identify in-D elements, i.e., to classify an element extracted from a document as belonging to one of the in-D classes contained in the regular training dataset. The augmented training dataset, which is generated based upon the regular training dataset may contain one or more augmented elements which are used to train the model to identify OO-D elements, i.e., to classify an augmented element extracted (Continued)

from a document as belonging to an OO-D class instead of to an in-D class.

20 Claims, 29 Drawing Sheets

(51) Int. Cl.
*G06F 40/247* (2020.01)
*G06V 30/413* (2022.01)

(56) References Cited

U.S. PATENT DOCUMENTS

| | | | |
|---|---|---|---|
| 9,424,668 | B1 | 8/2016 | Petrou et al. |
| 11,003,959 | B1 | 5/2021 | Levner et al. |
| 11,087,081 | B1 | 8/2021 | Srivastava et al. |
| 11,341,367 | B1 | 5/2022 | Barbosa et al. |
| 11,430,467 | B1 | 8/2022 | Vasudevan et al. |
| 11,763,092 | B2 | 9/2023 | Duong et al. |
| 11,989,964 | B2 | 5/2024 | Agarwal et al. |
| 12,106,595 | B2 | 10/2024 | Agarwal et al. |
| 12,182,498 | B1 | 12/2024 | Sunkara et al. |
| 2002/0016798 | A1 | 2/2002 | Sakai et al. |
| 2012/0062574 | A1 | 3/2012 | Dhoolia et al. |
| 2016/0103833 | A1 | 4/2016 | Sanders et al. |
| 2016/0364608 | A1 | 12/2016 | Sengupta et al. |
| 2017/0351965 | A1 | 12/2017 | Kurniadi et al. |
| 2018/0114142 | A1* | 4/2018 | Mueller ................ G06F 16/906 |
| 2019/0147853 | A1 | 5/2019 | Gunasekara et al. |
| 2020/0005118 | A1 | 1/2020 | Chen et al. |
| 2020/0104650 | A1 | 4/2020 | Huang |
| 2020/0125954 | A1 | 4/2020 | Truong et al. |
| 2020/0179808 | A1 | 6/2020 | Lee et al. |
| 2020/0285702 | A1 | 9/2020 | Padhi et al. |
| 2020/0320053 | A1 | 10/2020 | He et al. |
| 2020/0380623 | A1 | 12/2020 | Ranjan et al. |
| 2020/0410231 | A1 | 12/2020 | Chua et al. |
| 2021/0089587 | A1 | 3/2021 | Gupta et al. |
| 2021/0133645 | A1 | 5/2021 | Tazi et al. |
| 2021/0158093 | A1 | 5/2021 | Kaynig-Fittkau et al. |
| 2021/0248323 | A1 | 8/2021 | Maheshwari et al. |
| 2022/0092267 | A1 | 3/2022 | Hou et al. |
| 2022/0156300 | A1* | 5/2022 | Paruchuri ................ G06N 3/08 |
| 2022/0171938 | A1 | 6/2022 | Jalaluddin et al. |
| 2022/0405682 | A1 | 12/2022 | Yoon et al. |
| 2023/0040084 | A1 | 2/2023 | Cherukara et al. |
| 2023/0146501 | A1 | 5/2023 | Agarwal et al. |
| 2023/0153335 | A1 | 5/2023 | McNeill |
| 2023/0252234 | A1* | 8/2023 | Hoang ................... G06N 3/042 704/9 |
| 2023/0326224 | A1 | 10/2023 | Agarwal et al. |
| 2023/0394235 | A1 | 12/2023 | Rahman et al. |
| 2024/0169272 | A1* | 5/2024 | MacWilliams ........ G06N 3/096 |
| 2024/0338813 | A1* | 10/2024 | Kamen .............. G01R 33/5608 |
| 2025/0157242 | A1* | 5/2025 | Ramaswamy ....... G06V 30/412 |
| 2025/0378048 | A1* | 12/2025 | Bhat ................... G06F 16/1748 |

FOREIGN PATENT DOCUMENTS

| | | |
|---|---|---|
| CN | 114491010 A | 5/2022 |
| WO | 2022078922 A1 | 4/2022 |

OTHER PUBLICATIONS

Mixture Outlier Exposure: Towards Out-of-Distribution Detection in Fine-grained Environments Jingyang Zhang†, Nathan Inkawhich, Randolph Linderman†, Yiran Chen†, Hai Li† †Duke University, Air Force Research Laboratory. arXiv:2106.03917. [v4] Thu, Oct. 20, 2022 00:15:14 UTC.*

Towards In-distribution Compatibility in Out-of-distribution Detection; Boxi Wu, Jie Jiang, Haidong Ren, Zifan Du, Wenxiao Wang, Zhifeng Li, Deng Cai, Xiaofei He, Binbin Lin, Wei Liu. arXiv:2208.13433 [cs.CV]. [v1] Mon, Aug. 29, 2022 09:06:15 UTC.*

U.S. Appl. No. 18/240,480, "Notice of Allowance", Dec. 30, 2025, 15 pages.

U.S. Appl. No. 18/379,091, Non-Final Office Action, Mailed on Jun. 6, 2024, 19 pages.

U.S. Appl. No. 18/379,091, Notice of Allowance, Mailed on Jul. 29, 2024, 7 pages.

International Application No. PCT/US2024/016876, International Search Report and Written Opinion, Mailed on Jun. 5, 2024, 16 pages.

Tang et al., "MatchVIE: Exploiting Match Relevancy Between Entities for Visual Information Extraction", Available online at: https://arxiv.org/pdf/2106.12940, Jun. 24, 2021, 7 pages.

Wei et al., "Robust Layout-Aware IE for Visually Rich Documents with Pre-Trained Language Models", Cornell University Library, Available online at: https://arxiv.org/pdf/2005.11017, May 22, 2020, 10 pages.

Xu et al., "LayoutLMv2: Multi-Modal Pre-Training for Visually-Rich Document Understanding", Available Online at: https://arxiv.org/pdf/2012.14740v4, Jan. 10, 2022, 13 pages.

U.S. Appl. No. 17/217,909, Non-Final Office Action mailed on Apr. 18, 2023, 15 pages.

U.S. Appl. No. 17/217,909, Notice of Allowance mailed on Jun. 8, 2023, 27 pages.

U.S. Appl. No. 17/714,806, Notice of Allowance mailed on Jul. 26, 2023, 7 pages.

Kim et al., "Joint Learning of Domain Classification and Out-of-Domain Detection with Dynamic Class Weighting for Satisficing False Acceptance Rates", Available online at: https://arxiv.org/pdf/1807.00072.pdf, Jun. 29, 2018, 6 pages.

Lane et al., "Out-of-Domain Utterance Detection Using Classification Confidences of Multiple Topics", Institute of Electrical and Electronics Engineers, Transactions on Audio, Speech, and Language Processing, vol. 15, No. 1, Jan. 1, 2007, pp. 150-161.

International Application No. PCT/US2021/024917, "International Preliminary Report on Patentability", Oct. 13, 2022, 9 pages.

International Application No. PCT/US2021/024917, "International Search Report and Written Opinion", Jul. 12, 2021, 13 pages.

U.S. Appl. No. 17/524,157 , Notice of Allowance, Mailed on Feb. 28, 2024, 24 pages.

U.S. Appl. No. 18/240,480, Non-Final Office Action, Mailed on Jun. 5, 2025, 12 pages.

Augmentation Pipeline for Rendering Synthetic Paper Printing, Faxing, Scanning and Copy Machine Processes, Available online at: https://github.com/sparkfish/augraphy, Accessed from Internet Apr. 4, 2022, 13 pages.

Bert, Available Online at: https://huggingface.co/docs/transformers/model_doc/bert, Accessed from Internet on Mar. 2, 2022, 114 pages.

DataGen—CeDar, Centre for Applied Data Analytics Research, Available online at: https://old.ceadar.ie/wp-content/uploads/CeADAR_Flyer_DataGen_v2.pdf, 1 page.

Datagen Synthetic Image Datasets for Computer Vision, Available online at: https://datagen.tech/, Accessed from Internet Jun. 1, 2022, 6 pages.

Deterministic Algorithm, Wikipedia, Available Online at: https://en.wikipedia.org/wiki/Deterministic_algorithm, Accessed from Internet on Mar. 2, 2022, 4 pages.

DistilBERT, Available Online at: https://huggingface.co/docs/transformers/model_doc/distilbert, Accessed from Internet on Mar. 2, 2022, 62 pages.

LayoutLMFT, Available online at https://github.com/microsoft/unilm/tree/master/layoutlmft, Accessed from Internet on Aug. 19, 2021, 2 pages.

Public Leader for SROIE, Available online at https://rrc.cvc.uab.es/?ch=13&com=evaluation&task=3, Accessed from Internet on: Aug. 19, 2021, 5 pages.

Scipy.Optimize.Linear_Sum_Assignment, Available Online at: https://docs.scipy.org/doc/scipy-0.18.1/reference/generated/scipy.optimize.linear_sum_assignment.html, Sep. 19, 2016, 2 pages.

Sklearn.Decomposition.PCA, Available Online at: https://scikit-learn.org/stable/modules/generated/sklearn.decomposition.PCA.html, Accessed from Internet on Mar. 2, 2022, 6 pages.

(56) References Cited

OTHER PUBLICATIONS

Spaczz: Fuzzy Matching and More for Spacy, Available Online at: https://github.com/gandersen101/spaczz, Accessed from Internet on Mar. 2, 2022, 20 pages.
Text Distance, Available Online at: https://github.com/life4/textdistance, Accessed from Internet on Mar. 2, 2022, 9 pages.
Welcome to Albumentations Documentation, Available online at: https://albumentations.ai/docs/, Accessed from Internet Apr. 4, 2022, 3 pages.
WordNet: A Lexical Database for English, Princeton University, Available Online at: https://wordnet.princeton.edu/, Accessed from Internet on Mar. 2, 2022, 4 pages.
U.S. Appl. No. 17/714,806, Notice of Allowance mailed on Jun. 22, 2023, 14 pages.
Abdelzad et al., Detecting Out-of-Distribution Inputs in Deep Neural Networks Using an Early-Layer Output, Available online at: https://arxiv.org/pdf/1910.10307.pdf, Oct. 23, 2019, 15 pages.
Ba, Meta-data Driven Key-Value Pairs Extraction with Azure Form Recognizer, Available online at: https://techcommunity.microsoft.com/t5/ai-cognitive-services-blog/meta-data-driven-key-value-pairs-extraction-with-azure-form/ba-p/1942595, Nov. 30, 2020, 8 pages.
Biswas et al., DocSynth: A Layout Guided Approach for Controllable Document Image Synthesis, Available online at: https://arxiv.org/pdf/2107.02638.pdf, Sep. 2021, 15 pages.
Brems, A One-Stop Shop for Principal Component Analysis, Towards Data Science, Available Online at: https://towardsdatascience.com/a-one-stop-shop-for-principal-component-analysis-5582fb7e0a9c, Apr. 18, 2017, 14 pages.
Chogovadze et al., Controllable Data Augmentation Through Deep Relighting, Available online at: https://arxiv.org/pdf/2110.13996.pdf, Oct. 26, 2021, 15 pages.
Delalandre et al., Generation of Synthetic Documents for Performance Evaluation of Symbol Recognition & Spotting Systems, International Journal on Document Analysis and Recognition, vol. 13, No. 3, Sep. 2010, pp. 187-207.
Devlin et al., BERT: Pre-training of Deep Bidirectional Transformers for Language Understanding, Available Online at: https://arxiv.org/pdf/1810.04805.pdf, May 24, 2019, 16 pages.
Gautam, Form Data Augmentation, Available online at: https://github.com/gautam-aayush/form-data-augmentation, Mar. 19, 2021, 11 pages.
Ghosh, Invoice Information Extraction Using OCR and Deep Learning, Available online at: https://medium.com/analytics-vidhya/invoice-information-extraction-using-ocr-and-deep-learning-b79464f54d69, Jan. 14, 2021, 31 pages.
Huang et al., Out-of-Distribution Detection for LiDAR-based 3D Object Detection, Available online at: https://arxiv.org/pdf/2209.14435v1.pdf, Sep. 28, 2022, 7 pages.
Jaadi, A Step-by-Step Explanation of Principal Component Analysis (PCA), Builtin.com, Available Online at: https://builtin.com/data-science/step-step-explanation-principal-component-analysis, Apr. 1, 2021, 8 pages.
Journet et al., DocCreator: A New Software for Creating Synthetic Ground-Truthed Document Images, Journal of Imaging, vol. 3, Available Online at: https://hal.archives-ouvertes.fr/hal-01668915/file/jimaging.pdf, Dec. 2017, 18 pages.
Lin et al., An Efficient Data Augmentation Network for Out-of-Distribution Image Detection, Available online at: https://ieeexplore.ieee.org/stamp/stamp.jsp?tp=&arnumber=9363111, Feb. 24, 2021, pp. 35313-35323.
Liu et al., Self-Supervised Learning: Generative or Contrastive, Available online at https://arxiv.org/pdf/2006.08218.pdf, Mar. 20, 2021, pp. 1-24.
Luan et al., Out-Of-Distribution Detection for Deep Neural Networks with Isolation Forest and Local Outlier Factor, Available online at: https://www.researchgate.net/publication/354189192_Out-Of-Distribution_Detection_for_Deep_Neural_Networks_with_Isolation_Forest_and_Local_Outlier_Factor, Aug. 2021, 13 pages.
Ma, NLP Augmentation, Available online at : https://github.com/makcedward/nlpaug, 2019, 4 pages.
Ma, nlpaug: Data augmentation for NLP, Available online at: https://github.com/makcedward/nlpaug, Accessed from Internet Apr. 4, 2022, 21 pages.
Moore et al., Hungarian Maximum Matching Algorithm, Brilliant Math & Science Wiki, Available Online at: https://brilliant.org/wiki/hungarian-matching/, Accessed from Internet on Mar. 2, 2022, 7 pages.
Moore et al., Matching (Graph Theory), Brilliant Math & Science Wiki, Available Online at: https://brilliant.org/wiki/matching/, Accessed from Internet on Mar. 2, 2022, 6 pages.
Moore et al., Matching Algorithms (Graph Theory), Brilliant Math & Science Wiki, Available Online at: https://brilliant.org/wiki/matching-algorithms/, Accessed from Internet on Mar. 2, 2022, 5 pages.
Rawat et al., PnPOOD: Out-Of-Distribution Detection for Text Classification via Plug and Play Data Augmentation, Available online at: https://arxiv.org/abs/2111.00506, Oct. 31, 2021, 9 pages.
Ronneberger et al., U-Net: Convolutional Networks for Biomedical Image Segmentation, International Conference on Medical Image Computing and Computer-Assisted Intervention, Available Online at URL: https://arxiv.org/pdf/1505.04597.pdf, May 18, 2015, pp. 234-241.
Sebastianelli et al., Automatic Dataset Builder for Machine Learning Applications to Satellite Imagery, Software X, vol. 15, Available online at: https://www.sciencedirect.com/science/article/pii/S2352711021000728, Jul. 2021, 7 pages.
Sun et al., Spatial Dual-Modality Graph Reasoning for Key Information Extraction, Journal of Latex Class Files, vol. 14, No. 8, Available online at https://arxiv.org/pdf/2103.14470.pdf, Aug. 2015, pp. 1-9.
Van Laer, Recognition of Named Entities on Invoices for IxorDocs, Available online at: https://medium.com/ixorthink/recognition-of-named-entities-on-invoices-for-ixordocs-9bef38d24429, Aug. 2, 2018, 14 pages.
Veyseh et al., Improving Keyphrase Extraction with Data Augmentation and Information Filtering, Available online at: https://www.researchgate.net/publication/363501653_Improving_Keyphrase_Extraction_with_Data_Augmentation_and_Information_Filtering, Sep. 11, 2022, 10 pages.
White, By 2024, 60% of the Data Used for the Development of AI and Analytics Projects Will Be Synthetically Generated, Available online at: https://blogs.gartner.com/andrew_white/2021/07/24/by-2024-60-of-the-data-used-for-the-development-of-ai-and-analytics-projects-will-be-synthetically-generated/, Jul. 24, 2021, 4 pages.
Xu et al., LayoutLM: Pre-Training of Text and Layout for Document Image Understanding, Available Online at: https://arxiv.org/pdf/1912.13318.pdf, Aug. 23-27, 2020, 9 pages.
You et al., Graph Contrastive Learning with Augmentations, 34th Conference on Neural Information Processing Systems, Available online at https://papers.nips.cc/paper/2020/file/3fe230348e9a12c13120749e3f9fa4cd-Paper.pdf, 2020, pp. 1-12.
Yu et al., PICK: Processing Key Information Extraction from Documents using Improved Graph Learning-Convolutional Networks, arXiv:2004.07464, Available Online at: https://arxiv.org/pdf/2004.07464.pdf, Jul. 18, 2020, 8 pages.

* cited by examiner

Figure 5A:
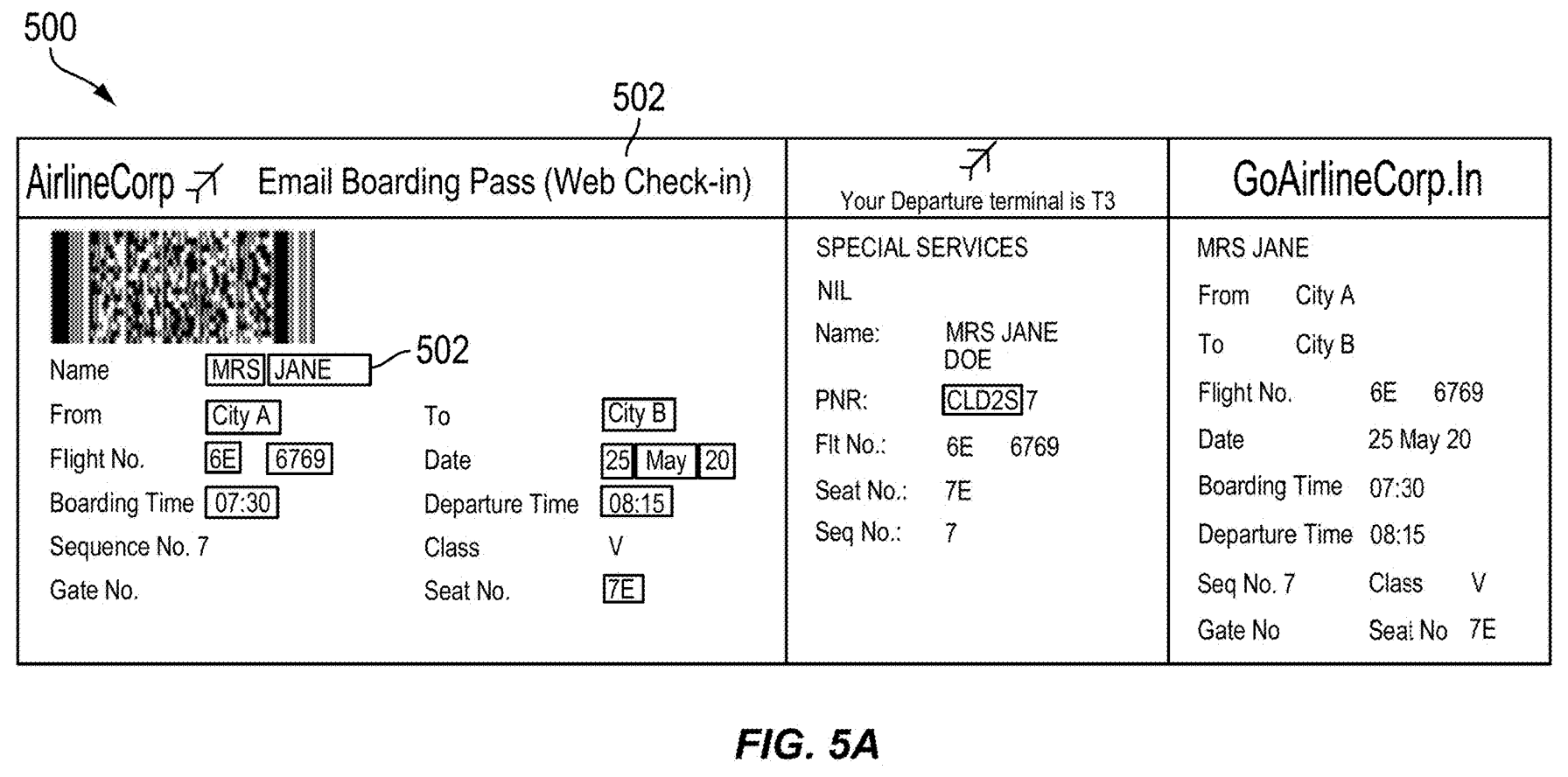

500

502

AirlineCorp Email Boarding Pass (Web Check-in)

Name MRS JANE 502
From City A To City B
Flight No. 6E 6769 Date 25 May 20
Boarding Time 07:30 Departure Time 08:15
Sequence No. 7 Class V
Gate No. Seat No. 7E Your Departure terminal is T3

SPECIAL SERVICES
NIL
Name: MRS JANE DOE
PNR: CLD2S7
Flt No.: 6E 6769
Seat No.: 7E
Seq No.: 7

GoAirlineCorp.In

MRS JANE
From City A
To City B
Flight No. 6E 6769
Date 25 May 20
Boarding Time 07:30
Departure Time 08:15
Seq No. 7 Class V
Gate No Seat No 7E

Figure 5B:
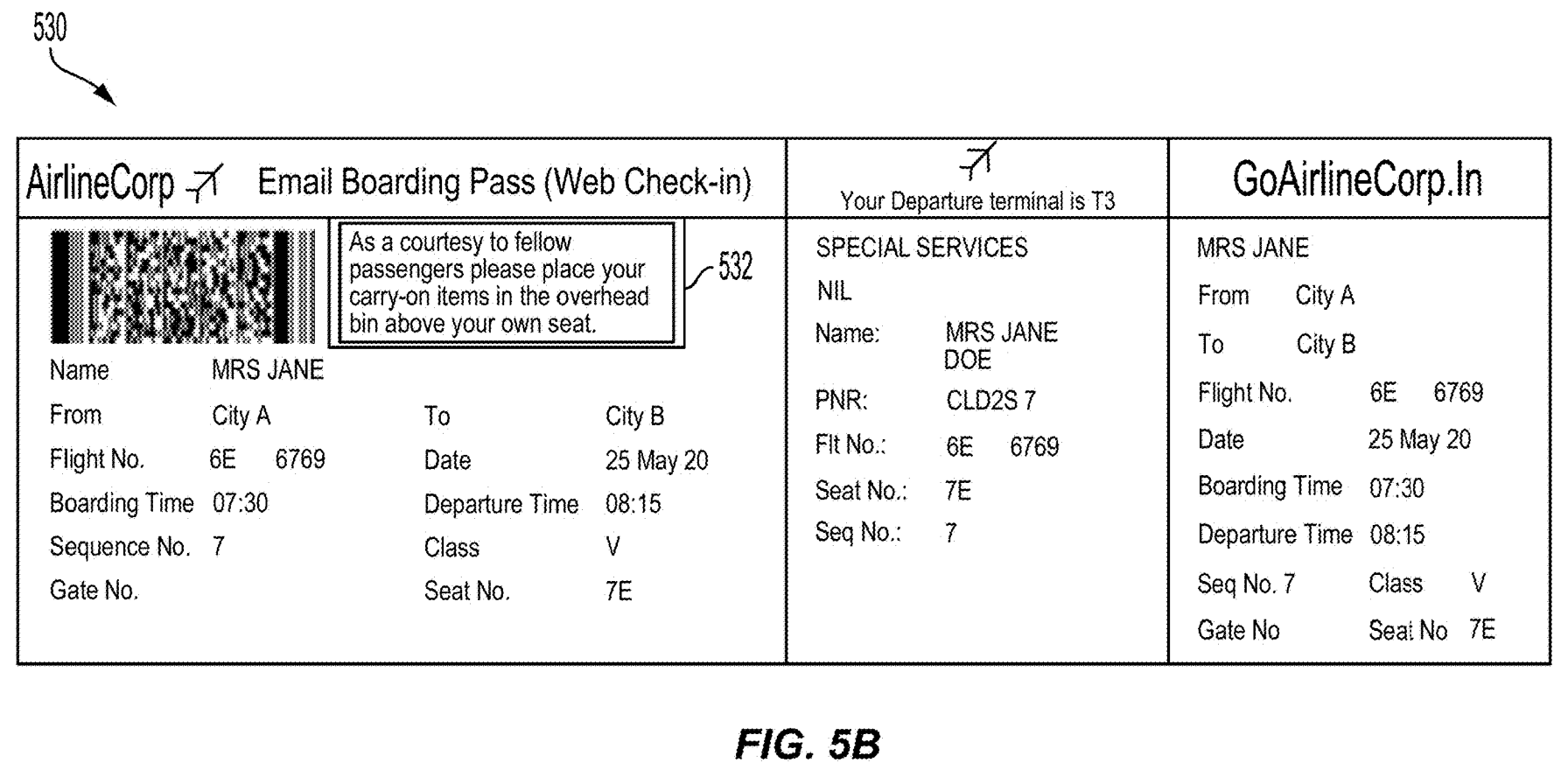

AirlineCorp Email Boarding Pass (Web Check-in)

As a courtesy to fellow passengers please place your carry-on items in the overhead bin above your own seat.

532

Name MRS JANE
From City A
To City B
Flight No. 6E 6769
Date 25 May 20
Boarding Time 07:30
Departure Time 08:15
Sequence No. 7
Class V
Gate No.
Seat No. 7E Your Departure terminal is T3

SPECIAL SERVICES
NIL
Name: MRS JANE DOE
PNR: CLD2S 7
Flt No.: 6E 6769
Seat No.: 7E
Seq No.: 7

GoAirlineCorp.In

MRS JANE
From City A
To City B
Flight No. 6E 6769
Date 25 May 20
Boarding Time 07:30
Departure Time 08:15
Seq No. 7
Class V
Gate No
Seat No 7E

Figure 5C:
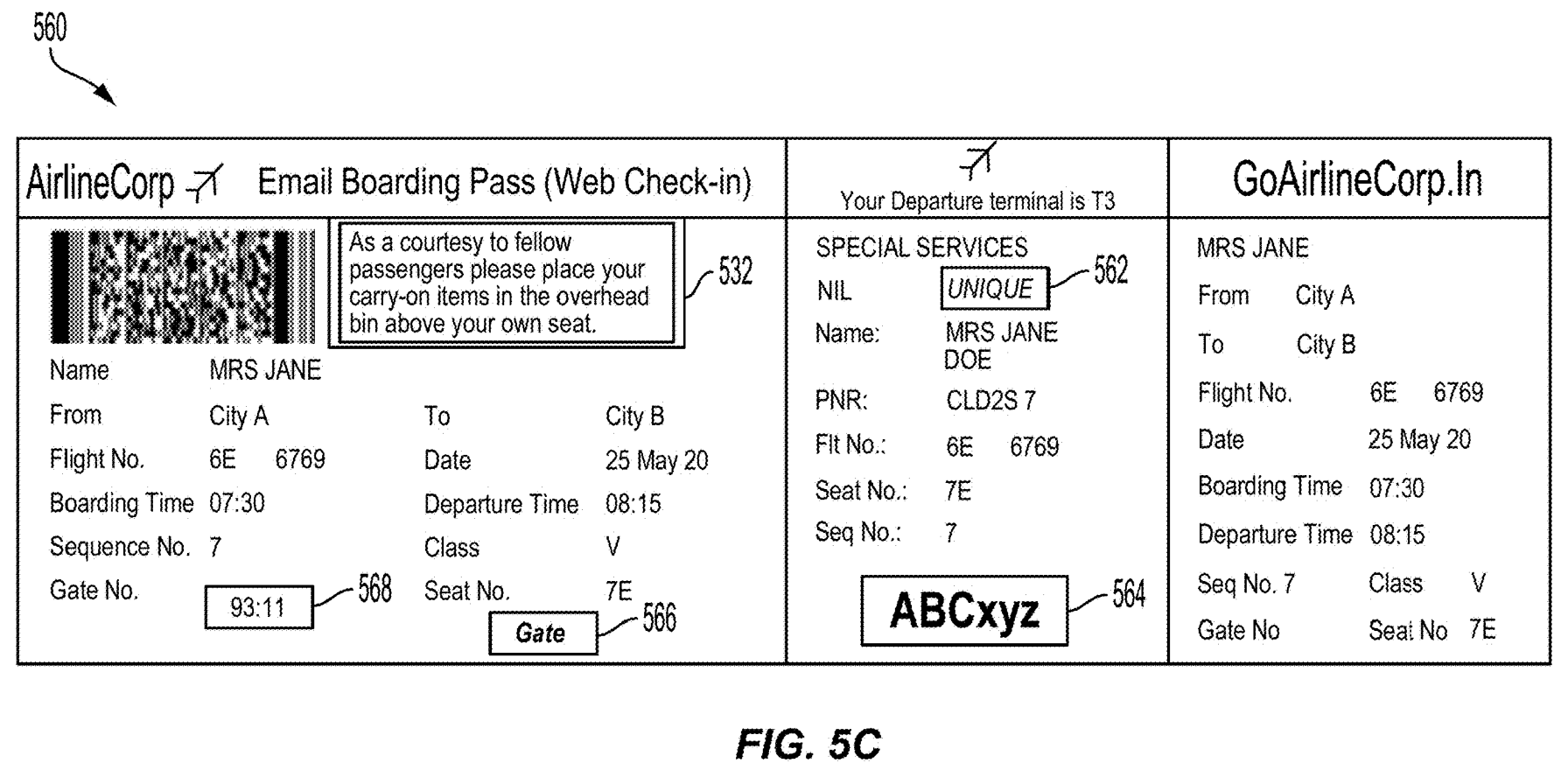

AirlineCorp Email Boarding Pass (Web Check-in)

As a courtesy to fellow passengers please place your carry-on items in the overhead bin above your own seat.

532

Name MRS JANE
From City A
Flight No. 6E 6769
Boarding Time 07:30
Sequence No. 7
Gate No. 93:11 568

To City B
Date 25 May 20
Departure Time 08:15
Class V
Seat No. 7E
Gate 566

Your Departure terminal is T3

SPECIAL SERVICES
NIL UNIQUE 562
Name: MRS JANE DOE
PNR: CLD2S 7
Flt No.: 6E 6769
Seat No.: 7E
Seq No.: 7

ABCxyz 564

GoAirlineCorp.In

MRS JANE
From City A
To City B
Flight No. 6E 6769
Date 25 May 20
Boarding Time 07:30
Departure Time 08:15
Seq No. 7 Class V
Gate No Seat No 7E

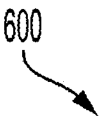

Access a first training dataset (regular training dataset) provided for a machine learning (ML) model, the first training dataset comprising a first plurality of documents and annotation information for each document in the first plurality of document
605

Generate a second training dataset (augmented training dataset) based upon the first training dataset, the second training dataset comprising a second plurality of documents and annotation information for each document in the second plurality of documents
610

Train the ML model using both the first training dataset and the second training dataset to generate a trained ML model
615

*FIG. 6*

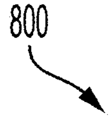
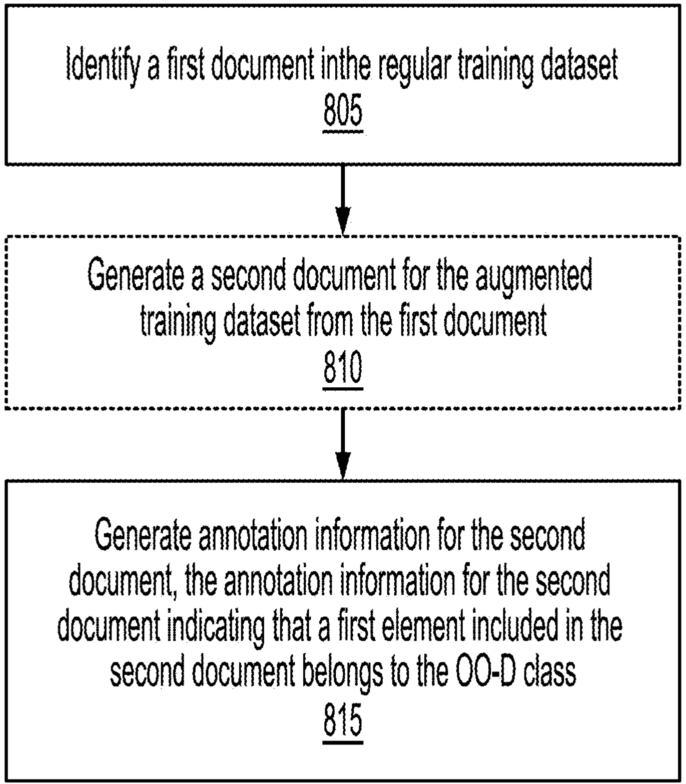
FIG. 8

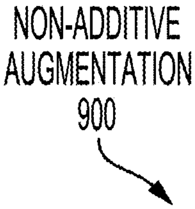
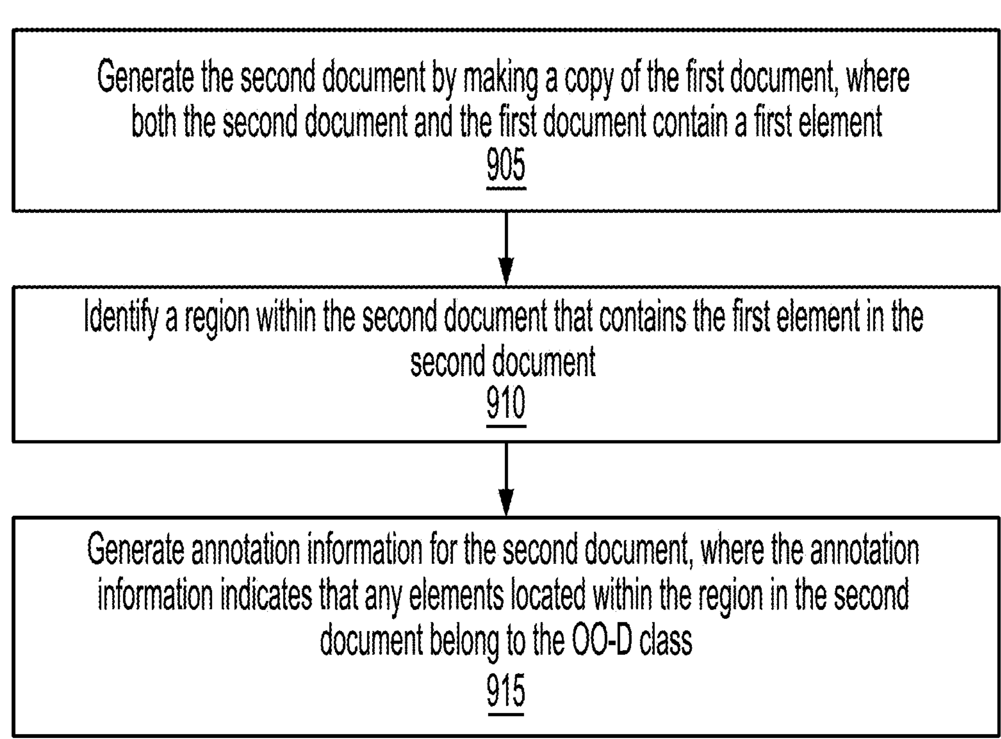
FIG. 9

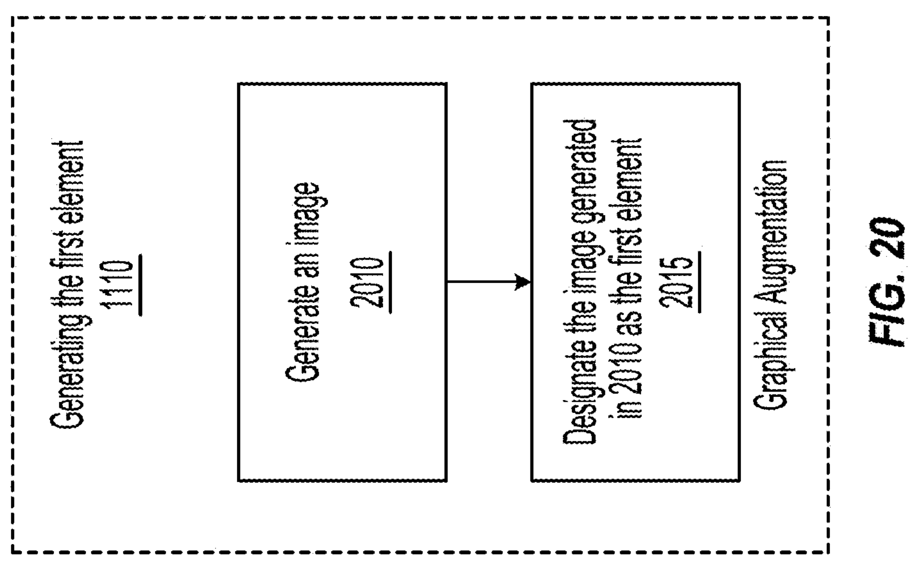
FIG. 20
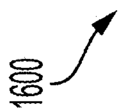

OUT OF DISTRIBUTION ELEMENT DETECTION FOR INFORMATION EXTRACTION

BACKGROUND

The process of using automated techniques to extract information from unstructured documents is commonly referred to as information extraction or sometimes as key-value extraction. The documents can be in the form of images, portable document format (PDF) files, plain text documents, etc. The images (also sometimes referred to as image files or image documents) can use various digital image formats including, for example, graphics interchange format (GIF), joint photographic experts group (JPEG) format, tag image file format (TIFF), etc. Unstructured documents can have any layout and the information may not be labeled in any meaningful way. Unstructured documents, as used herein, may include semi-structured documents, which may include some indication of what data is contained but may still have a degree of non-uniformity and variability.

Such unstructured documents are used in various personal and business uses cases. Examples of unstructured documents include, for example, different types of identification documents (e.g., driver's license, college ID), bills, receipts, invoices, various types of forms (e.g., admission forms, loan applications, insurance claim forms, tax forms, medical forms), prescriptions, images of resumes, financial documents (e.g., images of checks, credit card statements, bank statements, pay slips, bank deposit forms, account opening statements), travel documents (e.g., images of airline tickets, boarding passes, train tickets, passport images), historical documents, orders, proof-of-shipment documents, import/export bills, and several others. As a result, accurately extracting information from unstructured documents is of great importance to a wide spectrum of industries.

Traditionally, optical character recognition ("OCR") techniques were used to extract information from unstructured documents such as images. With the advent of artificial intelligence ("AI") and machine learning ("ML"), a combination of OCR techniques and one or multiple trained ML models are now used to perform the information extraction. For example, an OCR engine is used to extract content portions (also referred to as elements) from an unstructured document and a trained ML model is then used to classify each extracted element to one (or more) of a fixed number of in-distribution ("in-D") classes for which the ML is trained. Examples of elements that are extracted include text portions such as words, lines, paragraphs, etc.

Different ML models are generally pretrained to extract information from specific document types. For instance, ML models can be trained to extract information from certain categories or certain portions of documents like machine-readable zones ("MRZ") on documents, driver's licenses or other ID cards, receipts, invoices, or insurance claim, to name a few common examples. Some ML models may be trained using customized training data for information extraction from custom document types not found among these pretrained ML models. For example, such custom models may be trained to extract information from domain-specific documents. Users can use either or both models for their automated inference tasks.

Existing ML models that are used for information extraction are however not as accurate as desired. Quite often, the ML models misclassify elements extracted from an unstructured document. One such misclassification is where an extracted element that does not belong to any of the in-D classes is erroneously classified by the ML model as belonging to one of the in-D classes that the ML model is trained on, when in reality that element does not belong to any of the in-D classes. This leads to a high number of false-positives for in-D classifications by the ML model, which reduces the accuracy of the ML model and also degrades the experience of users using the model. Such misclassifications are referred to as out-of-distribution ("OO-D") elements.

The performance of existing ML models is also sub-standard when it comes to classifying noise content in a document. This noise may be in the form of handwritten marks, stamps, stickers, etc. in the unstructured document. Such noise content is misclassified by existing ML models as belonging to one of the in-D classes that the models are trained on, when in reality that content does not belong to any of the in-D classes. For example, an invoice may contain a stray mark inadvertently made during handling of the invoice. The stray mark may be identified as text and classified as a member of an in-D class. This again results in false positives for in-D classes for elements that should be classified as OO-D elements.

Other examples where existing techniques for classifying elements fail is in situations where a model is faced with classifying elements with properties similar to in-D elements, but which should not be classified as in-D elements based on their text, position, appearance, and other characteristics. For example, an element may need to be classified as an in-D element when positioned in a certain location or locations within a document but is to be classified as OO-D when located in other location or locations within the document. For example, an invoice may include the word "payment" next to an amount remitted, which would be an example of an in-D element. The handwritten word "payment" in the margins as part some content unrelated to remitted payments (e.g., an informal note made by the seller to the buyer) may be identified as text and classified as a member of an in-D class. Traditional models are unable to properly handle such situations and classify such OO-D elements as in-D elements. This again brings down the in-distribution class accuracy of the models.

BRIEF SUMMARY

The present disclosure relates to extracting information from unstructured documents. More specifically, techniques are described that enable a machine learning ("ML") model to accurately distinguish in-distribution ("in-D") elements and out-of-distribution ("OO-D") elements within an unstructured document. This is achieved using novel training techniques that enable ML models to be trained such that the trained models can accurately classify elements extracted from an unstructured document as either belonging to one of a set of in-D classes or to an OO-D class.

Various embodiments are described herein, including methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

As disclosed herein, an ML model is trained to classify extracted elements as belonging to one or more in-D classes, and in addition, where appropriate, to classify an extracted element as belonging to an OO-D class instead of an in-D class. The training techniques described herein thus result in the model learning how to classify an extracted element as belonging to one of the in-D classes and additionally, where appropriate, learning how to classify an extracted element as belonging to the OO-D class.

Novel training techniques are used to enable the trained models to accurately identify in-D elements and OO-D elements from a document undergoing information extraction processing. The novel training techniques include training an ML model using a combination of a regular training dataset and an enhanced augmented training dataset. Both datasets include elements that are used to train an ML model to identify in-D elements, i.e., to classify an element extracted from a document as belonging to one of the in-D classes. The augmented training dataset also includes augmented elements, which are generated based upon the in-D elements and are used to train the model to identify OO-D elements, i.e., to classify an element extracted from a document as belonging to an OO-D class instead of to an in-D class. An ML model that is to be used for classifying elements extracted from unstructured documents is trained using both the regular training dataset and the augmented training dataset. For an element extracted from an unstructured document undergoing information extraction processing, an ML model trained according to the various techniques described herein is able to classify the extracted element as belonging to an in-D class or to the OO-D class. In certain implementations, as a result of the training, the ML model learns to perform this classification based upon different visual cues and attributes associated with an extracted element such as the location of the element within the document, the color of the element, the font of the element, the font size, the orientation of the element, and other visual attributes as well as the text itself, including the definition, meaning, tone, semantics, context, and so on.

In certain embodiments, the techniques include a computer-implemented method. In the method, a computing device can access a first (regular) training dataset provided for training an ML model, in which the first training dataset includes a first plurality of documents with annotation information for each document in the first plurality of documents. For each document in the first plurality of documents, the annotation information for each respective document comprises information indicative of one or more elements in the document. Likewise, for each element among the one or more elements, the annotation information includes information indicative of an in-D class, from one or more in-D classes, to which the element belongs.

The computing device can generate a second (augmented) training dataset based upon the first training dataset, in which the second training dataset includes another plurality of documents and annotation information for each document in the plurality of documents. In the second plurality of documents, each document also includes one or more elements that belong to an OO-D class.

The computing device can train the ML model using both the first training dataset and the second training dataset to generate a trained machine learning model, in which, for an element extracted from a particular document, the trained machine learning model is trained to classify the extracted element as belonging to an in-D class or to the OO-D class.

In certain embodiments, the computing device may provide a document to the trained ML model. Following this, the computing device can receive, from the trained ML model, a first extracted element from the document, in which the first extracted element is classified as belonging to an in-D class. The computing device can then receive, from the trained ML model, a second extracted element from the document, in which the second extracted element is classified as belonging to the OO-D class.

In certain embodiments, the computing device may generate the second training dataset based upon the first training dataset by first identifying a first document in the first plurality of documents. The computing device can then generate a second document for the second plurality of documents from the first document, using a first augmentation technique, in which the second document comprises a first element. The computing device can generate annotation information for the second document indicating that the first element belongs to OO-D class.

In some embodiments, the computing device may generate the second document from the first document by making a copy of the first document, in which the second document is the copy of the first document.

In some embodiments, the computing device may generate the second document from the first document by first receiving information identifying a region within the second document, in which the first element is positioned within the region in the second document. In this embodiment, generating the annotation information for the second document may involve including information in the annotation information indicative that any elements located within the region in the second document belong to the OO-D class, in which the first element is located in the first document in a location corresponding to the region in the second document.

In some embodiments, the computing device may generate the second document from the first document by generating the first element. The computing device may identify, based upon the first document, a location within the second document for placing the first element and then place the first element in the identified location within the second document.

In certain embodiments, generating the second training dataset based upon the first training dataset involves using a first augmentation technique and using a second augmentation technique.

In certain embodiments, generating the second training dataset based upon the first training dataset involves, for the first document in the second plurality of documents, accessing metadata associated with the first document by the computing device. The computing device can then identify characteristics of the first document, based on the metadata, and based on the characteristics of the first document, select one or more augmentation techniques.

In certain embodiments, generating the first element involves identifying one or more words from a document in the second plurality of documents. In some related embodiments, the one or more words from the document in the second plurality of documents are included in the second document.

In certain embodiments, generating the first element involves identifying one or more words from a document in the second plurality of documents and then generating, using a word embedding model, one or more similar words from the identified one or more words, in which the similarity of the one or more words is determined using a similarity measure. In some related embodiments, the similarity measure is a cosine similarity.

In certain embodiments, generating the first element involves identifying one or more words from a document in the second plurality of documents and then determining a synonym of the identified one or more words.

In certain embodiments, generating the first element involves generating at least either one or more random characters or one or more random words.

In certain embodiments, generating the first element involves identifying one or more words from a document in the second plurality of documents. The computing device can then identify one or more characteristics of the one or more words from the document in the second plurality of documents using the metadata associated with the first document. The computing device may, based on the one or more identified characteristics, determine one or more words that have the identified characteristics.

In certain embodiments, generating the first element comprises involves modifying a property of the first element, wherein the property includes at least one of: font, color, or size.

In certain embodiments, generating the first element comprises involves determining an image.

The foregoing, together with other features and embodiments will become more apparent upon referring to the following specification, claims, and accompanying drawings.

BRIEF DESCRIPTION OF THE DRAWINGS

FIGS. 4A-D and FIGS. 5A-C depict illustrations of example documents from regular training datasets and augmented training datasets, according to certain embodiments.

FIG. 6 depicts a simplified flowchart showing a method for generating an augmented training dataset from a regular training dataset, according to certain embodiments.

FIG. 8 depicts a simplified flowchart showing a method for generating augmented training data, according to certain embodiments.

FIG. 9 depicts a simplified flowchart showing a method for non-additive augmentation techniques, according to certain embodiments.

FIG. 20 shows a simplified flowchart showing an example method involving an additive augmentation technique, according to certain embodiments.

DETAILED DESCRIPTION

Figure 1:
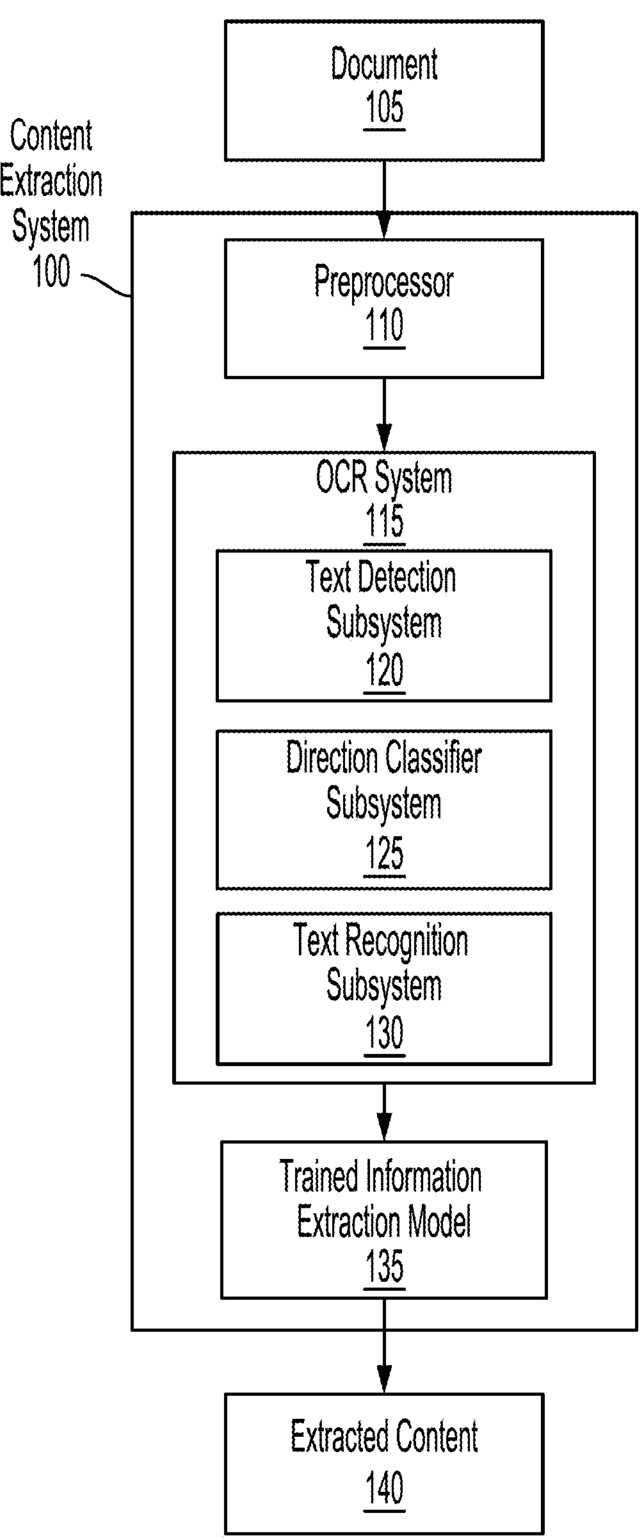
FIG. 1 depicts a simplified block diagram of an example content extraction system for information extraction, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to extracting information from unstructured documents. More specifically, techniques are described that enable a machine learning ("ML") model to accurately distinguish in-distribution ("in-D") elements and out-of-distribution ("OO-D") elements within an unstructured document. This is achieved using novel training techniques that enable ML models to be trained such that the trained ML models can accurately classify elements extracted from an unstructured document as either belonging to one of a set of in-D classes or to an OO-D class.

As disclosed herein, an ML model is trained to, in addition to classifying extracted elements as belonging to one or more in-D classes, to also, where appropriate, classify an extracted element as belonging to an OO-D class instead of an in-D class. The training techniques described herein thus result in the model learning how to classify an extracted element as belonging to one of the in-D classes and additionally, where appropriate, learning how to classify an extracted element as belonging to the OO-D class.

Novel training techniques are used to enable the trained models to accurately identify in-D elements and OO-D elements from a document undergoing information extraction processing. The novel training techniques include training an ML model using a combination of a regular training dataset and an enhanced augmented training dataset. The regular training dataset is used to train an ML model to identify in-D elements, i.e., to classify an element extracted from a document as belonging to one of the in-D classes contained in the regular training dataset. The augmented training dataset, which is generated based upon the regular training dataset, is used to train the model to identify both in-D and OO-D elements, i.e., to classify an element extracted from a document as belonging to one of in-D or OO-D class instead of just in-D class. An ML model that is to be used for classifying elements extracted from unstructured documents is trained using both the regular training dataset and the augmented training dataset. For an element extracted from an unstructured document undergoing information extraction processing, an ML model trained according to the various techniques described herein is able to classify the extracted element as belonging to an in-D class or to the OO-D class. In certain implementations, as a result of the training, the ML model learns to perform this classification based upon different visual cues and attributes associated with an extracted element such as the location of the element within the document, the color of the element, the font of the element, the font size, the style of the element, the orientation of the element, and other visual attributes as well as the text itself, including the definition, meaning, tone, semantics, context, and so on.

Existing information extraction models are trained by first identifying a finite number of in-D classes. For example, a model trained to extract information from ID cards may have in-D classes for name, address, and organization. A set of training data is then developed for those identified in-D classes. The training data includes training documents that may be images, PDFs, word processing files, or any other suitable unstructured document type. As part of the training pipeline, the input training documents are preprocessed to improve resolution, contrast, or alignment. Following preprocessing, documents are input to an optical character recognition ("OCR") engine, which detects text portions (or elements, in general), classifies text direction (orientation), and then recognizes the text portions. The OCR engine outputs the recognized text, along with a corresponding bounding box or region identifying the boundaries of the text portion. The recognized text (i.e., the element) and the corresponding bounding box or region are then annotated by manually (e.g., by human beings) labeling the content portions or using an automated technique like pseudo-labeling. In pseudo-labeling, an ML model is trained to label an unlabeled dataset using a manually-labeled dataset as training data.

The labeled and annotated training dataset is then used to train the information extraction ML model. The ML model is trained to classify the content portions into one or more in-D classes. Classifications may be based on a confidence threshold. For example, the information extraction ML model may make classifications with an associated probability of accuracy or similar measure of statistical confidence. If the measure of statistical confidence meets a pre-set confidence threshold, the recognized text will be classified as one of the in-D classes.

As indicated in the Background section, a combination of OCR and ML techniques are currently used to extract and classify information from unstructured documents. These techniques use OCR to extract multiple elements from an input unstructured document for which information extraction is to be performed. The multiple elements that are extracted may include text portions such as words, lines, formatting marks, graphics, etc. found in the input unstructured document. A trained ML model is then configured to classify each extracted element as belonging to one (or more) of a fixed number of in-D classes for which the ML is trained.

In ML, an in-D class refers to a category or class of data that is similar to the examples in the training dataset that a model was trained on. It is a class of data that is within the distribution of the training data. Categories or classes that are contained in the training dataset that is used to train an ML model are referred to in-D classes. An element that is extracted from a document and categorized as belonging to an in-D class is referred to as an in-D element.

An element that does not belong to any of the in-D classes is referred to as an OO-D element. Such an element differs from the training data distribution, meaning it does not belong to any of the classes or categories that the model is trained to classify. The extent of the differentiation between in-D and OO-D elements may vary among embodiments, but importantly, OO-D elements typically do not capture the semantic meaning that an information extraction aims to capture. Moreover, OO-D elements may occur infrequently in the training data, and therefore cannot be predicted with sufficient consistency.

Existing information extraction ML models nay misclassify elements extracted from an unstructured document as belonging to one of the in-D classes that the ML model is trained on, when in reality those elements do not belong to any of the in-D classes. For example, where a model is trained to classify images of cats or dogs, if the model is fed an image of a horse, the model should classify that image as something other than a cat or dog. The horse is an example of an OO-D element. An ML model incorrectly categorizing the horse image as a dog or a cat is an example of a false positive classification. A high number of false-positives due to erroneous in-D classifications by the ML model reduces the accuracy of the ML model and also degrades the experience of users using the model.

Several different reasons lead to these misclassifications. For certain types of unstructured documents, the same element (e.g., a word) located at two distinct positions within the document may need to be classified differently. For example, a word located in a first position in the document is to be classified as belonging as in-D class, while the same word located in a second position in the document should be classified as belonging to the OO-D class. Some existing ML models may be incapable of doing this. They may instead classify both instances of the word in the two locations as belonging to an in-D class, leading to a false positive for the word instance located in the second position. An ML model trained according to the techniques described in this disclosure does not suffer from this defect. Due to the novel training techniques described herein, the trained ML model is able to properly classify the word in the first location as belonging to an in-D class and classify the second instance of the word in the second location as belonging to the OO-D class.

Other use cases where some currently used ML models misclassify content is where an unstructured document contains content that is to be treated as noise for that document. The noise can be in the form of handwritten text markups, stamps (e.g., a rubber stamp), stickers, stray marks, watermarks (e.g., text in document background), tears, errors, or other variations. Current ML models may incorrectly classify this content as belonging to an in-D class, resulting in false positives. This is because some current OCR and ML models are often trained to achieve high accuracy with good recall score for text detection. Recall, as used herein, refers to the proportion of true positives correctly identified by an ML model. In the context of OCR, a true positive result is a correct identification of text. Hence, the OCR will tend to detect all text, including the noise text, in a document irrespective of position and type of the text. In such scenario, current ML models tend to classify these noisy words as one of the in-D classes that the model is trained with, thereby incurring false positives. An ML model trained according to the novel techniques described in this disclosure may be able to properly classify the noise content in an unstructured document as properly belonging to the OO-D class instead of an in-D class.

Existing techniques for classifying OO-D elements are not robust and tend to fail in cases where the model is faced with classifying elements with properties similar to in-D elements based on their text, position, appearance, and other characteristics. Even though the model may exhibit great accuracy with detection and classification of in-D words, the false positives associated with misclassified OO-D elements cause the in-D class score to go down and also degrade customer experience. ML models trained according to the techniques described in this disclosure may not suffer from this defect. These models are able to properly classify elements in an unstructured document that are in fact OO-D elements as properly belonging to the OO-D class instead of an in-D class. This increases the overall accuracy of the model and enhances user experience.

Some existing systems use ML models that can classify content as belonging to an in-D class or the OO-D class do so using distance-based methods. Per these techniques, an extracted element is detected as an OO-D element depending upon how far the element is from the in-D data used for training the model. These models however tend to fall short of the desired accuracy, particularly when where the ML model must classify OO-D elements that are similar in appearance to or close in appearance to in-D elements. These models, for example, cannot differentiate and provide different classifications for the same text/element with identical visual and text features as in the in-D data, based upon the position and appearance of the element within a document.

In certain implementations, the novel training techniques described in this disclosure include training a model using both a regular training dataset and an augment training dataset that is generated using the regular training dataset. The regular training dataset is used to train an ML model to identify in-D elements, i.e., to classify an element extracted from a document as belonging to one of the in-D classes contained in the regular training dataset. The augmented training dataset, which is generated based upon the regular training dataset, is used specifically to train the model to identify both in-D and OO-D elements, i.e., to classify in-D elements in the augmented dataset as in-D and to classify augmented elements as belonging to the OO-D class instead of to an in-D class.

In certain embodiments, the regular training dataset comprises multiple training datapoints (referred to as "regular training datapoints"). Each regular training datapoint includes two parts: (a) an unstructured document (e.g., an image) comprising one or more elements, and (b) annotation information for that unstructured document where the annotation information includes ground truth information regarding the in-D classes for elements in that unstructured document. For example, a particular set of regular training datapoint comprises: (a) a particular training unstructured document containing a set of one or more elements, and (b) annotation information indicative of the set of one or more elements contained in the particular training unstructured document. For each element in the set of elements, the annotation information is further indicative of the location or position of the element within the document and an in-D class to which the element belongs. The regular training dataset is used to train an ML model to identify in-D elements in unstructured documents undergoing information extraction processing.

In certain implementations, an augmented training dataset is generated from the regular training dataset. The augmented training dataset comprises a set of training datapoints (referred to as augmented training datapoints). An augmented training datapoint in the augmented training dataset may be generated based upon one or multiple regular training datapoints in the regular training dataset. Each set of augmented training datapoints in the augmented training dataset comprises: (a) an augmented unstructured document, and (b) annotation information for that augmented unstructured document where the annotation information includes ground truth information regarding one or more elements copied from regular training datapoints that are to be classified as belonging to the in-D class and one or more augmented elements that are to be classified as belonging to the OO-D class. For example, a particular set of augmented training datapoints comprises: (a) a particular training unstructured document containing at least one element that is to be considered an OO-D element, and (b) annotation information indicative of, for each element in the document that is to be considered an OO-D element, information indicative of the location or position of the element within the document, and information indicating that the element is to be classified as belonging to an OO-D.

Various different training data generation techniques are used to generate the augmented training dataset from the regular training dataset. In general, identification of or generation and placement of augmented content is based on known characteristics of the type of document. For example, a boarding pass document may have OO-D elements like markings and words made using rubber stamps, whereas a check or receipt may include an OO-D watermark. In order to train the ML in congruence with the expected types of input documents, document metadata may be used. Document metadata can be used to identify characteristics of input documents, and from those characteristics, the most effective augmentation technique(s) can be chosen. This process can be manual, using e.g., user input, or automatic. For example, document metadata about boarding passes may include information about the layout of the text, spacing, colors, fonts, etc. found among the particular boarding passes of interest. From the metadata, characteristics of the document can be identified and from those characteristics, one or more augmentation techniques and the elements to which they will be applied can be chosen. For example, the metadata about boarding passes can be used to identify or generate elements that are likely to contain rubber stamps based on the relative locations and spacing of other elements and the graphical augmentation technique, described below, can be used accordingly.

Augmentation can be either online or offline. In offline training, augmentation is performed prior to training, whereas in online augmentation, augmentation is performed "on the fly," during training. For example, a pre-trained ML model can be generated by developing an augmented training dataset from a regular dataset and then training the ML model to a desired level of performance. The parameters defining the model are fixed. In contrast, an online ML model may be pre-trained to some extent, but the training process continues as the ML model operates. The ML model, during online augmentation, may continue to receive augmented datapoints which may result in changes to the ML model's defining parameters.

Augmentation techniques include "non-additive" techniques and "additive" techniques. The augmented training dataset can include augmented training datapoints that are generated using non-additive techniques, additive techniques, or a combination of additive and non-additive techniques. For example, the augmented training dataset may include: (1) a first augmented training datapoint that is generated using a non-additive technique; (2) a second augmented training datapoint that is generated using an additive technique; (3) a third augmented training datapoint that is generated using both a non-additive technique and an additive technique; and so on.

In the use case where an augmented training datapoint is generated using a non-additive technique, an augmented training document for the augmented training datapoint is generated based upon a document included in the regular training dataset. In certain implementations, the augmented training document is a copy of a document included in the regular training dataset. A particular region within the augmented training document is then identified, where the elements located within the region are to be treated as OO-D elements. For example, a region of the augmented training document that contains content that is to be treated as noise content may be identified. Annotation information is then generated for the augmented training document, where the annotation information includes information indicating that any elements located within the region in the augmented document belong to the OO-D class. Unlike the additive techniques described below, no elements or content is added to the augmented training document.

Non-additive techniques are very useful for identifying noise content that is to be treated as OO-D elements. For example, the particular region of the document that is identified may be a region that contains noise content. The region thus identifies boundaries such that an element located within the boundary is to be considered as an OO-D element. When such augmented training dataset is used to train a model, the model learns to identify and classify any elements located in the particular region of a document as OO-D elements.

In an additive technique, content (or an element) is generated. A location within the augmented training document is then identified for placing the generated element. The generated element is then placed in the augmented training document in the identified location. Annotation data is then generated for the augmented training document that indicates that the added element is an OO-D element, i.e., belongs to the OO-D class.

In certain implementations, using an additive technique, an augmented unstructured document is generated by taking an unstructured document associated with a regular training datapoint and adding augmented content to that unstructured document. The augmented content that is added can include one or more augmented elements. The augmented elements may be placed in different locations within the augmented unstructured document, where the locations correspond to locations where content is to be considered as OO-D. Annotation information is then generated for the augmented training document that is generated, where the annotation information includes information indicative of the augmented elements added to the document. For each augmented element added to the document, the annotation information for the augmented training unstructured document includes information indicative of the position of the augmented element within the augmented training document, and an indication that the element belongs to the OO-D class. The ML model is then trained using both the regular training dataset and the augmented training dataset. This trains the ML model to classify content (e.g., elements) extracted from an unstructured document as one of an in-D class or the OO-D class.

Additive augmentation of the training data is accomplished using a variety of techniques, of which several examples will be provided herein. In an additive technique, different methods may be used to generate the element and also to determine where within the augmented training document the generated element is to be placed. The additive techniques disclosed herein take advantage of the cross-modal nature of visually-rich input documents by adding augmentations including a combination of textual, visual, and layout information.

In general, for a given document included in the regular training data, additive augmentation is performed by generating an element, identifying a location within the given document for placing the element, and placing the element in the identified location within the document. As mentioned above, annotation data is then generated for the document that indicates that the added element belongs to the OO-D class.

Numerous additive augmentation techniques may be used to train the ML models to accord with the wide variety of document types, and the correspondingly wide variety of OOD elements that may be found outside the bounds of well-curated training data. Among other possibilities, some example additive augmentation techniques that will be described herein include text augmentation, image augmentation, and graphical augmentation. Different additive augmentation techniques may be more or less appropriate for different document types according to the metadata and corresponding document characteristics that the metadata encodes.

In text augmentation, new words or other textual elements are introduced into specified content portions of documents. Text may come from a variety of sources. The text augmentation techniques will be discussed in detail in FIGS. 12-17 and the accompanying text. In one example text augmentation technique, text from in-D elements from among the regular training documents are used to generate the OO-D element. A word may be selected randomly from among the in-D elements found in the document undergoing augmentation or may come from another document in the regular training dataset. An augmented document is then created by placing the generated OO-D element based on the first document's empty regions or using the metadata associated with the document. Identification of empty regions is based on both image processing techniques, image thresholding and connected component analysis, or on advanced deep learning techniques such as segmentation or texture analysis.

In another text augmentation technique, a word may be selected randomly from an in-D word from among the regular training documents. The randomly selected word is then encoded, using a word embedding model, into an embedding space. A similarity measure is used to select another word in the embedding space which is then used to generate the element. An augmented document is created by placing the generated element based on the first document or using the metadata associated with the document. In some examples, a synonym of the randomly selected word may be used instead of a similar word from the embedding space.

In another text augmentation technique, characters or words may be selected randomly from a dictionary or randomly generated using a pseudo-random number generator, which are used to generate the element. For example, a random word can be selected from an English dictionary or similar reference dataset. In another example, a pseudo-random number generator can be used to generate random strings of characters including whitespace, thus generating random nonsense words or phrase. An augmented document is created by placing the generated element based on the first document or using the metadata associated with the document.

In another text augmentation technique, document metadata associated with an element from the regular training dataset is used to identify an element (i.e., a word) having a similar context, based on the metadata, to generate the element. For instance, a word identified as an email in metadata may result in generation of an element that is also an email. An augmented document is created by placing the generated element based on the first document or using the metadata associated with the document.

One skilled in the art will note that various other methods of text augmentation are possible. For example, other text augmentation techniques such as a character swap augmenter and a backtranslation augmenter may be used. Additionally, generated elements may be altered to include various visually distinctive properties. For example, the font, color, style, or size of text or elements introduced using the above-described text augmentation techniques, can be added or updated. In some cases, such augmentation is referred to as image augmentation.

Yet another additive augmentation technique, known as graphical augmentation, involves using an image rendering tool can add new graphical elements such as QR codes, holograms, rubber stamps, or watermarks onto documents from the regular training dataset. As with text augmentation, augmented document is created by placing the generated element based on the first document or using the metadata associated with the document.

The teachings described in this disclosure may be offered as services by a cloud services provider (CSP). A CSP may offer one or more cloud services to subscribing customers on demand (e.g., via a subscription model) using infrastructure provided by the CSP. The CSP-provided infrastructure is sometimes referred to as cloud infrastructure or cloud services provider infrastructure (CSPI). The CSPI provided by a CSP may include a collection of services with prebuilt ML models that enable users apply ML models to applications and business operations. For example, the ML models can be custom-trained for more accurate business results. Thus, the CSPI makes it possible for users to easily add ML capabilities to their applications.

The information extraction functionality described herein may be offered as a cloud service by a CSP. The information extraction cloud service can be subscribed to by a customer as part of the suite of services offered by the CSP. Using the subscribed information extraction cloud service, users have the ability to provide input documents to the service and have information extracted from documents using the techniques described in the present disclosure.

The techniques described in this disclosure present several technical improvements over existing techniques for users of CSPI. Any performance improvement to the accuracy of an information extraction model contributes to the performance of any downstream automated, robotic process hosted in a CSPI which relies on the information extracted from unstructured document images, including applications that depend on documents such as historical documents, receipts, orders and credit notes. The ability to train ML models to distinguish background or noise text and more accurately classify such noise as OO-D may improve the performance of any ML algorithm that performs a classification step. For instance, adding OO-D classification capability to the model may reduce false positives which in turn improve model accuracy and/or precision. In addition, a CSPI users of cloud-hosted information extraction tools often desire to extract information from a diversity of documents. Documents in the real world may not conform to the appearance of an idealized training data set and may contain background text like watermarks, handwritten text, rubber and electronic stamps. Such improvements lend themselves to gains for CSPI-hosted applications including examples like more efficient archiving, faster compliance checking, and so on. Moreover, the above techniques scale not only to documents in English language but across documents of any language, enabling the models to robustly support a multi-lingual setting. Additionally, implicitly training with augmented text also has an impact of regularization, which will help ensure that the ML model is not overfitted to the training data.

FIGS. 1-21 and the accompanying description below describe examples and embodiments related to the improved techniques described in this disclosure. FIGS. 22-25 depict examples of architectures for implementing cloud infrastructures for providing one or more cloud services, where the infrastructures may incorporate teachings described herein.

Out of Distribution Element Detection for Information Extraction

FIG. 1 depicts a simplified block diagram of an example content extraction system 100 for information extraction, according to certain embodiments. The system 100 includes a trained information extraction model 135 that may be trained using the techniques of the present disclosure for classification of OO-D elements.

The information extraction process begins with a document 105 input to the content extraction system 100. The document 105 can be any type of document including unstructured, semi-structured, or structured documents. However, the techniques of the present disclosure are configured to be most effective when used in concert with unstructured documents since they lack the inherent machine-readability of semi-structured or structured documents.

As used herein, a structured document refers to a digital file containing data organized in a consistent, predefined format or schema, enabling efficient information extraction and machine-readability. As used herein, a semi-structured document refers to a digital file containing data with some consistent organization or patterns, but not strictly adhering to a predefined schema, possibly necessitating additional processing for effective information extraction. As used herein, an unstructured document refers to a digital file containing data with no predefined organization or schema, generally requiring the application of information extraction technologies to extract relevant information.

The document 105 can be a PDF, image file, text file, word processing file, spreadsheet file, presentation file, markup language file, vector graphic file, or compressed archive file, among other possible filetypes. Possible image file formats include, among others, JPEGs, PNGs, GIFs, BMPs, TIFFs, and SVGs. One of ordinary skill in the art will recognize that these enumerations are non-limiting and that a large variety of unstructured documents are used in modern computing, any of which would be amenable to the techniques described herein.

The document 105 is received by a preprocessor 110. The document 105 is preprocessed to improve resolution, contrast, or alignment. For example, the document 105 may be a scan or photograph of a photocopy that is inadvertently rotated, contains artifacts due to photocopying, and/or has poor contrast due to photocopying. Preprocessor 110 may be configured to rotate the document into a standardized alignment, remove photocopying artifacts, or improve contrast, among other preprocessing steps. For instance, in certain embodiments, preprocessor can perform operations including binarization, noise reduction, skew correction, morphological operations, despeckling, dilation, erosion, image scaling, thresholding, region of interest detection, segmentation, or image inversion, among others.

The preprocessed document 105 is input to an OCR system 115. OCR system 115 may include a text detection subsystem 120 which detects text portions (or elements, in general). An element, as detected by an OCR system or other component of content extraction system 100 includes information that could be character, set of characters, word, set of words, graphic, or combinations thereof. OCR system 115 may include direction classifier subsystem 125 that classifies text direction (orientation). OCR system 115 may include text recognition subsystem 130 that recognizes the text portions. The OCR system 115 depicted in FIG. 1 is an example and may include other components in certain implementations.

OCR system 115 outputs the recognized text (i.e, elements) along with a corresponding bounding box or region identifying the boundaries of the recognized element. The recognized element is input to the trained information extraction model 135. The trained information extraction model 135 may be trained using the techniques of the present disclosure to classify the recognized element as in-D or OO-D. The trained information extraction model 135 is configured to output extracted content 140. The extracted content 140 may be classified as in-D or OO-D. In some examples, the OO-D content is discarded and may not be included with the output extracted content 140. In traditional information extraction systems, the recognized OO-D content would have been recognized and misclassified as in-D. However, its classification as OO-D using the techniques of the present disclosure reduces these false positives and allows the system 100 to filter such elements from the output.

Figure 2:
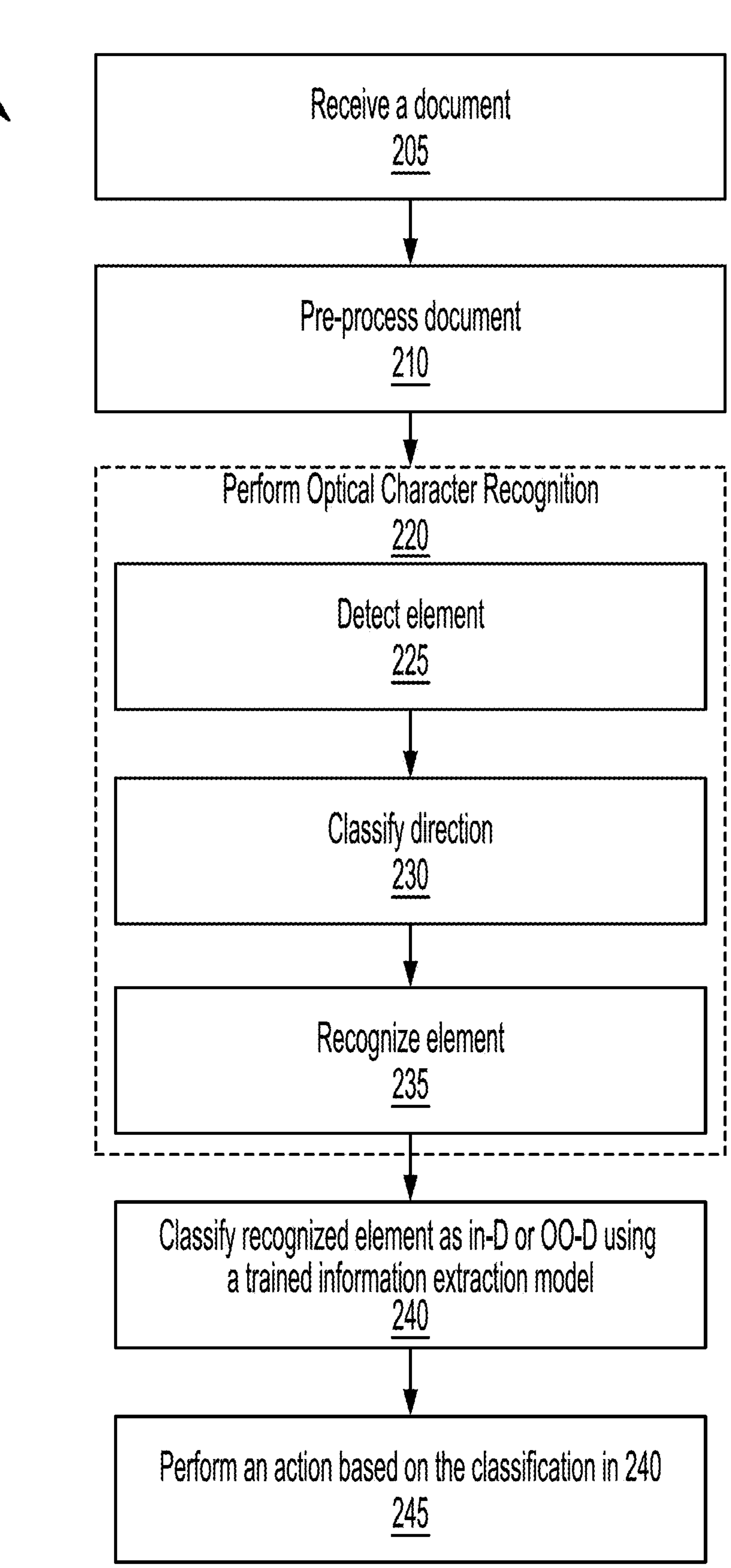
FIG. 2 depicts a simplified flowchart showing a method for OO-D element detection for information extraction, according to certain embodiments.

FIG. 2 depicts a simplified flowchart showing a method 200 for OO-D element detection for information extraction, according to certain embodiments. The method depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the processing may be performed in some different order, or some steps may also be performed in parallel.

One or more of the processing steps depicted herein may be performed or facilitated by an implementation of the content extraction system 100. In 205, a document is received by the content extraction system 100. In a certain embodiment, the document is an unstructured document that may be a PDF, image file, text file, word processing file, spreadsheet file, presentation file, markup language file, vector graphic file, or compressed archive file, among other possible filetypes. Some embodiments may receive custom or proprietary binary files for which the content extraction system 100 may be specifically configured for certain applications. For instance, in models that have been trained for domain-specific document types, the domain-specific documents may be in a unique proprietary format.

In 210, the document is pre-processed. For example, the document may be preprocessed to improve resolution, contrast, or alignment. For example, the document received in 205 may come from a diversity of sources with varying sizes, orientations, color schemes, etc. The preprocessing step can rotate the document into a standardized alignment, enlarge/reduce documents to a common size suitable for processing, or adjust color schemes, among other preprocessing steps. In cases where the document is received in a non-image format that is not suitable for processing by an Optical Character Recognition ("OCR") system, during the preprocessing step, the document can be exported or converted to an image or PDF file that can be processed by the OCR system.

The dotted box 220 includes the steps of Optical Character Recognition ("OCR") phase. At 225, an element (e.g., text) is detected within the document received at 205. As stated above, an element, as detected by an OCR system or other component of content extraction system 100 includes information that could be character, set of characters, word, set of words, graphic, or combinations thereof. At 230, the element direction (orientation) is identified/classified. At 235, the element is recognized. Recognition involves analyzing the preprocessed image data to convert text characters into a machine-readable format using a combination of algorithms and ML techniques.

At 240, the recognized element is classified as in-D or OO-D using a trained information extraction model, e.g., the trained information extraction model 135 from example content extraction system 100, using the techniques of the present disclosure. For example, as will be described in detail below, an augmented training dataset may be generated from a regular training dataset that includes augmented content for training an information extraction model to accurately classify the augmented elements as OO-D content, rather than misclassify them as in-D (resulting in a false positive). The model can be trained using both the regular and augmented training datasets to enable the accurate classification of OO-D elements.

At 245, an action is performed based on the classification performed in 240. For instance, content extraction system 100 may execute a command to cause the elements classified as in-D to be output from the content extraction system 100 and the OO-D elements to be discarded. In another embodiment, the OO-D elements may be output alongside the classified in-D elements. The output may include confidence for each of the classifications. Each in-D class may include a confidence score and the OO-D class may have a confidence score or metric. In some examples, each recognized element may have an associated confidence score included in the output. The output may be provided to a display device communicatively coupled with the content extraction system 100. The content extraction system 100 may automatically generate a notification, alert, or message containing information about the classification performed in 240.

Figure 3:
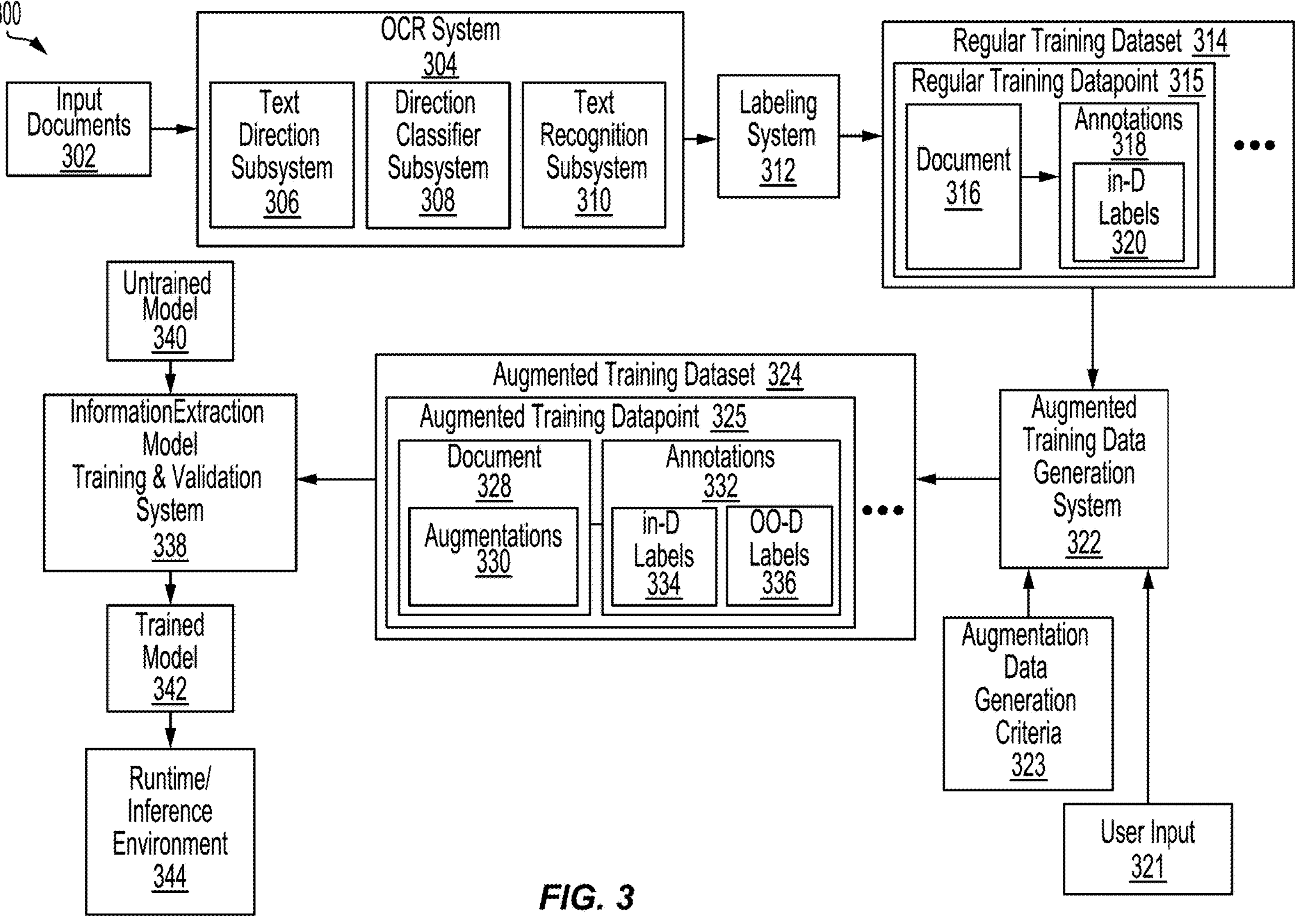
FIG. 3 depicts a simplified block diagram of an example system for generating an augmented training dataset, according to certain embodiments.

FIG. 3 depicts a simplified block diagram of an example system 300 for generating an augmented training dataset, according to certain embodiments. Augmented training dataset generating begins with input documents 302. Input documents 302 include one or more documents. System 300 can receive a similar diversity of unstructured documents as with content extraction system 100 including PDFs, image files, text files, word processing files, spreadsheet files, presentation files, markup language files, vector graphic files, or compressed archive files, among other possible filetypes.

OCR system 304 includes components similar to OCR system 115 including at least a text detection subsystem 306, direction classifier subsystem 308, and text recognition subsystem 310. OCR system 304 may be the same OCR system used in content extraction system 100 or system 300 may have a distinct OCR system 304. The OCR system 304 outputs the recognized text, along with a corresponding bounding box or region identifying the boundaries of the text portion which may be needed for accurately preserving the context and layout of the original document.

Recognized text from OCR system 304 is received by labeling system 312. Labeling system 312 may be a manual process in which a standard annotation tool is used to manually annotate documents. Annotations, as used herein, refer to the process of adding labels or tags to the recognized elements (e.g., text) to identify specific information or features for the purpose of training an ML model. In certain embodiments, annotations may include identification of one or more in-D classes. The techniques of the present disclosure involve annotating certain elements added (augmenting the documents) and identifying them as OO-D elements.

The annotation may be stored in a separate file or database that is linked to the original file, allowing the annotated data to be easily accessed and used for training or evaluation of information extraction models without modifying the original document. In some examples, the annotation can be stored in the same file as the input document 302. For example, a format such as XML or JSON can be used to allow the annotated text and associated metadata to be structured and easily parsed by ML algorithms. In such cases, the annotation is typically added as metadata within the document or as an overlay on the original text, which can be displayed or hidden as needed.

In some embodiments, labeling system 312 may include a pseudo-labeling component. In pseudo-labeling, an ML model is trained to label an unlabeled dataset using a manually-labeled dataset as training data. Thus, in generating the training data for the pseudo-labeler, a subset of all examples included among input documents 302 are annotated using the manual labeling approach previously mentioned. The subset is used to train an ML model that is a component of the labeling system 312. The pseudo-labeling component may then automatically generate annotations for the remainder of the examples.

The input documents 302 that have been processed by OCR system 304 and labeled (annotated) by labeling system 312 constitute the regular training dataset 314. The regular training dataset 314 includes one or more regular training datapoints 315, depicted in FIG. 3 using a " . . . " symbol inside regular training dataset 314. Each regular training datapoint 315 (sometimes referred to as examples, instances, samples, records, etc.) includes a document 316. The document 316 was input to system 300 as one document from among the input documents 302. Each document 316 includes one or more annotations 318 added by labeling system 312 associated with recognized elements, indicated in FIG. 3 using a horizontal line. The one or more annotations 318 each include one or more in-D labels 320. For example, a given annotation may be labeled as more than one in-D class.

The regular training dataset 314 is input to an augmented training data generation system 322 that will be discussed in detail in FIG. 7 and the accompanying description. Augmented training data generation system 322 maps each regular training datapoint 315 making up regular training dataset 314 to an augmented training datapoint 325, which make up the augmented training dataset 324. The augmented training dataset 324 is then used to train an ML model to accurately distinguish between in-D and OO-D elements. The operation of augmented training data generation system 322 is configured based upon user input 321 and augmentation data generation criteria 323.

User input 321 may include manual configuration of the augmented training data generation system 322 using a suitable user interface, parameterized configuration using environment variables or configuration files, or modifications to program code. For example, user input 321 can include information about annotating OO-D elements, data sources and formats included in the regular training dataset, information about document metadata and associated characteristics, configuration for preprocessing steps such as data cleaning, normalization, and tokenization, criteria for selecting and filtering data, such as relevance and quality, and model evaluation metrics and performance thresholds.

Augmentation data generation criteria 323 includes configuration information that reflects the data-dependency of the augmentation techniques disclosed herein. For instance, the criteria used for selection and placement of OO-D elements may be derived from a knowledge base. The knowledge base comprises metadata associated with each document or with a particular type of document. The latter metadata can be used when the type of document is identified by the augmented training data generation system 322. For example, as will be discussed, augmented training data generation system 322 may include document structure and metadata analysis system 718 that can identify the document type and access a corresponding set of metadata.

Augmented training data generation system 322 maps and outputs each regular training datapoint 315 making up regular training dataset 314 to an augmented training datapoint 325. The set of mapped and output augmented training datapoint 325 constitute augmented training dataset 324. As with regular training dataset 314, one or more augmented training datapoints 325 are depicted using a " . . . " symbol. Each augmented training datapoint 325 includes a document 328. The document 328 was input to system 300 as one document from among the input documents 302, processed by OCR system 304, and annotated by labeling system 312. In some embodiments, prior to processing by the augmented training data generation system 322, a copy of document 316 is made to produce document 328, prior to augmentation. Each document 328 includes one or more annotations 318 added by labeling system 312 associated with recognized elements, indicated in FIG. 3 using a horizontal line. The one or more annotations 318 each include one or more in-D labels 334.

Differentiating each augmented training datapoint 325 from each regular training datapoint 315 involves the augmentations 330 added to document 328. The augmentations 330, added to document 327 by the augmented training data generation system 322, are selected, configured, generated, and added to train untrained ML model 340 to accurately identify OO-D elements and reduce false positive identifications of in-D elements. The augmentations 330 are added using a variety of techniques that are described in detail in FIGS. 8-21 and the accompanying descriptions. The particular technique used for a given augmentation 330 may be determined by user input 321 or augmentation data generation criteria 323, among other determining factors. A given document 328 can have one or more augmentations 330. In addition to augmentations 330, OO-D labels 336 are added to the annotations 332 associated with the augmentations 330. Thus, the annotations 332 of augmented training dataset 324 include both in-D labels 334 (associated with the text identified by OCR system 304 and labeled by labeling system 312) and OO-D labels 336 (associated with the augmentations 330 and annotations added by the augmented training data generation system 322).

Augmented training dataset 324 is input to information extraction model training and validation system 338. Information extraction model training and validation system 338 initially includes the untrained model 340. Untrained model 340 is trained using the augmented training dataset 324 to produce the trained model 342. Information extraction model training and validation system 338 includes components for training untrained model 340 using the augmented training dataset 324 as well as for validating the effectiveness of the training. For example, information extraction model training and validation system 338 may determine that model accuracy has not sufficiently improved based on the augmented training dataset 324 received thus far and may cause additional augmented training datapoints 325 to be added to the augmented training dataset 314 prior to commencing additional training to improve model accuracy. Note that augmented training dataset 324 includes annotations for both in-D and OO-D elements and thus model accuracy is evaluated by information extraction model training and validation system 338 for accuracy in classifying both in-D and OO-D elements.

The techniques of the present disclosure are applicable to a variety of ML models used for information extraction. For example, the untrained ML model 342 may include one or more of the following types of ML models commonly used for information extraction: conditional random fields ("CRF"), long short-term memory ("LSTM"), bidirectional LSTM ("BLSTM"), support vector machine ("SVM"), naive Bayes, decision tree, random forest, convolutional neural network ("CNN"), transformer (also known as "BERT", "GPT", or "ROBERTa"), gradient boosting, hidden Markov model ("HMM"), maximum entropy Markov model ("MEMM"), recurrent neural network ("RNN"), multi-layer perceptron ("MLP"), deep neural network ("DNN"), bidirectional LSTM with CRF ("BILSTM-CRF"), adaptive boosting ("AdaBoost"), extreme gradient boosting ("XGBoost"), self-attention network, sequence to sequence model ("Seq2Seq"), graph neural network ("GNN"), or a combination thereof. This list of applicable models is non-limiting and a person of ordinary skill in the art will recognize that the techniques of the present disclosure may be used with other ML models, approaches, and algorithms.

The trained model 342 may be used as part of a runtime/inference environment 344. For example, the content extraction system 100 from FIG. 1 is an example of a runtime/inference environment 344, which includes trained information extraction model 135 that may be trained using the augmented training dataset 324 as described. Other runtime/inference environment 344 configurations and implementations are also possible. For example, the runtime/inference environment 344 may be offered as a cloud service by a CSP. The runtime/inference environment 344 can be subscribed to by a customer as part of the suite of services offered by the CSP. Using the subscribed runtime/inference environment 344, users may provide input documents to the environment 344 and have information extracted from documents using the techniques described in the present disclosure.

FIGS. 4A-D and FIGS. 5A-C depict illustrations of example documents from regular training datasets and augmented training datasets, according to certain embodiments. These figures are intended to introduce some of the concepts and appearances of the augmentation techniques that are described in detail in FIGS. 8-21 and the accompanying description.

Figures 4A, 4B:
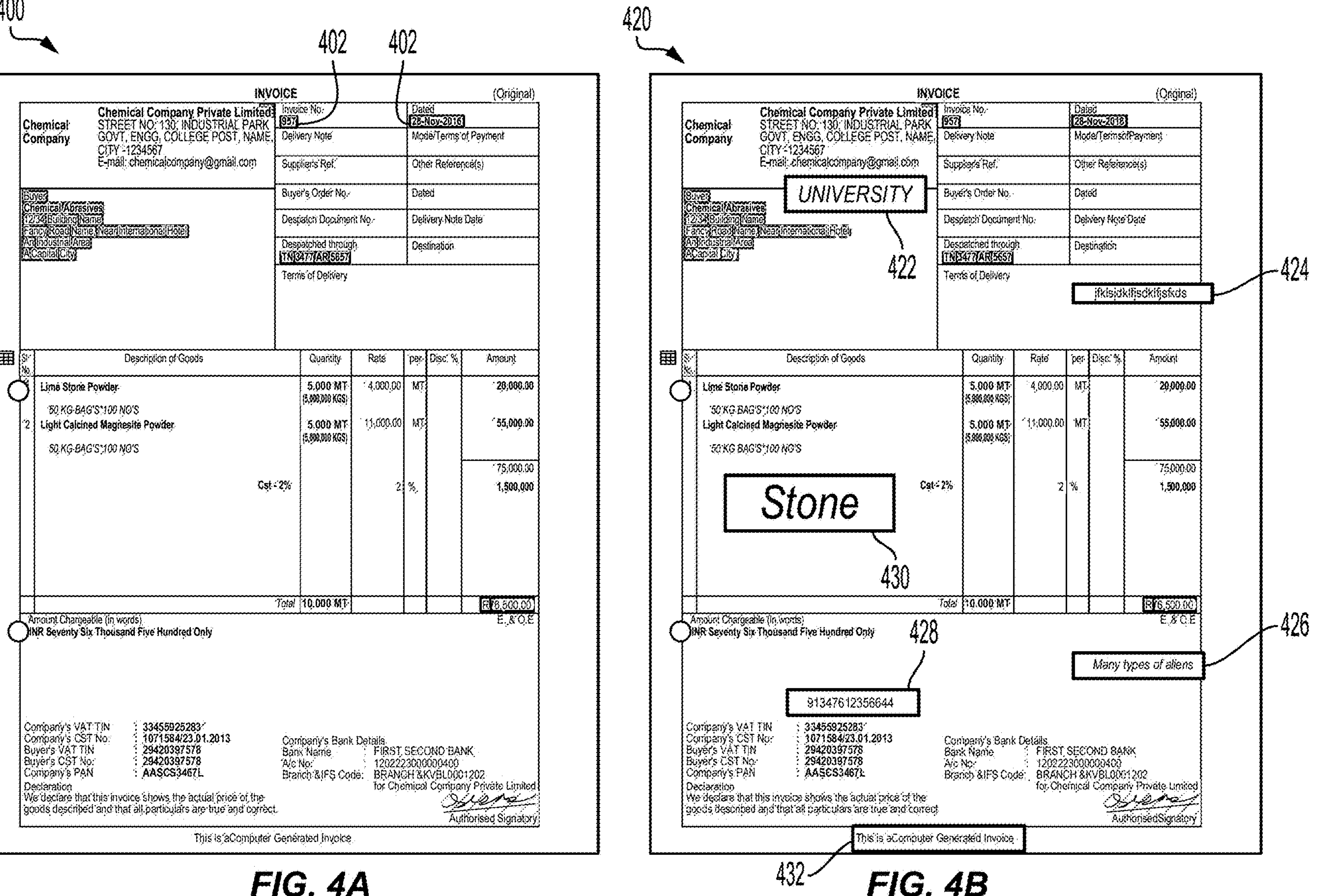

FIGS. 4A-4D depict example documents that are images or PDFs of invoices. FIG. 4A shows a document 400 with no augmentations. Unaugmented document 400 is shown with examples of recognized elements (i.e., text) output by an OCR system indicated with a bounding box identifying the boundaries of the recognized elements. For example, recognized elements 402 are the invoice number and invoice date fields, both shown inside a corresponding bounding box. In the interests of clarity, not all recognized elements are shown inside bounded regions or labeled. The elements shown in unaugmented document 400 are examples of in-D elements because they are similar to other examples that would be found in the training dataset that a model was trained on. In other words, FIG. 4A contains examples of elements that would be expected to be found in any given document making up the training data. These in-D elements can be annotated with labels indicating the in-D category or class of data that each would belong to, which is used to train an ML model.

FIG. 4B shows an augmented document 420. Augmented document 420 contains augmentations added using the techniques of the present disclosure that are examples of OO-D elements. Such elements do not belong to any of the in-D classes and thus do not belong to any of the in-D classes or categories that the model is trained to classify. The augmentation techniques listed here are described in detail in FIGS. 8-21 and the accompanying description. Augmentation 422 is an example of soft text augmentation and image augmentation. Augmentation 424 is an example of random text augmentation, using random characters. Augmentation 426 is another example of random text augmentation, using random words. Augmentation 428 is an example of contextual text augmentation and image augmentation. Augmentation 430 is an example of in-distribution text mining and image augmentation. Augmentations 422-430 are each an example of an additive augmentation techniques. Augmentation 432 is an example of non-additive augmentation. In a non-additive technique, a region is identified and labeled as OO-D, but no new elements are added. Each of these augmentations may be annotated with labels indicating that they should be classified as OO-D.

Figures 4C, 4D:
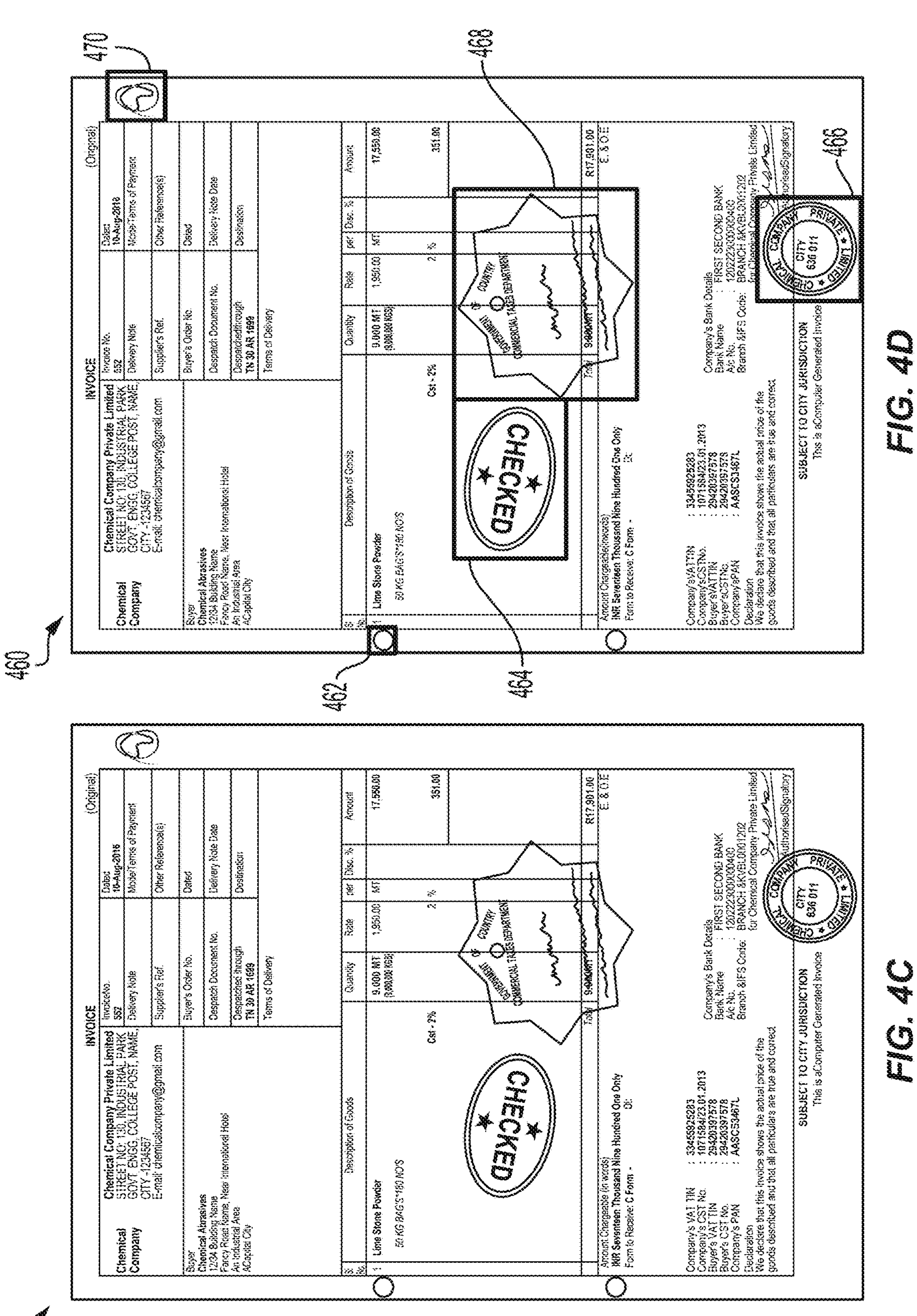

FIG. 4C shows an invoice document 440 that includes several OO-D elements. In FIG. 4D, document 460 shows document 440 with several of the OO-D elements identified with bounding boxes for illustrative purposes. For example, document 460 includes a copy of a hole punch 462, a first rubber stamp 464, a second rubber stamp 466, a third rubber stamp 468, and a stray mark 470. These OO-D elements are highlighted to give examples of OO-D elements that may be encountered but document 460 may contain other OO-D elements.

In some examples, document 440/460 may be provided as input to a content extraction system 100. The OCR system 115 may recognize as text all or some portion of each OO-D element. For example, the OCR system 115 may identify hole punch 462 or stray mark 470 as a letter or letters. Or OCR system 115 may recognize some or all of the words or letters contained in rubber stamps 464, 466, 468. Prior to the innovations of this disclosure, the recognized OO-D elements may be misclassified as in-D elements by an ML model trained using a regular training dataset. Augmentations like the ones illustrated in FIG. 4B are included in an augmented training dataset, which can be used to train an ML model to properly classify the OO-D elements in FIGS. 4C-D as OO-D.

FIGS. 5A-C depict example documents that are images or PDFs of airline boarding passes. FIG. 5A shows a document 500 with no augmentations. Unaugmented document 500 is shown with examples of recognized elements (i.e., text) output by an OCR system indicated with a bounding box identifying the boundaries of the recognized elements. For example, recognized text 502 includes the passenger's name and words from the document header shown inside a corresponding bounding box. In the interests of clarity, not all recognized elements are shown inside bounded regions or denoted as recognized. FIG. 5B shows document 530 with an OO-D element. Document 530 includes notice 532 that is an OO-D element that may not be labeled or included in a regular training dataset.

In FIG. 5C, document 560 shows document 530 augmented/annotated with several OO-D elements using additive augmentation techniques. Augmentation 562 is an example of soft text augmentation and image augmentation. Augmentation 564 is an example of random text augmentation, using random characters, and image augmentation. Augmentation 566 is an example of in-distribution text mining. Augmentation 568 is an example of contextual text augmentation and image augmentation. Augmented document 560 may be labeled with annotations by, for instance, augmented training data generation system 322. The annotations may indicate that the notice 532 as well as the augmentations 562-568 are OO-D elements. These annotated OO-D elements, both actual and augmented, can be included in an augmented training dataset, which can be used to train an ML model to properly classify the OO-D elements in FIGS. 5B-C as OO-D.

FIG. 6 depicts a simplified flowchart showing a method for generating an augmented training dataset from a regular training dataset, according to certain embodiments. The method depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the processing may be performed in some different order, or some steps may also be performed in parallel.

In certain embodiments, one or more of the processing steps depicted herein may be performed or facilitated by an implementation of the system 300 for generating an augmented training dataset. At 605, the system 300 can access a first training dataset (regular training dataset) provided for an ML model, the first training dataset comprising a first plurality of documents and annotation information for each document in the first plurality of document. The first training dataset may be generated using a process similar to the process discussed in FIG. 3 with regard to the generation of regular training dataset 314. The first training dataset may be stored or persisted in a suitable memory device for use in subsequent trainings or conversion into other formats (e.g., into an augmented training dataset). The system 300 accesses the first training dataset using, for example, a database query or command to copy or load the dataset from a filesystem location. The annotation information for each document in the first plurality of documents includes in-D labels corresponding to the class or category of elements recognized by an OCR system. At this stage, prior to generation of augmented training data, it is likely that the first plurality of documents contains some OO-D elements. However, they will not have been recognized or labeled as such, except perhaps inadvertently.

At 610, the system 300 can generate a second training dataset (augmented training dataset) based upon the first training dataset, the second training dataset comprising a second plurality of documents and annotation information for each document in the second plurality of documents. For instance, as shown in FIG. 3, augmented training data generation system 322 maps (performs a 1-to-1 operation on) each regular training datapoint 315 included in regular training dataset 314 to an augmented training datapoint 325. The collection of augmented training datapoints 325 mapped thusly is the augmented training dataset 324. At this stage, the second plurality of documents contains augmented and annotated OO-D elements using both additive and non-additive techniques. Thus, some of the OO-D elements that were present in the first plurality of documents, but which were not recognized or labeled as such, may be augmented and annotated as such using a non-additive augmentation technique. Similarly, additive augmentation techniques may be used to add new OO-D elements and to annotate and label them as such.

At 615, the system 300 can train the ML model using both the first training dataset and the second training dataset to generate a trained ML model. The ML model is thus trained using both unaugmented and augmented versions of each document making up the first training dataset and the second training dataset. Both training datasets include the same set of annotated in-D elements. The annotated OO-D elements in the second training dataset may result in improved accuracy when the trained model encounters OO-D elements in input documents.

Figure 7:
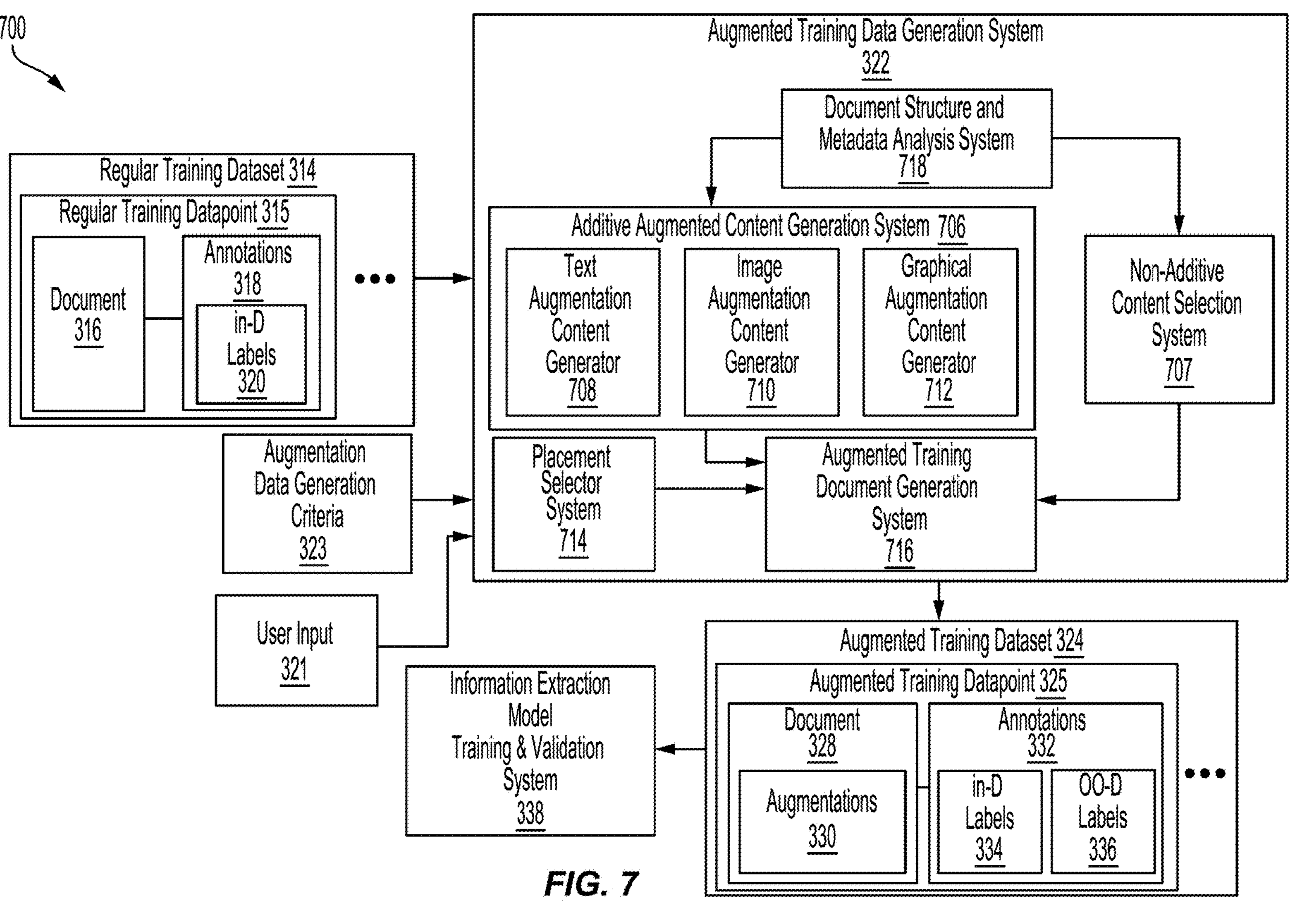
FIG. 7 depicts a simplified block diagram of an example system for generating augmented training data, according to certain embodiments.

FIG. 7 depicts a simplified block diagram of an example system for generating augmented training data, according to certain embodiments. FIG. 7 includes several elements from FIG. 3 and shows a detailed view of an example implementation of augmented training data generation system 322.

As discussed above, the regular training dataset 314 is input to an augmented training data generation system 322. Augmented training data generation system 322 maps each regular training datapoint 315 making up regular training dataset 314 to an augmented training datapoint 325, which make up the augmented training dataset 324. The augmented training dataset 324 is then used to train an ML model to accurately classify OO-D elements using information extraction model training and validation system 338. The operation of augmented training data generation system 322 is configured based upon user input 321 and augmentation data generation criteria 323.

The regular training dataset 314 includes one or more regular training datapoints 315, depicted in FIG. 3 using a " . . . " symbol inside regular training dataset 314. Each regular training datapoint 315 (sometimes referred to as examples, instances, samples, records, etc.) includes a document 316. The document 316 was input to system 300 as one document from among the input documents 302. Each document 316 includes one or more annotations 318 added by labeling system 312 associated with recognized elements, indicated in FIG. 3 using a horizontal line. The one or more annotations 318 each include one or more in-D labels 320.

Augmented training data generation system 322 maps and outputs each regular training datapoint 315 making up regular training dataset 314 to an augmented training datapoint 325. The set of mapped and output augmented training datapoint 325 constitute augmented training dataset 324. As with regular training dataset 314, one or more augmented training datapoints 325 are depicted using a " . . . " symbol. Each augmented training datapoint 325 includes a document 328. The document 328 was input to system 300 as one document from among the input documents 302, processed by OCR system 304, and annotated by labeling system 312. Each document 328 includes one or more annotations 318 added by labeling system 312 associated with recognized elements, indicated in FIG. 3 using a horizontal line. The one or more annotations 318 each include one or more in-D labels 334.

Augmented training data generation system 322 includes components for augmenting documents using additive and non-additive techniques, and for annotating/labeling those augmentations. Upon receipt of a document 316 for augmentation, the process begins with the document structure and metadata analysis system 718. Document structure and metadata analysis system 718 can read metadata from the input document and, in concert with the augmentation data generation criteria 323 and user input 321, determine one or more appropriate methods of augmentation for document 316.

User input 321 may include manual configurations relating to augmentation techniques. Likewise, augmentation data generation criteria 323 includes configuration information that reflects the data-dependency of the augmentation techniques disclosed herein. For instance, the criteria used for selection and placement of OO-D elements may be derived from a knowledge base. The knowledge base comprises metadata associated with each document or with a particular type of document. The latter metadata can be used when the type of document is identified by the augmented training data generation system 322. Other information that may be included with augmentation data generation criteria 323 includes examples like the amount of augmented data to generate, level of perturbation/noise, distributions from which to draw augmentations from, quality control measures, computational resources, time constraints, storage requirements, or privacy and security information.

For example, a received document 316 may be a PDF of an invoice. The PDF may include embedded metadata that includes identification of the type of document and of one or more of the various fields of the invoice. The metadata may be found in, for example, Document Information Dictionary, XMP metadata, or customized metadata fields. For instance, metadata may identity the "cost" field or the "payee" fields, including expected or allowed formats, allowed characters, and so on. The knowledge base included with augmentation data generation criteria 323 may indicate that invoice type documents should be augmented with at least handwritten notes, signatures, stamped text, and/or graphical elements. User input 321 may include instructions for additional augmentations to apply to invoice type documents. For instance, user input 321 may specify that image augmentation using a red-colored font should be used with invoice type documents. Document structure and metadata analysis system 718 determines one or more augmentation techniques to apply to the document based on these and potentially other inputs.

Based on the determination by document structure and metadata analysis system 718, a copy of the document is sent to either or both of the additive augmented content generation system 706 and/or the non-additive content selection system 707. Augmentation systems may operate in series or in paralle. These two systems implement the augmentation techniques that are described in detail in FIGS. 8-21 and the accompanying description. In an additive technique, content (or an element) is generated. A location within the augmented training document is then identified for placing the generated element by placement selector system 714. The generated element is then placed in the augmented training document in the identified location by augmented training document generation system 716. Annotation data is then generated for the augmented training document that indicates that the added element is an OO-D element, i.e., belongs to the OO-D class, by augmented training document generation system 716. In contrast, in a non-additive technique, a particular region within the augmented training document is then identified, where the elements located within the region are to be treated as OO-D elements. Annotation information is then generated for the augmented training document by the augmented training document generation system 716, where the annotation information includes information indicating that any elements located within the region in the augmented document belong to the OO-D class.

Additive augmented content generation system 706 includes components for implementing one or more additive augmentation techniques. For example, additive augmented content generation system 706 may include a text augmentation content generator 708, an image augmentation content generator 710, and a graphical augmentation content generator 712. Each of the foregoing generators may implement one or more augmentation technqiues.

The text augmentation content generator 708 may be used to generate the content used in text augmentation. In text augmentation, new words or other textual elements are introduced into specified content portions of documents. Text may come from a variety of sources. For instance, in one type of text augmentation referred to as in-D text mining, text elements are selected from the input document or from other documents in the same plurality of input documents in which the input document originated. The text augmentation content generator 708 includes program code for generating/identifying/selecting the text used in each respective text augmentation technique. Other text augmentation techniques that may be implemented in text augmentation content generator 708 include soft text augmentation, random text augmentation, contextual text augmentation, character swap augmentation, and backtranslation augmentation, among many others.

The image augmentation content generator 710 implements image augmentation. In image augmentation, text elements generated by text augmentation content generator 708 may be altered to include various visually distinctive properties. For example, the font, color, style, or size of text or elements introduced using the above-described text augmentation techniques, can be added or updated. In some examples, in accordance with the determination made by the document structure and metadata analysis system 718, once a text element is generated at text augmentation content generator 708, the generated text element is sent to image augmentation content generator 710 which can then make changes to the font, color, style, or size of text elements. Thus, the output of text augmentation content generator 708 may be a plain, unformatted text string or it may be output using font, color, style, or size to match the text elements recognized in the input document. For instance, in soft text augmentation, the generated text element is based on text elements recognized in the input document. The text elements created by text augmentation content generator 708 implementing soft text augmentation may be output using the same formatting used by the text elements on which the generated content was based. The generated text elements may then be output to image augmentation content generator 710, which may update one or more of the content font, color, style, or size of the generated elements in accordance with the determination made by the document structure and metadata analysis system 718. For example, based on the metadata of a particular document or group of documents, the document structure and metadata analysis system 718 may determine that image augmentation to include updating generated text elements to a large, red, bolded font is consistent with training the ML model to identify OO-D elements.

The graphical augmentation content generator 712 includes program code to generate graphical elements such as QR codes, holograms, rubber stamps, or watermarks in accordance with the determination made by the document structure and metadata analysis system 718. The graphical augmentation content generator 712 may include an image rendering tool. The graphical augmentation content generator 712 may use the image rendering tool to generate the appropriate images based on the desired specifications, such as size, shape, color, and transparency. Alternatively, in certain embodiments, the graphical augmentation content generator 712 may obtain images or graphics for augmentation from sources including local or licensed graphics libraries, public image repositories, custom-designed graphics, QR code generators, stamp or watermark templates, hologram generators, and so on.

In some examples, in accordance with the determination made by the document structure and metadata analysis system 718, a non-additive augmentation technique may be applied to the input document 316. In non-additive augmentation, non-additive content selection system 707 can select a particular region within the input document 316 (or a copy thereof), in which the elements located within the region are to be treated as OO-D elements. For example, the document 316 may contain OO-D elements and/or elements that are likely to be misclassified as in-D elements, but that are actually OO-D. For instance, a stray mark with a pen, a rubber stamp including certain words, watermarks, or text in background images, among other examples, may all include OO-D elements potentially recognized by OCR system 304 and subsequently misclassified as in-D. The non-additive content selection system 707 can identify regions containing OO-D elements for augmentation. As non-additive content selection system 707 may potentially identify many such regions in a document, the placement selector system 714 may determine which of the regions identified by non-additive content selection system 707 will receive augmentation (designation as an augmented region) and subsequent annotation.

Augmented training data generation system 322 includes placement selector system 714. Placement selector system receives placement information from document structure and metadata analysis system 718, as well as from user input 321 and augmentation data generation criteria 323. The placement selector system 714 may synthesize the input data from these sources, select relevant target locations, integrate related configuration parameters, validate the quality and relevance of selected locations, and provide placement data output in a format suitable for augmentation. Thus, placement selector system 714 selects a location for each element generated by additive augmented content generation system 706. Likewise, for each region identified by non-additive content selection system 707, placement selector system 714 determines, using the same sources, whether an identified region will be an augmentation and annotated as such. In other words, for non-additive augmentation, the elements are effectively placed when they are annotated.

Augmented training document generation system 716 receives information about generated elements from additive augmented content generation system 706 and placement information from placement selector system 714 and inserts the augmentation into the document 316. For both text, image, and graphical augmentation techniques, the generated elements can be integrated into the document, either by replacing existing content or by overlaying new content on top of the existing document. In certain embodiments, this operation may be performed using an image rendering tool. For example, the image rendering tool may automatically edit metadata or embedded data, embed text or images using steganography, insert elements using vector or scripting languages, or other suitable techniques. Steganography may involve inserting an augmentation into an image or PDF by adding the augmentation in such a way that it is not detectable to a human looking at the image or document.

Augmented training document generation system 716 also adds the annotation information indicating that the generated additive augmentations are in the OO-D class. Annotations may be added using any suitable technique including the drawing of bounding boxes or polygons around added elements, labeling elements with tags or attributes, or adding metadata or embedded data to the image file. Annotations include both the identification of the added element using a descriptive technique as well as a label that indicates that the annotation corresponds to the OO-D class.

Augmented training document generation system 716 also receives information about the region(s) identified by non-additive content selection system 707 and applies the augmentation, which may be designation of a region as an augmentation. Annotation information is then generated by augmented training document generation system 716 for the augmented training document, where the annotation information includes information indicating that any elements located within the region in the augmented document belong to the OO-D class.

The augmented training dataset 324, in whole or partially as it is generated, is output to the information extraction model training and validation system 338. Information extraction model training and validation system 338 initially includes the untrained model 340. Untrained model 340 is trained using the augmented training dataset 324 to produce a trained model 342. Information extraction model training and validation system 338 includes components for training untrained model 340 using the augmented training dataset 324 as well as for validating the effectiveness of the training. Note that augmented training dataset 324 includes annotations for both in-D and OO-D elements and thus model accuracy is evaluated by information extraction model training and validation system 338 for accuracy in classifying both in-D and OO-D elements. Information extraction model training and validation system 338 may also perform processes such as feature engineering, model selection and hyperparameter tuning, and model deployment and monitoring.

FIG. 8 depicts a simplified flowchart showing a method for generating augmented training data, according to certain embodiments. The method depicted in FIG. 8 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the processing may be performed in some different order, or some steps may also be performed in parallel.

One or more of the processing steps depicted herein may be performed or facilitated by an implementation of the augmented training data generation system 322. In 805, augmented training data generation system 322 can identify a first document in the regular training dataset 314. For example, the regular training dataset 314 may contain a plurality of regular training datapoints 315, each of which includes a document 316, as shown in FIG. 3. During each iteration of the generation of augmented training data, the augmented training data generation system 322 receives one such document 316. The documents may be retrieved using a database query, from an in-memory cache, from a suitable local or network filesystem, over a network, and so on. The first document so obtained is labeled with annotations indicating which in-D classes or categories each recognized text element belongs to. If any OO-D elements are labeled at this point in the process, they are mislabeled as in-D. For example, a mistake during manual labeling or a misclassification by the ML model during pseudo-labeling may result in this outcome.

In 810, augmented training data generation system 322 may generate a second document for the augmented training dataset from the first document. Block 810 is shown in a dotted box to indicate that non-additive and additive example implementations of this step will be shown with expanded detail in FIGS. 9 and 11, respectively. In 810, zero or more augmentation techniques may be applied to the first document to generate the second document. Thus, in some examples, the second document may contain elements that were already present in the first document that are then annotated in 815. In other examples, the second document is augmented, as described below.

In the case where augmentations are used, both non-additive and additive techniques can be applied to the same document. In some examples, a copy of the first document is made prior to augmentation. The determination of which augmentation technique(s) to apply is made by, for example, the document structure and metadata analysis system 718. The second document, similar to document 328 from FIG. 3, includes augmentations 330.

In 815, augmented training data generation system 322 may generate annotation information for the second document, the annotation information for the second document indicating that a first element included in the second document belongs to the OO-D class. For example, annotation information may be added by the augmented training document generation system 716 following augmentation. At the conclusion of block 815, the second document may be a constituent of an augmented training datapoint 325, including a document 328 with augmentations 330 and associated annotations 332 that specify both in-D labels 334 and OO-D labels 336. The OO-D labels 336 are associated with the augmentations 330 added in 810. In some examples, the OO-D labels 336 may also be associated with existing OO-D items that were present in the first document but were not previously labeled during membership in the regular training dataset. Annotations and labeling used in 815 may include techniques such as object bounding boxes, pixel-level classification, image classification labels for multi-class classification, or metadata-based annotations.

FIG. 9 depicts a simplified flowchart showing a method for non-additive augmentation techniques, according to certain embodiments. The method depicted in FIG. 9 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the processing may be performed in some different order, or some steps may also be performed in parallel.

One or more of the processing steps depicted herein may be performed or facilitated by an implementation of the non-additive content selection system 707 included in the augmented training data generation system 322 or other components. At 905, a second document is generated by making a copy of a first document, where both the second document and the first document contain a first element. For example, augmented training data generation system 322 may receive document 316 from regular training dataset 314 and make a copy of it. The copy may be an identical binary copy of the file. However, in some examples, the copy may be converted into another file format suitable for augmentation. For example, PDFs may be converted into image files or a proprietary file format including extensions for adding augmentations and metadata.

Both the first document and the second document, copied from the first document, include a first element. In the case of some non-additive augmentation techniques, the first element is an OO-D element that can be found on the first and second documents prior to augmentation. Thus, the first element is included in the first document. OO-D elements in this sense thus include any element that may be recognized as text (i.e., element) by OCR system 304 that may then be misclassified as one or more in-D classes or categories. Examples of such OO-D elements can in include handwritten text markups, stamps (e.g., a rubber stamp), stickers, stray marks, watermarks (e.g., text in document background), tears, errors, diagrams, currency symbols, multiple languages, inconsistent formatting, tables, barcodes, logos, different fonts, textual information in images or videos, or other variations.

At 910, the non-additive content selection system 707 included in the augmented training data generation system 322 may identify a region within the second document that contains the first element in the second document. One or more regions may be selected in accordance with the determination made by the document structure and metadata analysis system 718 and the particular regions that receive augmentation may be determined by placement selector system 714.

At 915, augmented training document generation system 716 can generate annotation information for the second document, where the annotation information indicates that any elements located within the selected region in the second document belong to the OO-D class. For example, augmented training document generation system 716 can receive the region(s) identified by non-additive content selection system 707 and selected (placed) by placement selector system 714, and add data to the second document denoting the augmented region and adding annotations labeling the augmentation as OO-D. The augmentation may include information that identifies the region as an augmentation and/or designation of a bounding box or region. The augmentation itself is then labeled as OO-D by adding additional information to the document.

Figure 10:
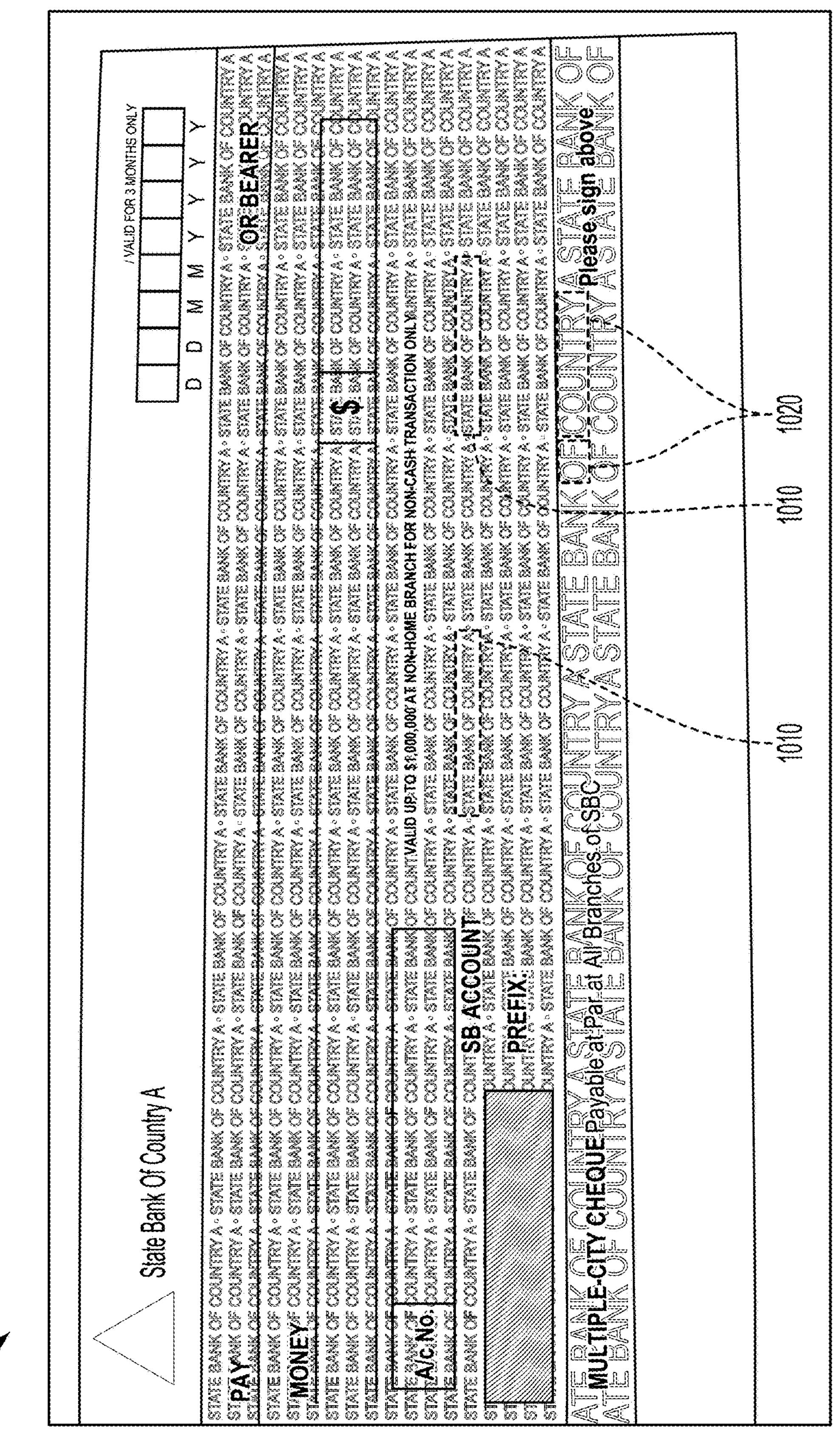
FIG. 10 shows an example document augmented using a non-additive augmentation technique, according to certain embodiments.

FIG. 10 shows an example document 1000 augmented using a non-additive augmentation technique, according to certain embodiments. Document 1000 is a blank bank check, suitable for human- or machine-use. However, the description of FIG. 10 is equally applicable to any document.

Document 1000 is shown with several potential OO-D augmentations identified. For example, watermarks 1010 and background text 1020 are depicted as regions that may be non-additively augmented and annotated. Note that document 1000 includes many examples of OO-D text that may be recognized by an OCR system. For example, both the watermarks 1010 and the background text 1020 repeat many times throughout the document 1000. The non-additive content selection system 707 may identify all or some portion of these OO-D elements. The placement selector system 714 determines which regions will be designated as augmentations based upon user input 321 and the augmentation data generation criteria 323, along with input or any determinations from the document structure and metadata analysis system 718. In FIG. 10, four bounded regions are depicted including watermarks 1010 and background text 1020, indicating that four regions have been selected for augmentation and annotation. In some examples, more or less regions may be selected. Four regions are shown here for clarity to illustrate the principles behind non-additive augmentation.

The example regions 1010, 1020 shown for a bank check are not meant to be limiting and are only intended to show simple examples of non-additive augmentation. Even this particular document may have other examples of OO-D elements that are good candidates for non-additive augmentation. Additionally, what is considered OO-D for a particular document may vary between implementations and configurations. For example, user input 321 may be used to identify certain elements on a particular document or document type as OO-D. What is OO-D may depend on the business objective of the particular information extraction model.

Figure 11:
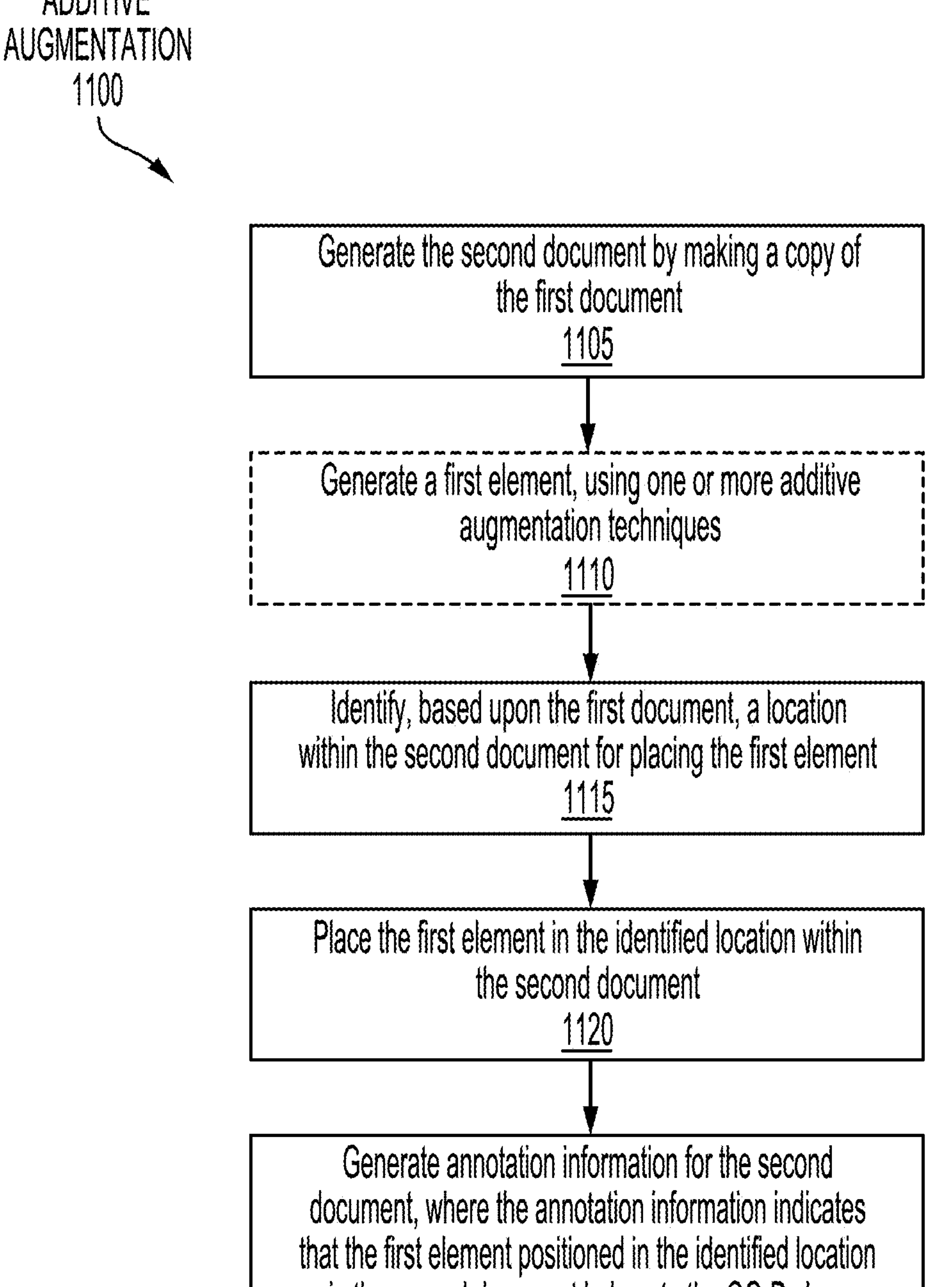
FIG. 11 shows a simplified flowchart showing a method for additive augmentation techniques, according to certain embodiments.

FIG. 11 shows a simplified flowchart showing a method for additive augmentation techniques, according to certain embodiments. The method depicted in FIG. 11 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 11 and described below is intended to be illustrative and non-limiting. Although FIG. 11 depicts the various processing steps occurring in a particular sequence or order, this is not intended to be limiting. In certain alternative embodiments, the processing may be performed in some different order, or some steps may also be performed in parallel.

One or more of the processing steps depicted herein may be performed or facilitated by an implementation of the additive augmented content generation system 706 included in augmented training data generation system 322. At 1105, a second document is generated by making a copy of a first document. For example, augmented training data generation system 322 may receive document 316 from regular training dataset 314 and make a copy of it. The copy may be an identical binary copy of the file. However, in some examples, the copy may be converted into another file format suitable for augmentation. For example, PDFs may be converted into image files or a proprietary file format including extensions for adding augmentations and metadata.

At 1110, the additive augmented content generation system 706 generates a first element, using one or more additive augmentation techniques. For additive techniques, the selection of the element is the distinguishing feature with respect to the generation of augmented documents. Thus, 1110 is shown as a dotted box indicating that further details and examples will be given below, expanding on the several example additive augmentation techniques. Some example additive augmentation techniques will be discussed in detail in FIGS. 12-21 and the accompanying description. There can be a many-to-many correspondence between a given document and one or more augmentation techniques. For example, a document may include element generated using a plurality of techniques and/or a plurality of elements generated using a single technique.

In general, 1110 involves identification, selection, or generation of an element. An element could be a character, set of characters, a word, a set of words, a graphic, or a combination thereof. The various techniques for additive augmentation involve varying approaches to identification, selection, or generation of an element. Some example additive augmentation techniques include in-D text mining, soft text augmentation, random text augmentation, contextual text augmentation, character swap augmentation, backtranslation, among many others, either individually or in combination. Several of these techniques will be described in detail herein.

At 1115, the placement selector system 714 identifies, based upon the first document, a location within the second document for placing the first element. The placement selector system 714 may identify the location based on a determination made by the document structure and metadata analysis system 718 based on available document metadata or document type metadata. Placement selector system 714 may identify the location further based on user input 321 and the augmentation data generation criteria 323. For instance, using available metadata, document structure and metadata analysis system 718 may identify areas of whitespace and/or substantial distance from in-D elements, edges, corners. Placement selector system 714 may be configured to place generated elements randomly or according to a particular probability distribution to ensure adequate or realistic coverage of whitespace areas. In some examples, placement selector system 714 may be configured to identify locations for generated elements near or even on top of existing in-D elements.

In certain embodiments, the selected location may be adjusted in accordance with a noise parameter. The noise parameter may be a statistical parameter that controls the level of random perturbations or distortions added to an image or PDF during the augmentation process. For example, the noise parameter may be used to add random variations to the selected location of an augmentation, which may help to improve the robustness of the trained model to noise in real-world data. The noise parameter can be adjusted based on the desired level of noise to be added to the data and the type of noise to be introduced, such as Gaussian noise or salt-and-pepper noise.

At 1120, the augmented training document generation system 716 can place the first generated element in the identified location within the second document. For example, augmented training document generation system 716 can receive the generated elements and the locations identified by placement selector system 714 and add information to the second document denoting the added and placed augmented content. The information added may include information that identifies the generated element as an augmentation and/or maps the generated element to the identified location. For example, the augmentation may include coordinates of a bounding box/mask, data added to parallel metadata files, or transformation matrices, among other techniques.

At 1125, the augmented training document generation system 716 generates annotation information for the second document, where the annotation information indicates that the first element positioned in the identified location in the second document belong to the OO-D class. Thus, the augmentation itself is then labeled as OO-D by adding additional information to the document. As with non-additive augmentations, the addition of these annotations may include adding metadata to the document. For example, metadata may be added to PDFs using facilities provided by the PDF standard or a may be otherwise added to a proprietary file format using extensions for adding augmentations and metadata.

Figure 12:
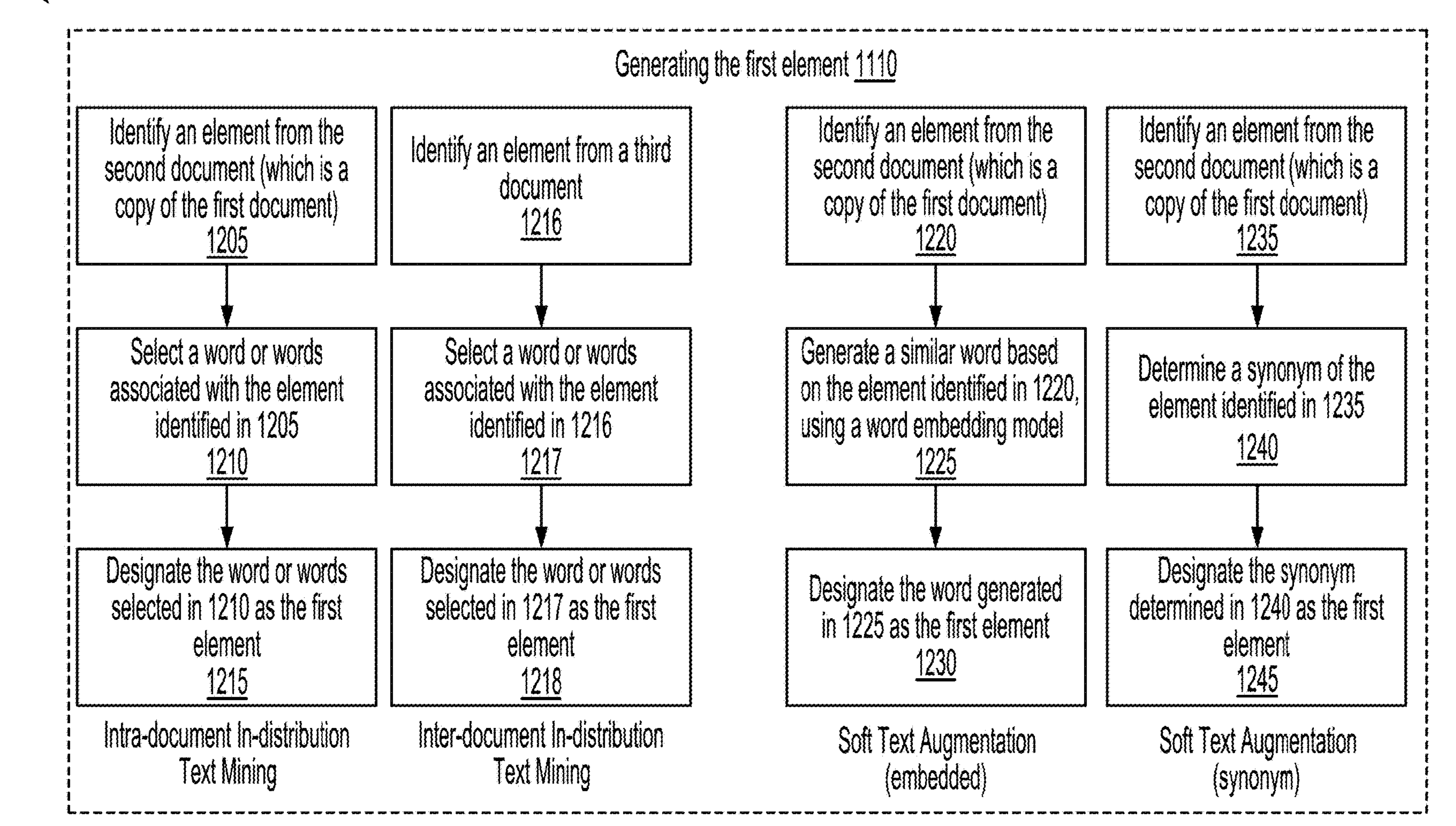
FIG. 12 shows a simplified flowchart showing several example methods involving additive augmentation techniques, according to certain embodiments.

FIG. 12 shows a simplified flowchart showing several example methods involving additive augmentation techniques, corresponding to additional detail for block 1110 from FIG. 11, according to certain embodiments. The methods depicted in FIG. 12 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 12 and described below is intended to be illustrative and non-limiting. Although FIG. 12 depicts the various processing steps occurring in a particular sequence or order, this is not intended to be limiting. In certain alternative embodiments, the processing may be performed in some different order, or some steps may also be performed in parallel.

One or more of the processing steps depicted herein may be performed or facilitated by an implementation of the text augmentation content generator 708 of the augmented training data generation system 322. FIG. 12 will be discussed in concert with FIGS. 13 and 14, which show example documents 1300 and 1400 augmented using the techniques outlined in flowchart 1200.

One example additive text augmentation technique is referred to as intra-document in-D text mining. At 1205, the text augmentation content generator 708 identifies an element from the second document (which is a copy of the first document). For example, a document 316 (first document) from a regular training datapoint 315, may be copied (second document). The element can be selected using one or more strategies for element selection. In one example strategy, the element may be selected randomly from among the elements recognized by OCR system 304. Another example strategy uses a data driven approach, in which a region for placement is first identified by placement selector system 714. Then, a plurality of words in the neighborhood of the selected region are identified and one of the plurality of neighborhood words is chosen at random. Other strategies may be used for identification of the element instead of or in combination with the example strategies given here.

At 1210, the text augmentation content generator 708 selects a word or words associated with the element identified in 1205. An element can be a character, set of characters, a word, a set of words, a graphic, or a combination thereof. Thus, the text augmentation content generator 708 selects a word or words from the element identified in 1205. At 1215, the text augmentation content generator 708 designates the word selected in 1210 as the first element. For example, the text augmentation content generator 708 may send the designated word to the augmented training document generation system 716 for placement according to the placement selector system 714.

A closely related additive text augmentation technique is referred to as inter-document in-D text mining. At 1216, the text augmentation content generator 708 identifies an element from a third document. For example, another document from the regular training dataset 314 may be used, other than the first document (or copy thereof). The element can be selected using the strategies discussed in 1205.

At 1217, the text augmentation content generator 708 selects a word or words associated with the element identified in 1216. At 1218, the text augmentation content generator 708 designates the word selected in 1217 as the first element. Intra- and inter-document in-D text mining are thus very similar except for the source of the word used to identify an element, prior to selection of a word or words for designation as the first element. For intra-document in-D text mining, the document under augmentation is used, where for inter-document in-D text mining, a different document is used. In both cases, however, the document comes from the regular training dataset 314 (or a copy therefrom).

Figure 13:
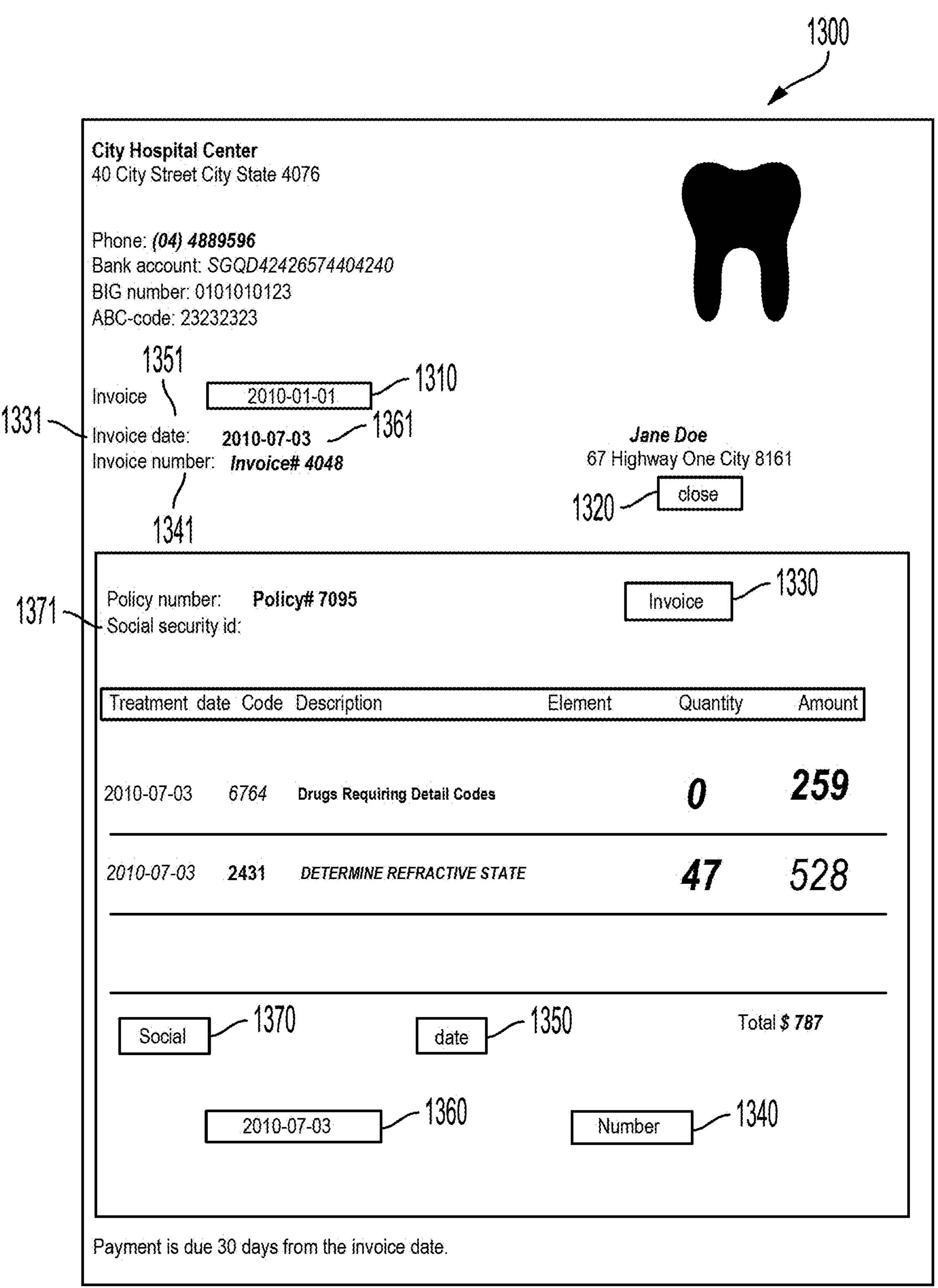
FIG. 13 shows an example document augmented using an additive augmentation technique, according to certain embodiments.

FIG. 13 shows an example invoice document 1300 including illustrations of words selected and placed for intra-document and inter-document in-D text mining. Document 1300 contains several additive text augmentations shown using a box for illustrative purposes to show the region of placement. Actual augmentations, in most cases, do not include a graphical box that can be seen through visual inspection of the augmented document. Intra-document augmentations include words 1330, 1340, 1350, 1360, 1370. Each of these words is found in the document 1300 at 1331, 1341, 1351, 1361, 1371, respectively. In contrast, inter-document augmentations include words 1310, 1320. Each of these words is not found in document 1300 but is instead found in another (third) unaugmented document (not shown). The example augmentations shown in FIG. 13 are shown placed according to a possible set of selections by placement selector system 714, but many other placements of each augmentation are possible.

Another example additive text augmentation technique shown in FIG. 12 is referred to as soft text augmentation. In soft text augmentation, generally, a word from the second document is chosen and a similar word is identified using a particular technique. Two such example techniques are given here, and other approaches to soft text augmentation are also possible.

A first example of soft text augmentation uses a word embedding model to identify the similar word. At 1220, the text augmentation content generator 708 identifies an element from the second document (which is a copy of the first document). At 1225, the text augmentation content generator 708 generates a similar word based on the element identified in 1220. For example, the text augmentation content generator 708 may use a word embedding model to generate a similar word. A word embedding model is a type of language model that maps words or phrases to a high-dimensional vector space, that can capture semantic and syntactic relationships between them. Any suitable word embedded model may be used for selection of the word including, but not limited to, models such as Word2Vec (Word to Vector), Global Vectors for Word Representation (GloVe), FastText (Fast Text), Embeddings from Language Models (ELMo), or Bidirectional Encoder Representations from Transformers (BERT).

For example, word embedding model Word2Vec might represent the word "invoice" as the following vector in an embedded space: [0.025, 0.143, −0.17, 0.300, −0.102, 0.089, −0.002, 0.184, 0.005, −0.049]. This example vector is not an exact representation of the word, but rather a learned representation that takes into account the context in which the word appears. The values in the vector are real numbers, and their specific values will depend on the details of the Word2Vec model and the training data used to create it.

A similar word can be identified in the embedded space using a similarity measure. For example, to identify a word similar to "invoice" using Word2Vec, a cosine similarity measure can be used. A pre-trained Word2Vec can be used to find the word most similar to "invoice" by computing the cosine similarity between the vector representations of "invoice" and one or more candidate words in the model's vocabulary. The cosine similarity score is a measure of how similar the two vectors are in terms of direction and magnitude, with a value of 1 indicating that the two vectors are identical and a value of 0 indicating that the two vectors are orthogonal. The word with the highest cosine similarity score to "invoice" is then returned as the most similar word. In this case, the output candidate word might be "receipt", which has a similar context and meaning to "invoice" based on the pre-trained Word2Vec model. Other example words that may be identified as similar include billing, statement, invoice date, invoice amount, payment, invoice number, purchase order, vendor, customer, or balance, among many others. The word may be chosen from among the one or more similar words returned by the embedded word model sequentially, at random, or using another algorithmic approach. At 1230, the word generated in 1225 is designated as the first element.

A second example of soft text augmentation uses identifies a similar word by identifying a synonym of the word. At 1235, the text augmentation content generator 708 identifies an element from the second document (which is a copy of the first document). At 1240, the text augmentation content generator 708 determines a synonym of the element identified in 1235. In certain embodiments, text augmentation content generator 708 may include or have remote access to a software module including a thesaurus or synonym generator. For example, a software library may provide this functionality, or it may be attained using an application programming interface ("API") provided by a third-party. For instance, a synonym may be obtained of the word "invoice" using a method call provided by a thesaurus implemented in an object-oriented programming language like Java, C++, C#, JavaScript, or Python. At 1245, the word generated in 1240 is designated as the first element.

Figure 14:
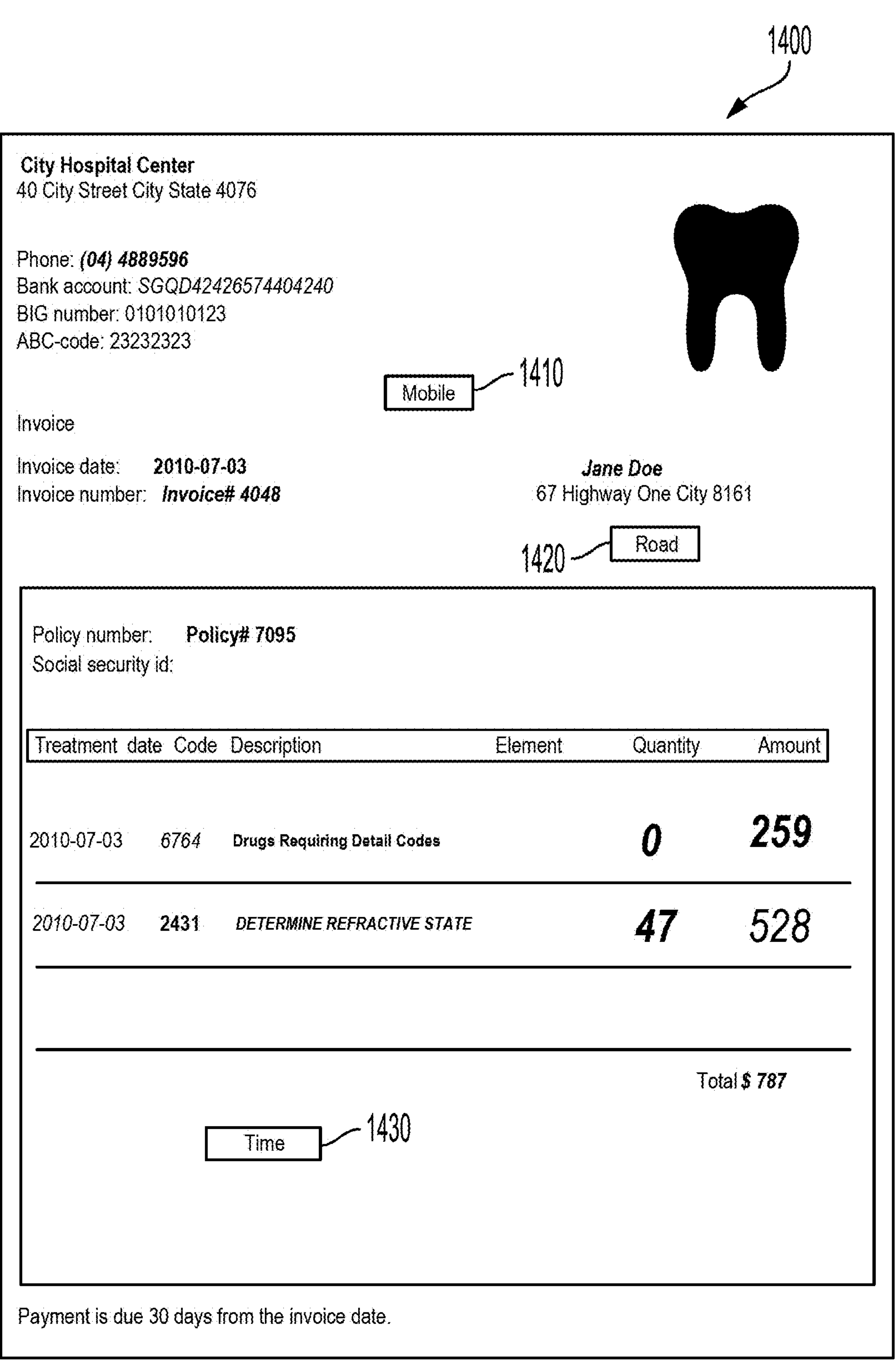
FIG. 14 shows an example document augmented using an additive augmentation technique, according to certain embodiments.

FIG. 14 shows an example invoice document 1400 including illustrations of words selected using soft text augmentation and placed. Document 1400 contains several additive text augmentations shown using a box for illustrative purposes to show the region of placement. Actual augmentations, in most cases, do not include a graphical box that can be seen through visual inspection of the augmented document. Example soft text augmentations include words 1410, 1420, and 1430. These words may have been identified using an embedded space similarity measure or by finding a synonym. For example, word 1410 is "Mobile" that is similar to "Phone." Likewise, word 1420, "Road" may be similar to "Highway" and word 1430, "Time" may be similar to "date." Other pairs and similar words/synonyms are possible. The example augmentations shown in FIG. 14 are shown placed according to a possible set of selections by placement selector system 714, but many other placements of each augmentation are possible.

Figure 15:
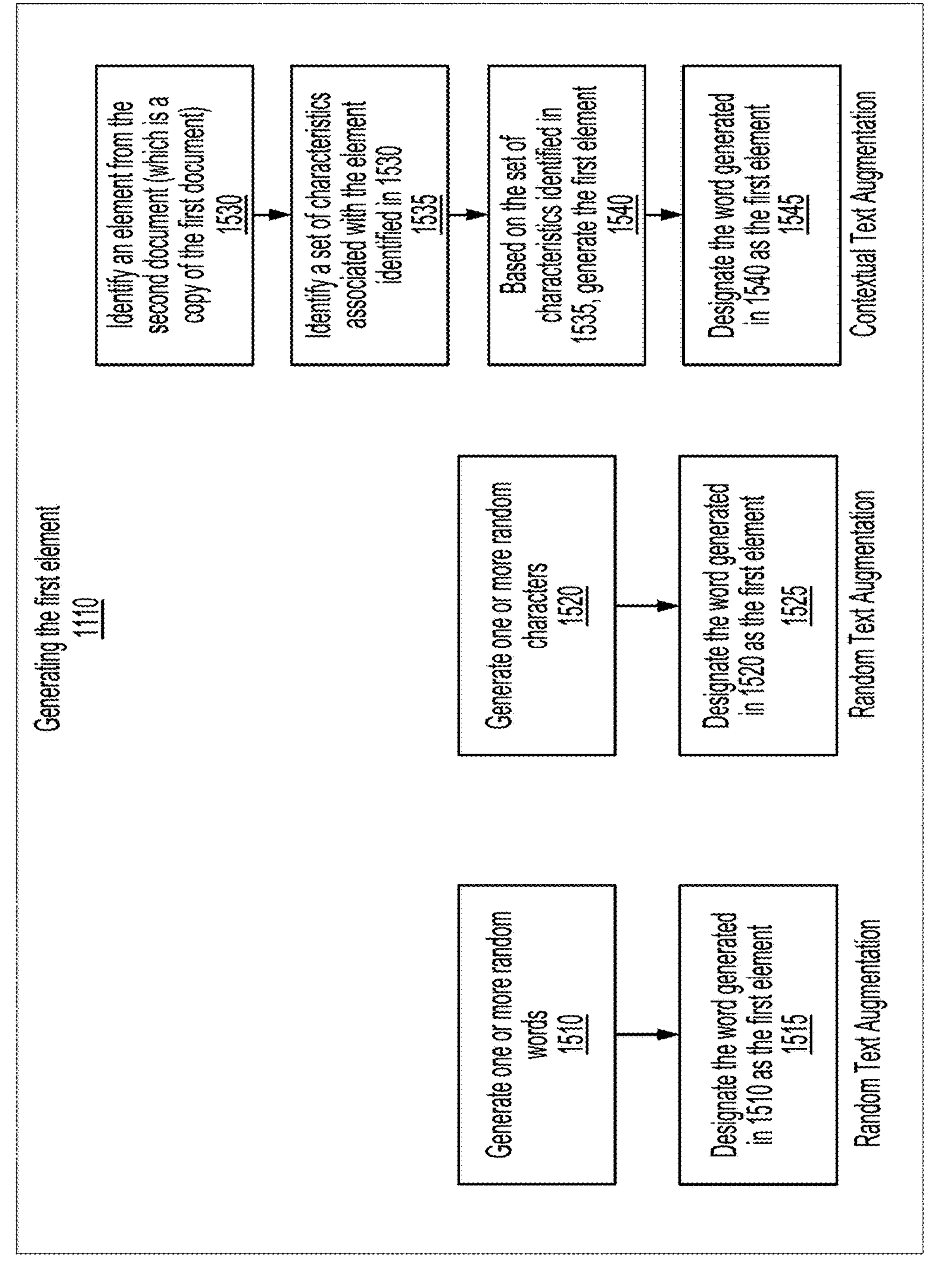
FIG. 15 shows a simplified flowchart showing several example methods involving additive augmentation techniques, according to certain embodiments.

FIG. 15 shows a simplified flowchart showing several example methods involving additive augmentation techniques, corresponding to additional detail for block 1110 from FIG. 11, according to certain embodiments. The methods depicted in FIG. 15 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 15 and described below is intended to be illustrative and non-limiting. Although FIG. 15 depicts the various processing steps occurring in a particular sequence or order, this is not intended to be limiting. In certain alternative embodiments, the processing may be performed in some different order, or some steps may also be performed in parallel.

One or more of the processing steps depicted herein may be performed or facilitated by an implementation of the text augmentation content generator 708 of the augmented training data generation system 322. FIG. 15 will be discussed in concert with FIGS. 16 and 17, which show example documents 1600 and 1700 augmented using the techniques outlined in flowchart 1500.

One example additive text augmentation technique is referred to as random text augmentation. In random text augmentation, generally, a random character, characters, word, or words are generated and placed. Two such examples are given here, and other approaches to random text augmentation may also be possible.

A first example of random text augmentation involves generation of random words. At 1510, the text augmentation content generator 708 generates one or mode random words. In some examples, a selected corpus of documents may be used as a source of the random words. For example, the corpus may include one or more examples of dictionaries, academic publications, legal documents, news articles, scientific papers, movie scripts, social media posts, web pages, medical records, government reports, user manuals, historical archives, financial statements, or technical specifications. Unique words may be identified from the corpus and a pseudo-random number generator may be used to select a word or words. In some other examples, a software library may provide this functionality, or it may be obtained using an API provided by a third-party. At 1515, the word generated in 1510 is designated as the first element.

A second example of random text augmentation involves generation of random characters. At 1520, the text augmentation content generator 708 generates one or mode random characters. For example, a pseudo-random number generator may be used in concert with the ASCII character set or a Unicode character set to generate one or more random characters. The number of characters may itself be random. The generated characters may include alphanumeric characters, punctuation, special characters, and so on. At 1525, the word generated in 1520 is designated as the first element.

Figure 16:
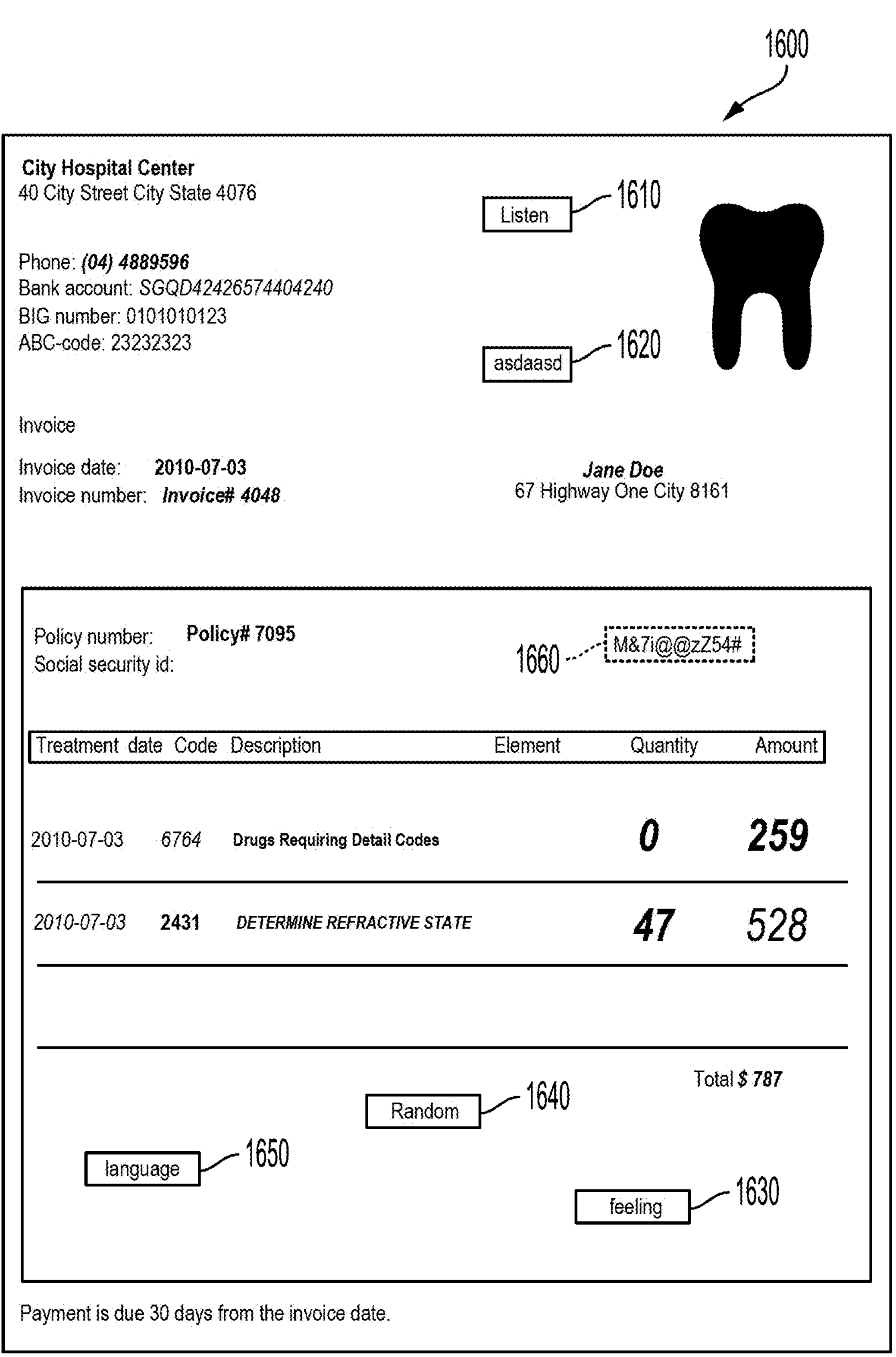
FIG. 16 shows an example document augmented using an additive augmentation technique, according to certain embodiments.

FIG. 16 shows an example invoice document 1600 including illustrations of words generated using random text augmentation and placed. Document 1600 contains several additive text augmentations shown using a box for illustrative purposes to show the region of placement. Actual augmentations, in most cases, do not include a graphical box that can be seen through visual inspection of the augmented document. Example random text augmentations using random words include elements 1610, 1630, 1640, and 1650. Example random text augmentations using random characters include elements 1620 and 1660. The example augmentations shown in FIG. 16 are shown placed according to a possible set of selections by placement selector system 714, but many other placements of each augmentation are possible.

Yet another example additive text augmentation technique is referred to as contextual text augmentation. In contextual text augmentation, generally, metadata relating to an identified element is used to identify a set of characteristics relating to that element, which can then be used to generate a similar element. For example, if metadata indicates that an identified element is an email, then the system may be configured to generate another element that has the characteristics of an email.

At 1530, the text augmentation content generator 708 identifies an element from the second document (which is a copy of the first document). At 1535, the text augmentation content generator 708 identifies a set of characteristics associated with the element identified in 1530. For example, the text augmentation content generator 708 may identify the set of characteristics the second document using the metadata associated with the first document. The set of characteristics may relate to the format, length, language, order, spelling, and so on of the identified element. For instance, if the identified element is a phone number, the identified characteristics may indicate that the identified word has 10 characters and two hyphens, is numeric, and the location of the hyphens.

At 1540, based on the set of characteristics identified in 1535, the text augmentation content generator 708 generates the first element. For instance, using the identified characteristics from the phone number example, the text augmentation content generator 708 may generate an element that mirrors the format of a phone number. The constituent parts may be randomly generated, using techniques similar to those discussed above with regard to random text augmentation. The generated word may conform to some or all of the identified characteristics. Example elements with characteristics that may be generated using contextual text augmentation include, among others, social security numbers, dates of birth, credit card numbers, postal codes, IP addresses, URLs, ISBN numbers, vehicle identification numbers, passport numbers, driver's license numbers, UPC codes, MAC addresses, stock ticker symbols, bar codes, VIN numbers, medical record numbers, employee ID numbers, and so on. However, any element that is adequately supplemented with metadata sufficient to identify one or more characteristics may be used. At 1545, the word generated in 1540 is designated as the first element.

Figure 17:
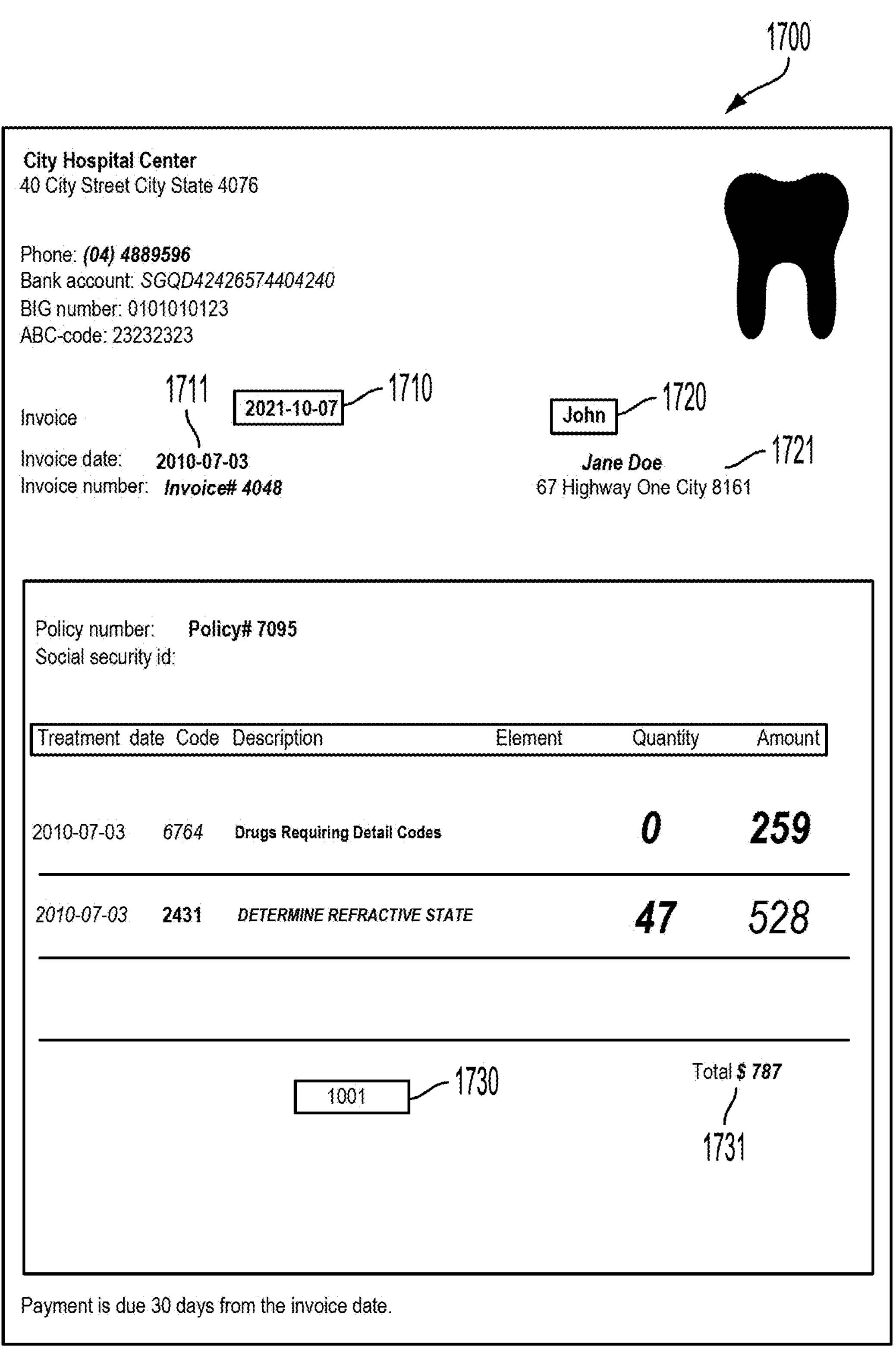
FIG. 17 shows an example document augmented using an additive augmentation technique, according to certain embodiments.

FIG. 17 shows an example invoice document 1700 including illustrations of words generated using contextual text augmentation and placed. Document 1700 contains several additive text augmentations shown using a box for illustrative purposes to show the region of placement. Actual augmentations, in most cases, do not include a graphical box that can be seen through visual inspection of the augmented document. Example contextual text augmentations include elements 1710, 1720, and 1730. For example, word 1710 is a date, having a format similar to the other dates 1711 on the invoice, like "2010 Jul. 3." Similarly, word 1720 is a first name and word 1730 is an integer, similar to other first names 1721 and integers 1731 found on document 1700, respectively. The example augmentations shown in FIG. 17 are shown placed according to a possible set of selections by placement selector system 714, but many other placements of each augmentation are possible.

Figure 18:
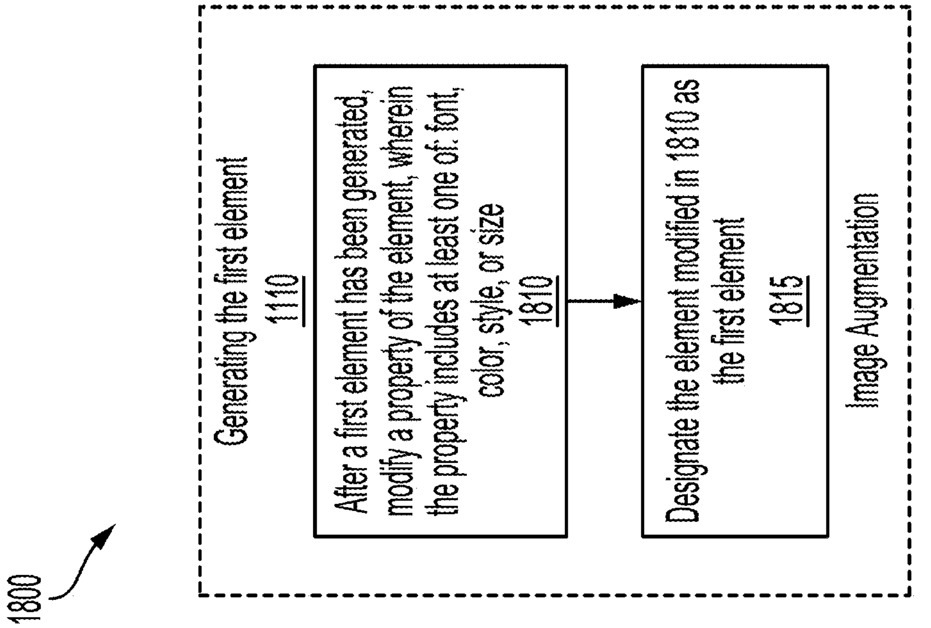
FIG. 18 shows a simplified flowchart showing an example method involving an additive augmentation technique, according to certain embodiments.

FIG. 18 shows a simplified flowchart showing an example method involving an additive augmentation technique, image augmentation, corresponding to additional detail for block 1110 from FIG. 11, according to certain embodiments. The method depicted in FIG. 18 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 18 and described below is intended to be illustrative and non-limiting. Although FIG. 18 depicts the various processing steps occurring in a particular sequence or order, this is not intended to be limiting. In certain alternative embodiments, the processing may be performed in some different order, or some steps may also be performed in parallel.

One or more of the processing steps depicted herein may be performed or facilitated by an implementation of the image augmentation content generator 710 of the augmented training data generation system 322. FIG. 18 will be discussed in concert with FIG. 19, which show example document 1900 augmented using the techniques outlined in flowchart 1800.

One example additive text augmentation technique is referred to as image augmentation. Image augmentation may be applied to a generated element generated using one or more of the text augmentation techniques just discussed. For example, an element generated by the text augmentation content generator 708 may be sent to the image augmentation content generator 710 for application of additional formatting changes prior to placement by placement selector system 714.

At 1810, after a first element has been generated, the image augmentation content generator 710 modifies a property of the element, wherein the property includes at least one of: font, color, style, or size. For example, the image augmentation content generator 710 may receive a text element generated by text augmentation content generator 708 and modify a property of it. In an example, the image augmentation content generator 710 receives a generated element that is the word "invoice" using the same font, color, style, and size as the element from the second document on which it was based. Image augmentation content generator 710 may change the font of the word "invoice" from, say, Arial to Times New Roman. Other examples may include changing the color from black to blue, the style from plain to bold, and/or the size from 10 pt to 16 pt. These changes may be applied individually or in combination. The determination of which and how many transformations to apply may be made randomly or may be made in accordance with the determination made by the document structure and metadata analysis system 718. At 1815, the image augmentation content generator 710 designates the element modified in 1810 as the first element.

Figure 19:
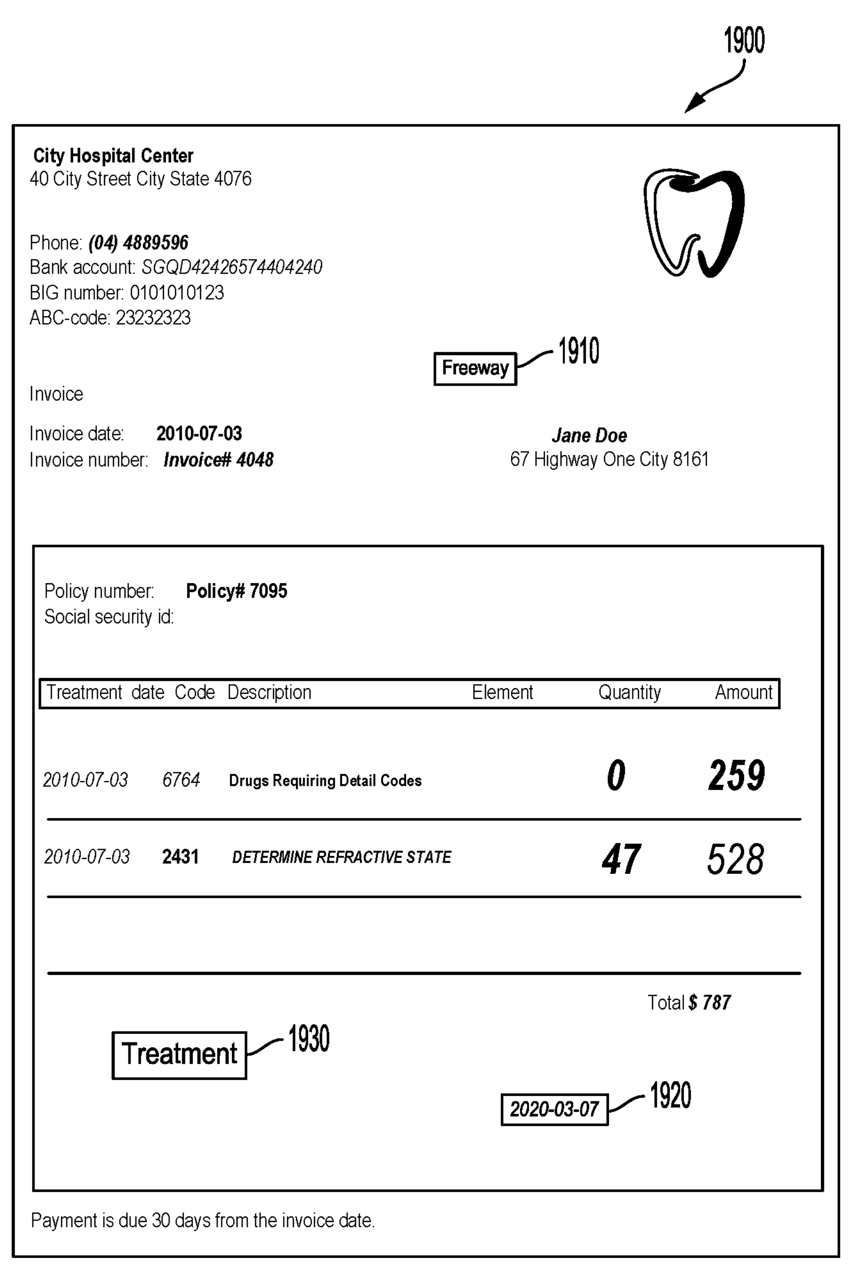
FIG. 19 shows an example document augmented using an additive augmentation technique, according to certain embodiments.

FIG. 19 shows an example invoice document 1900 including illustrations of words modified using image augmentation and placed. Document 1900 contains several additive text augmentations shown using a box for illustrative purposes to show the region of placement. Actual augmentations, in most cases, do not include a graphical box that can be seen through visual inspection of the augmented document. Example elements modified using image augmentation include elements 1910, 1920, and 1930. For example, word 1910 is a word selected using in-D text mining. Image augmentation has been applied to modify the color (red), size (larger font), and style (bold). Likewise, word 1920 has been selected using contextual text augmentation and has been modified in color (green) and style (italicized). Word 1930 has been selected using soft text augmentation and has a modified font (Times New Roman) and size (larger font). The example augmentations shown in FIG. 19 are shown placed according to a possible set of selections by placement selector system 714, but many other placements of each augmentation are possible.

FIG. 20 shows a simplified flowchart showing an example method involving an additive augmentation technique, corresponding to additional detail for block 1110 from FIG. 11, according to certain embodiments. The method depicted in FIG. 20 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 20 and described below is intended to be illustrative and non-limiting. Although FIG. 20 depicts the various processing steps occurring in a particular sequence or order, this is not intended to be limiting. In certain alternative embodiments, the processing may be performed in some different order, or some steps may also be performed in parallel.

One or more of the processing steps depicted herein may be performed or facilitated by an implementation of the graphical augmentation content generator 712 of the augmented training data generation system 322. FIG. 20 will be discussed in concert with FIG. 21, which show example document 2100 augmented using the techniques outlined in flowchart 200.

One example additive augmentation technique is referred to as graphical augmentation. In general, in graphical augmentation, an image rendering tool may be used to render a graphical OO-D element onto the second document. At 2010, the graphical augmentation content generator 712 generates an image. Examples of images may include logos, official seals, signatures, watermarks, certification marks, warning symbols, bar codes, QR codes, holograms, batch numbers, copyright symbols, trademarks, patent numbers, notary stamps, product images, inspection seals, quality control marks, embossed designs, security features, or identification photos, among many other possibilities. The images used by the graphical augmentation content generator 712 may be obtained from local asset storage or from a network- or cloud-based storage location. In some examples, internet databases of stock images may be used to obtain the images used for graphical augmentation. In some examples, graphics may be provided by user input 321. For instance, if a particular document type is expected to have OO-D graphics of a particular type, example images of those graphics may be supplied to the graphical augmentation content generator 712 via user input 321. Subsequently, based on a determination made by the document structure and metadata analysis system 718, the graphical augmentation content generator 712 may render the graphic onto the second document according to the placement selector system 714. At 2015, the graphical augmentation content generator 712 designates the image generated in 2010 as the first element.

Figure 21:
FIG. 21 shows an example document augmented using an additive augmentation technique, according to certain embodiments.

FIG. 21 shows an example invoice document 2100 including illustrations of graphical elements selected and placed for graphical augmentation. Example elements added using graphical augmentation include elements 2110 and 2120. Element 2110 is a bar code and element 2120 is a QR code. Both example elements have been placed onto whitespace by placement selector system 714. In some examples, graphical elements may be placed onto regions of non-whitespace or partial whitespace. The example augmentations shown in FIG. 21 are shown placed according to a possible set of selections by placement selector system 714, but many other placements of each augmentation are possible.

Example Architectures for Providing a Cloud Service

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 22:
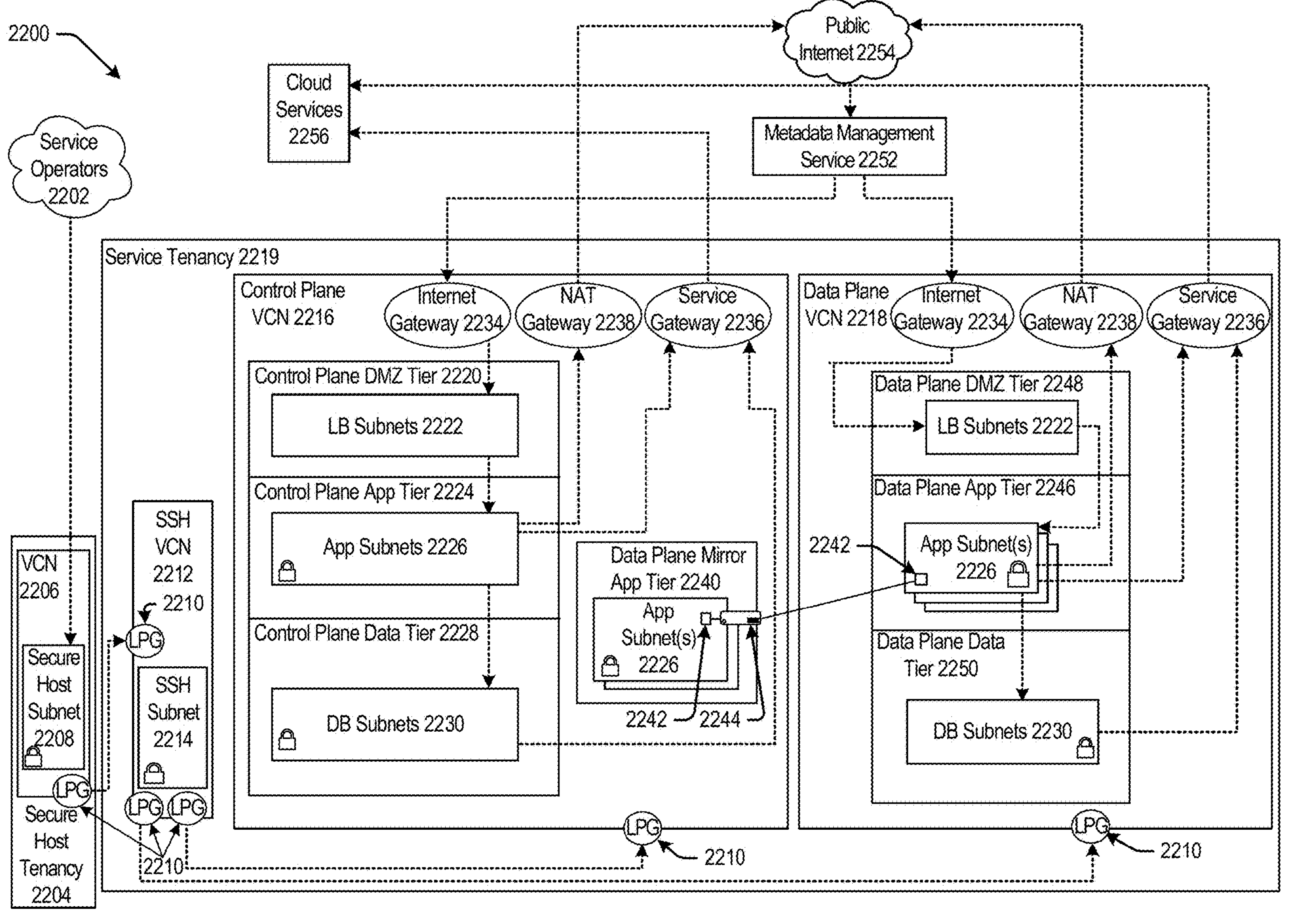
FIG. 22 is a block diagram illustrating one pattern for implementing a cloud infrastructure as a service system, according to at least one embodiment.

FIG. 22 is a block diagram 2200 illustrating an example pattern of an IaaS architecture, according to at least one embodiment. Service operators 2202 can be communicatively coupled to a secure host tenancy 2204 that can include a virtual cloud network (VCN) 2206 and a secure host subnet 2208. In some examples, the service operators 2202 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 2206 and/or the Internet.

The VCN 2206 can include a local peering gateway (LPG) 2210 that can be communicatively coupled to a secure shell (SSH) VCN 2212 via an LPG 2210 contained in the SSH VCN 2212. The SSH VCN 2212 can include an SSH subnet 2214, and the SSH VCN 2212 can be communicatively coupled to a control plane VCN 2224 via the LPG 2210 contained in the control plane VCN 2224. Also, the SSH VCN 2212 can be communicatively coupled to a data plane VCN 2226 via an LPG 2210. The control plane VCN 2224 and the data plane VCN 2226 can be contained in a service tenancy 2219 that can be owned and/or operated by the IaaS provider.

The control plane VCN 2224 can include a control plane demilitarized zone (DMZ) tier 2220 that acts as a perimeter network (e.g., portions of a corporate network between the corporate intranet and external networks). The DMZ-based servers may have restricted responsibilities and help keep breaches contained. Additionally, the DMZ tier 2220 can include one or more load balancer (LB) subnet(s) 2222, a control plane app tier 2224 that can include app subnet(s) 2226, a control plane data tier 2228 that can include database (DB) subnet(s) 2230 (e.g., frontend DB subnet(s) and/or backend DB subnet(s)). The LB subnet(s) 2222 contained in the control plane DMZ tier 2220 can be communicatively coupled to the app subnet(s) 2226 contained in the control plane app tier 2224 and an Internet gateway 2234 that can be contained in the control plane VCN 2224, and the app subnet(s) 2226 can be communicatively coupled to the DB subnet(s) 2230 contained in the control plane data tier 2228 and a service gateway 2236 and a network address translation (NAT) gateway 2238. The control plane VCN 2224 can include the service gateway 2236 and the NAT gateway 2238.

The control plane VCN 2224 can include a data plane mirror app tier 2240 that can include app subnet(s) 2226. The app subnet(s) 2226 contained in the data plane mirror app tier 2240 can include a virtual network interface controller (VNIC) 2242 that can execute a compute instance 2244. The compute instance 2244 can communicatively couple the app subnet(s) 2226 of the data plane mirror app tier 2240 to app subnet(s) 2226 that can be contained in a data plane app tier 2246.

The data plane VCN 2226 can include the data plane app tier 2246, a data plane DMZ tier 2248, and a data plane data tier 2250. The data plane DMZ tier 2248 can include LB subnet(s) 2222 that can be communicatively coupled to the app subnet(s) 2226 of the data plane app tier 2246 and the Internet gateway 2234 of the data plane VCN 2226. The app subnet(s) 2226 can be communicatively coupled to the service gateway 2236 of the data plane VCN 2226 and the NAT gateway 2238 of the data plane VCN 2226. The data plane data tier 2250 can also include the DB subnet(s) 2230 that can be communicatively coupled to the app subnet(s) 2226 of the data plane app tier 2246.

The Internet gateway 2234 of the control plane VCN 2224 and of the data plane VCN 2226 can be communicatively coupled to a metadata management service 2252 that can be communicatively coupled to public Internet 2254. Public Internet 2254 can be communicatively coupled to the NAT gateway 2238 of the control plane VCN 2224 and of the data plane VCN 2226. The service gateway 2236 of the control plane VCN 2224 and of the data plane VCN 2226 can be communicatively couple to cloud services 2256.

In some examples, the service gateway 2236 of the control plane VCN 2224 or of the data plane VCN 2226 can make application programming interface (API) calls to cloud services 2256 without going through public Internet 2254. The API calls to cloud services 2256 from the service gateway 2236 can be one-way: the service gateway 2236 can make API calls to cloud services 2256, and cloud services 2256 can send requested data to the service gateway 2236. But, cloud services 2256 may not initiate API calls to the service gateway 2236.

In some examples, the secure host tenancy 2204 can be directly connected to the service tenancy 2219, which may be otherwise isolated. The secure host subnet 2208 can communicate with the SSH subnet 2214 through an LPG 2210 that may enable two-way communication over an otherwise isolated system. Connecting the secure host subnet 2208 to the SSH subnet 2214 may give the secure host subnet 2208 access to other entities within the service tenancy 2219.

The control plane VCN 2224 may allow users of the service tenancy 2219 to set up or otherwise provision desired resources. Desired resources provisioned in the control plane VCN 2224 may be deployed or otherwise used in the data plane VCN 2226. In some examples, the control plane VCN 2224 can be isolated from the data plane VCN 2226, and the data plane mirror app tier 2240 of the control plane VCN 2224 can communicate with the data plane app tier 2246 of the data plane VCN 2226 via VNICs 2242 that can be contained in the data plane mirror app tier 2240 and the data plane app tier 2246.

In some examples, users of the system, or customers, can make requests, for example create, read, update, or delete (CRUD) operations, through public Internet 2254 that can communicate the requests to the metadata management service 2252. The metadata management service 2252 can communicate the request to the control plane VCN 2224 through the Internet gateway 2234. The request can be received by the LB subnet(s) 2222 contained in the control plane DMZ tier 2220. The LB subnet(s) 2222 may determine that the request is valid, and in response to this determination, the LB subnet(s) 2222 can transmit the request to app subnet(s) 2226 contained in the control plane app tier 2224. If the request is validated and requires a call to public Internet 2254, the call to public Internet 2254 may be transmitted to the NAT gateway 2238 that can make the call to public Internet 2254. Metadata that may be desired to be stored by the request can be stored in the DB subnet(s) 2230.

In some examples, the data plane mirror app tier 2240 can facilitate direct communication between the control plane VCN 2224 and the data plane VCN 2226. For example, changes, updates, or other suitable modifications to configuration may be desired to be applied to the resources contained in the data plane VCN 2226. Via a VNIC 2242, the control plane VCN 2224 can directly communicate with, and can thereby execute the changes, updates, or other suitable modifications to configuration to, resources contained in the data plane VCN 2226.

In some embodiments, the control plane VCN 2224 and the data plane VCN 2226 can be contained in the service tenancy 2219. In this case, the user, or the customer, of the system may not own or operate either the control plane VCN 2224 or the data plane VCN 2226. Instead, the IaaS provider may own or operate the control plane VCN 2224 and the data plane VCN 2226, both of which may be contained in the service tenancy 2219. This embodiment can enable isolation of networks that may prevent users or customers from interacting with other users', or other customers', resources. Also, this embodiment may allow users or customers of the system to store databases privately without needing to rely on public Internet 2254, which may not have a desired level of threat prevention, for storage.

In other embodiments, the LB subnet(s) 2222 contained in the control plane VCN 2224 can be configured to receive a signal from the service gateway 2236. In this embodiment, the control plane VCN 2224 and the data plane VCN 2226 may be configured to be called by a customer of the IaaS provider without calling public Internet 2254. Customers of the IaaS provider may desire this embodiment since database(s) that the customers use may be controlled by the IaaS provider and may be stored on the service tenancy 2219, which may be isolated from public Internet 2254.

Figure 23:
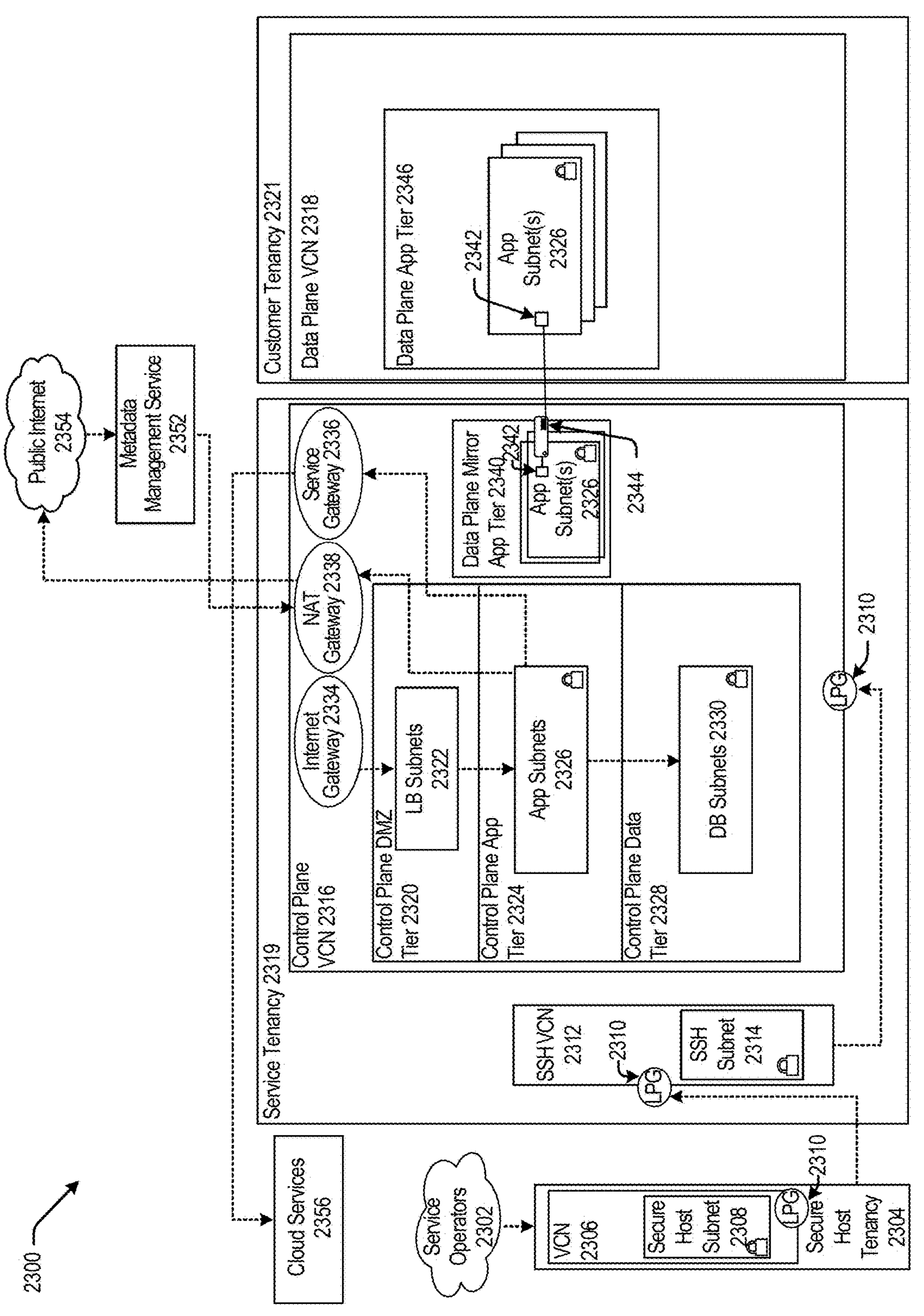
FIG. 23 is a block diagram illustrating another pattern for implementing a cloud infrastructure as a service system, according to at least one embodiment.

FIG. 23 is a block diagram 2300 illustrating another example pattern of an IaaS architecture, according to at least one embodiment. Service operators 2302 (e.g., service operators 2202 of FIG. 22) can be communicatively coupled to a secure host tenancy 2304 (e.g., the secure host tenancy 2204 of FIG. 22) that can include a virtual cloud network (VCN) 2306 (e.g., the VCN 2206 of FIG. 22) and a secure host subnet 2308 (e.g., the secure host subnet 2208 of FIG. 22). The VCN 2306 can include a local peering gateway (LPG) 2310 (e.g., the LPG 2210 of FIG. 22) that can be communicatively coupled to a secure shell (SSH) VCN 2312 (e.g., the SSH VCN 2212 of FIG. 22) via an LPG 2210 contained in the SSH VCN 2312. The SSH VCN 2312 can include an SSH subnet 2322 (e.g., the SSH subnet 2214 of FIG. 22), and the SSH VCN 2312 can be communicatively coupled to a control plane VCN 2324 (e.g., the control plane VCN 2224 of FIG. 22) via an LPG 2310 contained in the control plane VCN 2324. The control plane VCN 2324 can be contained in a service tenancy 2319 (e.g., the service tenancy 2219 of FIG. 22), and the data plane VCN 2326 (e.g., the data plane VCN 2226 of FIG. 22) can be contained in a customer tenancy 2321 that may be owned or operated by users, or customers, of the system.

The control plane VCN 2324 can include a control plane DMZ tier 2320 (e.g., the control plane DMZ tier 2220 of FIG. 22) that can include LB subnet(s) 2322 (e.g., LB subnet(s) 2222 of FIG. 22), a control plane app tier 2324 (e.g., the control plane app tier 2224 of FIG. 22) that can include app subnet(s) 2326 (e.g., app subnet(s) 2226 of FIG. 22), a control plane data tier 2328 (e.g., the control plane data tier 2228 of FIG. 22) that can include database (DB) subnet(s) 2330 (e.g., similar to DB subnet(s) 2230 of FIG. 22). The LB subnet(s) 2322 contained in the control plane DMZ tier 2320 can be communicatively coupled to the app subnet(s) 2326 contained in the control plane app tier 2324 and an Internet gateway 2334 (e.g., the Internet gateway 2234 of FIG. 22) that can be contained in the control plane VCN 2324, and the app subnet(s) 2326 can be communicatively coupled to the DB subnet(s) 2330 contained in the control plane data tier 2328 and a service gateway 2336

(e.g., the service gateway 2236 of FIG. 22) and a network address translation (NAT) gateway 2338 (e.g., the NAT gateway 2238 of FIG. 22). The control plane VCN 2324 can include the service gateway 2336 and the NAT gateway 2338.

The control plane VCN 2324 can include a data plane mirror app tier 2340 (e.g., the data plane mirror app tier 2240 of FIG. 22) that can include app subnet(s) 2326. The app subnet(s) 2326 contained in the data plane mirror app tier 2340 can include a virtual network interface controller (VNIC) 2342 (e.g., the VNIC of 2242) that can execute a compute instance 2344 (e.g., similar to the compute instance 2244 of FIG. 22). The compute instance 2344 can facilitate communication between the app subnet(s) 2326 of the data plane mirror app tier 2340 and the app subnet(s) 2326 that can be contained in a data plane app tier 2346 (e.g., the data plane app tier 2246 of FIG. 22) via the VNIC 2342 contained in the data plane mirror app tier 2340 and the VNIC 2342 contained in the data plane app tier 2346.

The Internet gateway 2334 contained in the control plane VCN 2324 can be communicatively coupled to a metadata management service 2352 (e.g., the metadata management service 2252 of FIG. 22) that can be communicatively coupled to public Internet 2354 (e.g., public Internet 2254 of FIG. 22). Public Internet 2354 can be communicatively coupled to the NAT gateway 2338 contained in the control plane VCN 2324. The service gateway 2336 contained in the control plane VCN 2324 can be communicatively couple to cloud services 2356 (e.g., cloud services 2256 of FIG. 22).

In some examples, the data plane VCN 2326 can be contained in the customer tenancy 2321. In this case, the IaaS provider may provide the control plane VCN 2324 for each customer, and the IaaS provider may, for each customer, set up a unique compute instance 2344 that is contained in the service tenancy 2319. Each compute instance 2344 may allow communication between the control plane VCN 2324, contained in the service tenancy 2319, and the data plane VCN 2326 that is contained in the customer tenancy 2321. The compute instance 2344 may allow resources, that are provisioned in the control plane VCN 2324 that is contained in the service tenancy 2319, to be deployed or otherwise used in the data plane VCN 2326 that is contained in the customer tenancy 2321.

In other examples, the customer of the IaaS provider may have databases that live in the customer tenancy 2321. In this example, the control plane VCN 2324 can include the data plane mirror app tier 2340 that can include app subnet(s) 2326. The data plane mirror app tier 2340 can reside in the data plane VCN 2326, but the data plane mirror app tier 2340 may not live in the data plane VCN 2326. That is, the data plane mirror app tier 2340 may have access to the customer tenancy 2321, but the data plane mirror app tier 2340 may not exist in the data plane VCN 2326 or be owned or operated by the customer of the IaaS provider. The data plane mirror app tier 2340 may be configured to make calls to the data plane VCN 2326 but may not be configured to make calls to any entity contained in the control plane VCN 2324. The customer may desire to deploy or otherwise use resources in the data plane VCN 2326 that are provisioned in the control plane VCN 2324, and the data plane mirror app tier 2340 can facilitate the desired deployment, or other usage of resources, of the customer.

In some embodiments, the customer of the IaaS provider can apply filters to the data plane VCN 2326. In this embodiment, the customer can determine what the data plane VCN 2326 can access, and the customer may restrict access to public Internet 2354 from the data plane VCN 2326. The IaaS provider may not be able to apply filters or otherwise control access of the data plane VCN 2326 to any outside networks or databases. Applying filters and controls by the customer onto the data plane VCN 2326, contained in the customer tenancy 2321, can help isolate the data plane VCN 2326 from other customers and from public Internet 2354.

In some embodiments, cloud services 2356 can be called by the service gateway 2336 to access services that may not exist on public Internet 2354, on the control plane VCN 2324, or on the data plane VCN 2326. The connection between cloud services 2356 and the control plane VCN 2324 or the data plane VCN 2326 may not be live or continuous. Cloud services 2356 may exist on a different network owned or operated by the IaaS provider. Cloud services 2356 may be configured to receive calls from the service gateway 2336 and may be configured to not receive calls from public Internet 2354. Some cloud services 2356 may be isolated from other cloud services 2356, and the control plane VCN 2324 may be isolated from cloud services 2356 that may not be in the same region as the control plane VCN 2324. For example, the control plane VCN 2324 may be located in "Region 1," and cloud service "Deployment 22," may be located in Region 1 and in "Region 2." If a call to Deployment 22 is made by the service gateway 2336 contained in the control plane VCN 2324 located in Region 1, the call may be transmitted to Deployment 22 in Region 1. In this example, the control plane VCN 2324, or Deployment 22 in Region 1, may not be communicatively coupled to, or otherwise in communication with, Deployment 22 in Region 2.

Figure 24:
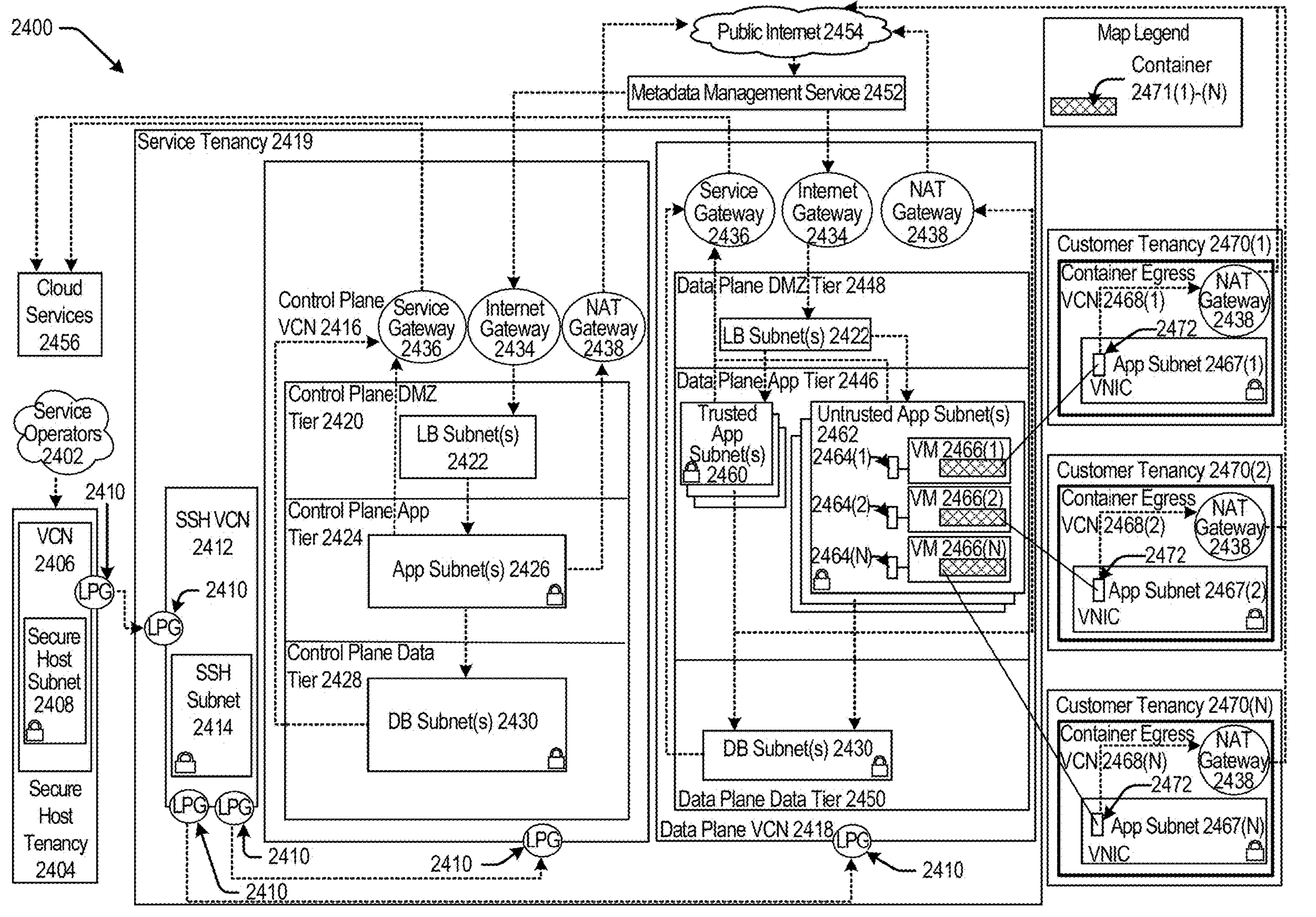
FIG. 24 is a block diagram illustrating another pattern for implementing a cloud infrastructure as a service system, according to at least one embodiment.

FIG. 24 is a block diagram 2400 illustrating another example pattern of an IaaS architecture, according to at least one embodiment. Service operators 2402 (e.g., service operators 2202 of FIG. 22) can be communicatively coupled to a secure host tenancy 2404 (e.g., the secure host tenancy 2204 of FIG. 22) that can include a virtual cloud network (VCN) 2406 (e.g., the VCN 2206 of FIG. 22) and a secure host subnet 2408 (e.g., the secure host subnet 2208 of FIG. 22). The VCN 2406 can include an LPG 2410 (e.g., the LPG 2210 of FIG. 22) that can be communicatively coupled to an SSH VCN 2412 (e.g., the SSH VCN 2212 of FIG. 22) via an LPG 2410 contained in the SSH VCN 2412. The SSH VCN 2412 can include an SSH subnet 2422 (e.g., the SSH subnet 2214 of FIG. 22), and the SSH VCN 2412 can be communicatively coupled to a control plane VCN 2416 (e.g., the control plane VCN 2224 of FIG. 22) via an LPG 2410 contained in the control plane VCN 2416 and to a data plane VCN 2426 (e.g., the data plane 2226 of FIG. 22) via an LPG 2410 contained in the data plane VCN 2426. The control plane VCN 2416 and the data plane VCN 2426 can be contained in a service tenancy 2419 (e.g., the service tenancy 2219 of FIG. 22).

The control plane VCN 2416 can include a control plane DMZ tier 2420 (e.g., the control plane DMZ tier 2220 of FIG. 22) that can include load balancer (LB) subnet(s) 2422 (e.g., LB subnet(s) 2222 of FIG. 22), a control plane app tier 2424 (e.g., the control plane app tier 2224 of FIG. 22) that can include app subnet(s) 2426 (e.g., similar to app subnet(s) 2226 of FIG. 22), a control plane data tier 2428 (e.g., the control plane data tier 2228 of FIG. 22) that can include DB subnet(s) 2430. The LB subnet(s) 2422 contained in the control plane DMZ tier 2420 can be communicatively coupled to the app subnet(s) 2426 contained in the control plane app tier 2424 and to an Internet gateway 2434 (e.g., the Internet gateway 2234 of FIG. 22) that can be contained in the control plane VCN 2416, and the app subnet(s) 2426 can be communicatively coupled to the DB subnet(s) 2430 contained in the control plane data tier 2428 and to a service gateway 2436 (e.g., the service gateway of FIG. 22) and a network address translation (NAT) gateway 2438 (e.g., the NAT gateway 2238 of FIG. 22). The control plane VCN 2416 can include the service gateway 2436 and the NAT gateway 2438.

The data plane VCN 2426 can include a data plane app tier 2446 (e.g., the data plane app tier 2246 of FIG. 22), a data plane DMZ tier 2448 (e.g., the data plane DMZ tier 2248 of FIG. 22), and a data plane data tier 2450 (e.g., the data plane data tier 2250 of FIG. 22). The data plane DMZ tier 2448 can include LB subnet(s) 2422 that can be communicatively coupled to trusted app subnet(s) 2460 and untrusted app subnet(s) 2462 of the data plane app tier 2446 and the Internet gateway 2434 contained in the data plane VCN 2426. The trusted app subnet(s) 2460 can be communicatively coupled to the service gateway 2436 contained in the data plane VCN 2426, the NAT gateway 2438 contained in the data plane VCN 2426, and DB subnet(s) 2430 contained in the data plane data tier 2450. The untrusted app subnet(s) 2462 can be communicatively coupled to the service gateway 2436 contained in the data plane VCN 2426 and DB subnet(s) 2430 contained in the data plane data tier 2450. The data plane data tier 2450 can include DB subnet(s) 2430 that can be communicatively coupled to the service gateway 2436 contained in the data plane VCN 2426.

The untrusted app subnet(s) 2462 can include one or more primary VNICs 2464(1)-(N) that can be communicatively coupled to tenant virtual machines (VMs) 2466(1)-(N). Each tenant VM 2466(1)-(N) can be communicatively coupled to a respective app subnet 2467(1)-(N) that can be contained in respective container egress VCNs 2468(1)-(N) that can be contained in respective customer tenancies 2470(1)-(N). Respective secondary VNICs 2472(1)-(N) can facilitate communication between the untrusted app subnet(s) 2462 contained in the data plane VCN 2426 and the app subnet contained in the container egress VCNs 2468(1)-(N). Each container egress VCNs 2468(1)-(N) can include a NAT gateway 2438 that can be communicatively coupled to public Internet 2454 (e.g., public Internet 2254 of FIG. 22).

The Internet gateway 2434 contained in the control plane VCN 2416 and contained in the data plane VCN 2426 can be communicatively coupled to a metadata management service 2452 (e.g., the metadata management system 2252 of FIG. 22) that can be communicatively coupled to public Internet 2454. Public Internet 2454 can be communicatively coupled to the NAT gateway 2438 contained in the control plane VCN 2416 and contained in the data plane VCN 2426. The service gateway 2436 contained in the control plane VCN 2416 and contained in the data plane VCN 2426 can be communicatively couple to cloud services 2456.

In some embodiments, the data plane VCN 2426 can be integrated with customer tenancies 2470. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 2446. Code to run the function may be executed in the VMs 2466(1)-(N), and the code may not be configured to run anywhere else on the data plane VCN 2426. Each VM 2466(1)-(N) may be connected to one customer tenancy 2470. Respective containers 2471(1)-(N) contained in the VMs 2466(1)-(N) may be configured to run the code. In this case, there can be a dual isolation (e.g., the containers 2471(1)-(N) running code, where the containers 2471(1)-(N) may be contained in at least the VM 2466(1)-(N) that are contained in the untrusted app subnet(s) 2462), which may help prevent incorrect or otherwise undesirable code from damaging the network of the IaaS provider or from damaging a network of a different customer. The containers 2471 (1)-(N) may be communicatively coupled to the customer tenancy 2470 and may be configured to transmit or receive data from the customer tenancy 2470. The containers 2471 (1)-(N) may not be configured to transmit or receive data from any other entity in the data plane VCN 2426. Upon completion of running the code, the IaaS provider may kill or otherwise dispose of the containers 2471(1)-(N).

In some embodiments, the trusted app subnet(s) 2460 may run code that may be owned or operated by the IaaS provider. In this embodiment, the trusted app subnet(s) 2460 may be communicatively coupled to the DB subnet(s) 2430 and be configured to execute CRUD operations in the DB subnet(s) 2430. The untrusted app subnet(s) 2462 may be communicatively coupled to the DB subnet(s) 2430, but in this embodiment, the untrusted app subnet(s) may be configured to execute read operations in the DB subnet(s) 2430. The containers 2471(1)-(N) that can be contained in the VM 2466(1)-(N) of each customer and that may run code from the customer may not be communicatively coupled with the DB subnet(s) 2430.

In other embodiments, the control plane VCN 2416 and the data plane VCN 2426 may not be directly communicatively coupled. In this embodiment, there may be no direct communication between the control plane VCN 2416 and the data plane VCN 2426. However, communication can occur indirectly through at least one method. An LPG 2410 may be established by the IaaS provider that can facilitate communication between the control plane VCN 2416 and the data plane VCN 2426. In another example, the control plane VCN 2416 or the data plane VCN 2426 can make a call to cloud services 2456 via the service gateway 2436. For example, a call to cloud services 2456 from the control plane VCN 2416 can include a request for a service that can communicate with the data plane VCN 2426.

Figure 25:
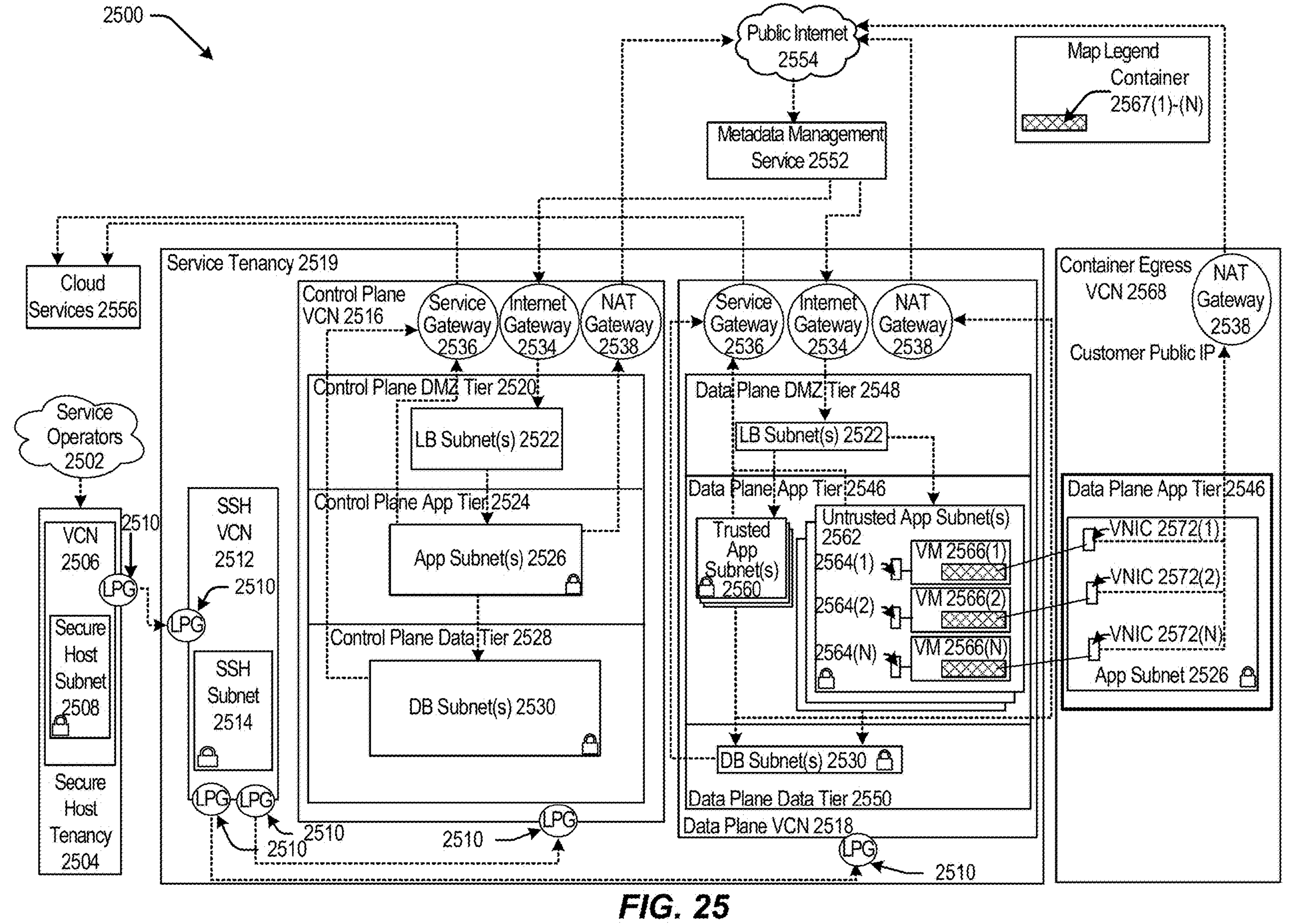
FIG. 25 is a block diagram illustrating another pattern for implementing a cloud infrastructure as a service system, according to at least one embodiment.

FIG. 25 is a block diagram 2500 illustrating another example pattern of an IaaS architecture, according to at least one embodiment. Service operators 2502 (e.g., service operators 2202 of FIG. 22) can be communicatively coupled to a secure host tenancy 2504 (e.g., the secure host tenancy 2204 of FIG. 22) that can include a virtual cloud network (VCN) 2506 (e.g., the VCN 2206 of FIG. 22) and a secure host subnet 2508 (e.g., the secure host subnet 2208 of FIG. 22). The VCN 2506 can include an LPG 2510 (e.g., the LPG 2210 of FIG. 22) that can be communicatively coupled to an SSH VCN 2512 (e.g., the SSH VCN 2212 of FIG. 22) via an LPG 2510 contained in the SSH VCN 2512. The SSH VCN 2512 can include an SSH subnet 2522 (e.g., the SSH subnet 2214 of FIG. 22), and the SSH VCN 2512 can be communicatively coupled to a control plane VCN 2524 (e.g., the control plane VCN 2224 of FIG. 22) via an LPG 2510 contained in the control plane VCN 2524 and to a data plane VCN 2526 (e.g., the data plane 2226 of FIG. 22) via an LPG 2510 contained in the data plane VCN 2526. The control plane VCN 2524 and the data plane VCN 2526 can be contained in a service tenancy 2519 (e.g., the service tenancy 2219 of FIG. 22).

The control plane VCN 2524 can include a control plane DMZ tier 2520 (e.g., the control plane DMZ tier 2220 of FIG. 22) that can include LB subnet(s) 2522 (e.g., LB subnet(s) 2222 of FIG. 22), a control plane app tier 2524 (e.g., the control plane app tier 2224 of FIG. 22) that can include app subnet(s) 2526 (e.g., app subnet(s) 2226 of FIG. 22), a control plane data tier 2528 (e.g., the control plane data tier 2228 of FIG. 22) that can include DB subnet(s) 2530 (e.g., DB subnet(s) 2430 of FIG. 24). The LB subnet(s) 2522 contained in the control plane DMZ tier 2520 can be communicatively coupled to the app subnet(s) 2526 contained in the control plane app tier 2524 and to an Internet gateway 2534 (e.g., the Internet gateway 2234 of FIG. 22) that can be contained in the control plane VCN 2524, and the app subnet(s) 2526 can be communicatively coupled to the DB subnet(s) 2530 contained in the control plane data tier 2528 and to a service gateway 2536 (e.g., the service gateway of FIG. 22) and a network address translation (NAT) gateway 2538 (e.g., the NAT gateway 2238 of FIG. 22). The control plane VCN 2524 can include the service gateway 2536 and the NAT gateway 2538.

The data plane VCN 2526 can include a data plane app tier 2546 (e.g., the data plane app tier 2246 of FIG. 22), a data plane DMZ tier 2548 (e.g., the data plane DMZ tier 2248 of FIG. 22), and a data plane data tier 2550 (e.g., the data plane data tier 2250 of FIG. 22). The data plane DMZ tier 2548 can include LB subnet(s) 2522 that can be communicatively coupled to trusted app subnet(s) 2560 (e.g., trusted app subnet(s) 2460 of FIG. 24) and untrusted app subnet(s) 2562 (e.g., untrusted app subnet(s) 2462 of FIG. 24) of the data plane app tier 2546 and the Internet gateway 2534 contained in the data plane VCN 2526. The trusted app subnet(s) 2560 can be communicatively coupled to the service gateway 2536 contained in the data plane VCN 2526, the NAT gateway 2538 contained in the data plane VCN 2526, and DB subnet(s) 2530 contained in the data plane data tier 2550. The untrusted app subnet(s) 2562 can be communicatively coupled to the service gateway 2536 contained in the data plane VCN 2526 and DB subnet(s) 2530 contained in the data plane data tier 2550. The data plane data tier 2550 can include DB subnet(s) 2530 that can be communicatively coupled to the service gateway 2536 contained in the data plane VCN 2526.

The untrusted app subnet(s) 2562 can include primary VNICs 2564(1)-(N) that can be communicatively coupled to tenant virtual machines (VMs) 2566(1)-(N) residing within the untrusted app subnet(s) 2562. Each tenant VM 2566(1)-(N) can run code in a respective container 2567(1)-(N), and be communicatively coupled to an app subnet 2526 that can be contained in a data plane app tier 2546 that can be contained in a container egress VCN 2568. Respective secondary VNICs 2572(1)-(N) can facilitate communication between the untrusted app subnet(s) 2562 contained in the data plane VCN 2526 and the app subnet contained in the container egress VCN 2568. The container egress VCN can include a NAT gateway 2538 that can be communicatively coupled to public Internet 2554 (e.g., public Internet 2254 of FIG. 22).

The Internet gateway 2534 contained in the control plane VCN 2524 and contained in the data plane VCN 2526 can be communicatively coupled to a metadata management service 2552 (e.g., the metadata management system 2252 of FIG. 22) that can be communicatively coupled to public Internet 2554. Public Internet 2554 can be communicatively coupled to the NAT gateway 2538 contained in the control plane VCN 2524 and contained in the data plane VCN 2526. The service gateway 2536 contained in the control plane VCN 2524 and contained in the data plane VCN 2526 can be communicatively couple to cloud services 2556.

In some examples, the pattern illustrated by the architecture of block diagram 2500 of FIG. 25 may be considered an exception to the pattern illustrated by the architecture of block diagram 2400 of FIG. 24 and may be desirable for a customer of the IaaS provider if the IaaS provider cannot directly communicate with the customer (e.g., a disconnected region). The respective containers 2567(1)-(N) that are contained in the VMs 2566(1)-(N) for each customer can be accessed in real-time by the customer. The containers 2567(1)-(N) may be configured to make calls to respective secondary VNICs 2572(1)-(N) contained in app subnet(s) 2526 of the data plane app tier 2546 that can be contained in the container egress VCN 2568. The secondary VNICs 2572(1)-(N) can transmit the calls to the NAT gateway 2538 that may transmit the calls to public Internet 2554. In this example, the containers 2567(1)-(N) that can be accessed in real-time by the customer can be isolated from the control plane VCN 2524 and can be isolated from other entities contained in the data plane VCN 2526. The containers 2567(1)-(N) may also be isolated from resources from other customers.

In other examples, the customer can use the containers 2567(1)-(N) to call cloud services 2556. In this example, the customer may run code in the containers 2567(1)-(N) that requests a service from cloud services 2556. The containers 2567(1)-(N) can transmit this request to the secondary VNICs 2572(1)-(N) that can transmit the request to the NAT gateway that can transmit the request to public Internet 2554. Public Internet 2554 can transmit the request to LB subnet(s) 2522 contained in the control plane VCN 2524 via the Internet gateway 2534. In response to determining the request is valid, the LB subnet(s) can transmit the request to app subnet(s) 2526 that can transmit the request to cloud services 2556 via the service gateway 2536.

It should be appreciated that IaaS architectures 2200, 2300, 2400, 2500 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 26:
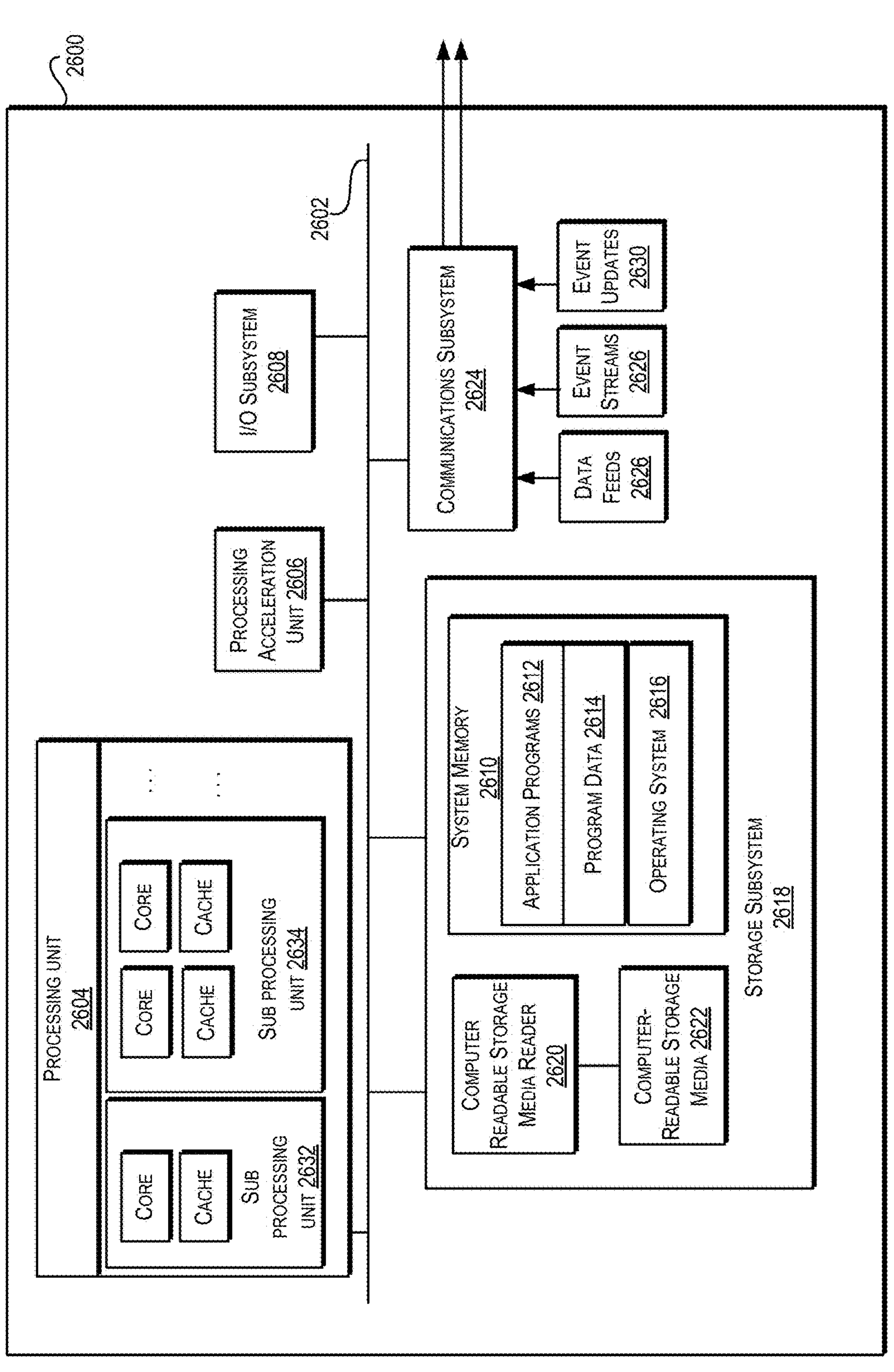
FIG. 26 is a block diagram illustrating an example computer system, according to at least one embodiment.

FIG. 26 illustrates an example computer system 2600, in which various embodiments may be implemented. The system 2600 may be used to implement any of the computer systems described above. As shown in the figure, computer system 2600 includes a processing unit 2604 that communicates with a number of peripheral subsystems via a bus subsystem 2602. These peripheral subsystems may include a processing acceleration unit 2606, an I/O subsystem 2608, a storage subsystem 2816 and a communications subsystem 2624. Storage subsystem 2816 includes tangible computer-readable storage media 2622 and a system memory 2610.

Bus subsystem 2602 provides a mechanism for letting the various components and subsystems of computer system 2600 communicate with each other as intended. Although bus subsystem 2602 is shown schematically as a single bus, alternative embodiments of the bus subsystem may utilize multiple buses. Bus subsystem 2602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2604, which can be implemented as one or more integrated circuits (e.g., a conventional microprocessor or microcontroller), controls the operation of computer system 2600. One or more processors may be included in processing unit 2604. These processors may include single core or multicore processors. In certain embodiments, processing unit 2604 may be implemented as one or more independent processing units 2632 and/or 2634 with single or multicore processors included in each processing unit. In other embodiments, processing unit 2604 may also be implemented as a quad-core processing unit formed by integrating two dual-core processors into a single chip.

In various embodiments, processing unit 2604 can execute a variety of programs in response to program code and can maintain multiple concurrently executing programs or processes. At any given time, some or all of the program code to be executed can be resident in processor(s) 2604 and/or in storage subsystem 2816. Through suitable programming, processor(s) 2604 can provide various functionalities described above. Computer system 2600 may additionally include a processing acceleration unit 2606, which can include a digital signal processor (DSP), a special-purpose processor, and/or the like.

I/O subsystem 2608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2600 may comprise a storage subsystem 2816 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2604 provide the functionality described above. Storage subsystem 2816 may also provide a repository for storing data used in accordance with the present disclosure.

As depicted in the example in FIG. 26, storage subsystem 2816 can include various components including a system memory 2610, computer-readable storage media 2622, and a computer readable storage media reader 2620. System memory 2610 may store program instructions that are loadable and executable by processing unit 2604. System memory 2610 may also store data that is used during the execution of the instructions and/or data that is generated during the execution of the program instructions. Various different kinds of programs may be loaded into system memory 2610 including but not limited to client applications, Web browsers, mid-tier applications, relational database management systems (RDBMS), virtual machines, containers, etc.

System memory 2610 may also store an operating system 2624. Examples of operating system 2624 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2600 executes one or more virtual machines, the virtual machines along with their guest operating systems (GOSs) may be loaded into system memory 2610 and executed by one or more processors or cores of processing unit 2604.

System memory 2610 can come in different configurations depending upon the type of computer system 2600. For example, system memory 2610 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 2610 may include a basic input/output system (BIOS) containing basic routines that help to transfer information between elements within computer system 2600, such as during start-up.

Computer-readable storage media 2622 may represent remote, local, fixed, and/or removable storage devices plus storage media for temporarily and/or more permanently containing, storing, computer-readable information for use by computer system 2600 including instructions executable by processing unit 2604 of computer system 2600.

Computer-readable storage media 2622 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2622 may include, but is not limited to, Zip® drives, flash memory cards, universal serial bus (USB) flash drives, secure digital (SD) cards, DVD disks, digital video tape, and the like. Computer-readable storage media 2622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2600.

Machine-readable instructions executable by one or more processors or cores of processing unit 2604 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2624 provides an interface to other computer systems and networks. Communications subsystem 2624 serves as an interface for receiving data from and transmitting data to other systems from computer system 2600. For example, communications subsystem 2624 may enable computer system 2600 to connect to one or more devices via the Internet. In some embodiments communications subsystem 2624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2624 can provide wired network connectivity (e.g., Ethernet) in addition to or instead of a wireless interface.

In some embodiments, communications subsystem 2624 may also receive input communication in the form of structured and/or unstructured data feeds 2626, event streams 2628, event updates 2630, and the like on behalf of one or more users who may use computer system 2600.

By way of example, communications subsystem 2624 may be configured to receive data feeds 2626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2624 may also be configured to receive data in the form of continuous data streams, which may include event streams 2628 of real-time events and/or event updates 2630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2624 may also be configured to output the structured and/or unstructured data feeds 2626, event streams 2628, event updates 2630, and the like to one or more databases that may be in communication with one or more streaming data source computers coupled to computer system 2600.

Computer system 2600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

accessing a first training dataset provided for training a machine learning (ML) model, the first training dataset comprising a first plurality of documents and annotation information for each document in the first plurality of documents, wherein, for each document in the first plurality of documents, the annotation information for the document comprises information indicative of one or more elements in the document, and for each element in the one or more elements, information indicative of an in-distribution ("in-D") class, from one or more in-D classes, to which the element belongs;

generating a second training dataset based upon the first training dataset, the second training dataset comprising a second plurality of documents and annotation information for each document in the second plurality of documents, wherein, each document in the second plurality of documents includes one or more elements that belong to an out-of-distribution ("OO-D") class; and training the ML model using both the first training dataset and the second training dataset to generate a trained machine learning model, wherein, for an element extracted from a particular document, the trained machine learning model is trained to classify the extracted element as belonging to an in-D class or to the OO-D class.

2. The method of claim 1, further comprising:

classifying, using the trained ML model, a first element extracted from the particular document as belonging to an in-D class from the one or more in-D classes; and classifying, using the trained ML model, a second element extracted from the particular document as belonging to the OO-D class.

3. The method of claim 1, wherein generating the second training dataset based upon the first training dataset comprises:

identifying a first document in the first plurality of documents;

generating a second document for the second plurality of documents from the first document, wherein the second document comprises a first element; and generating annotation information for the second document, the annotation information for the second document indicating that the first element belongs to the OO-D class.

4. The method of claim 3, wherein generating the second document from the first document comprises:

making a copy of the first document, wherein the second document is the copy of the first document.

5. The method of claim 3, wherein the first element is included in the first document.

6. The method of claim 3, wherein:

generating the second document from the first document comprises receiving information identifying a region within the second document;

generating the annotation information for the second document comprises including information in the annotation information for the second document indicative that any element located within the region in the second document belongs to the OO-D class; and the first element is located in the region within the first document and also located in a region in the first document corresponding to the region in the second document.

7. The method of claim 3, wherein generating the second document from the first document comprises:

generating the first element;

identifying, based upon the first document, a location within the second document for placing the first element; and placing the first element in the identified location within the second document.

8. The method of claim 7, wherein generating the first element comprises identifying a particular word from a set of words included in the first plurality of documents, wherein the first element is the particular word.

9. The method of claim 7, wherein generating the first element comprises identifying a particular word from a set of words included in the second document, wherein the first element is the particular word.

10. The method of claim 7, wherein generating the first element comprises:

identifying a particular word from a set of words included in the second 2 document; and generating a similar word based upon the particular word, wherein the first element is the similar word.

11. The method of claim 10, wherein generating the similar word comprises:

generating an embedded representation of the particular word using a word 2 embedding model;

identifying a candidate word using a language model;

determining a similarity measure between the particular word and the candidate word; and designating the candidate word as the similar word.

12. The method of claim 7, wherein generating the first element comprises:

identifying a particular word from a set of words included in the second 2 document; and determining a synonym of the particular word, wherein the first element is the synonym.

13. The method of claim 7, wherein generating the first element comprises:

randomly selecting a word from a corpus of documents, wherein the first element 2 is the randomly selected word.

14. The method of claim 7, wherein generating the first element comprises:

identifying a particular word from a set of words included in the second document; and identifying one or more characteristics associated with the particular word based upon metadata associated with the second document; and generating a new word based on the one or more identified characteristics, wherein the first element is the new word.

15. The method of claim 7, wherein generating the first element comprises modifying a property of the first element, wherein the property includes at least one of: font, color, style, or size.

16. The method of claim 7, wherein generating the first element comprises generating an image, wherein the first element is the image.

17. The method of claim 16, wherein the image is one of a barcode, QR code, rubber stamp, handwritten text, or a watermark.

18. A system comprising:

a set of processors;

a memory storing a trained machine learning ("ML") model, wherein the trained ML model is trained to classify elements in a document as belonging to one of a set of one or more in-distribution ("in-D") class or to an out-of-distribution ("OO-D") class, wherein training the trained ML model comprises:

accessing a first training dataset, the first training dataset comprising a first plurality of documents and annotation information for each document in the first plurality of documents, wherein, for each document in the first plurality of documents, the annotation information for the document comprises information indicative of one or more elements in the document, and for each element in the one or more elements, information indicative of an in-D class to which the element belongs;

generating a second training dataset based upon the first training dataset, the second training dataset comprising a second plurality of documents and annotation information for each document in the second plurality of documents, wherein, each document in the second plurality of documents includes one or more elements that belong to the OO-D class; and training the ML model using both the first training dataset and the second training dataset;

wherein one or more processors from the set of processors are configured to perform processing comprising:

classifying, using the trained ML model, a first element extracted from a document as belonging to an in-D class from the set of one or more in-D classes; and classifying, using the trained ML model, a second extracted element from the document as belonging to the OO-D class.

19. The system of claim 18, wherein generating the second training dataset based upon the first training dataset comprises:

identifying a first document in the first plurality of documents;

generating a second document for the second plurality of documents from the first document, wherein the second document comprises a first element, comprising:

generating the first element;

identifying, based upon the first document, a location within the second document for placing the first element; and placing the first element in the identified location within the second document; and generating annotation information for the second document, the annotation information for the second document indicating that the first element belongs to the OO-D class.

20. A non-transitory computer-readable medium storing computer-executable instructions that, when executed by one or more computer devices, cause the computing devices to perform processing comprising:

accessing a trained machine learning ("ML") model, wherein the trained ML model is trained to classify elements in a document as belonging to one of a set of one or more in-distribution ("in-D") class or to an out-of-distribution ("OO-D") class, wherein training the trained ML model comprises:

accessing a first training dataset, the first training dataset comprising a first plurality of documents and annotation information for each document in the first plurality of documents, wherein, for each document in the first plurality of documents, the annotation information for the document comprises information indicative of one or more elements in the document, and for each element in the one or more elements, information indicative of an in-D class to which the element belongs;

generating a second training dataset based upon the first training dataset, the second training dataset comprising a second plurality of documents and annotation information for each document in the second plurality of documents, wherein, each document in the second plurality of documents includes one or more elements that belong to the OO-D class; and training the ML model using both the first training dataset and the second training dataset;

wherein one or more processors from the set of processors are configured to perform processing comprising:

classifying, using the trained ML model, a first element extracted from a document as belonging to an in-D class from the set of one or more in-D classes; and classifying, using the trained ML model, a second extracted element from the document as belonging to the OO-D class.

* * * * *